United States Patent [19]

Kidokoro et al.

[11] Patent Number: 5,925,817
[45] Date of Patent: Jul. 20, 1999

[54] DEVICE FOR DIAGNOSING MALFUNCTION IN A FUEL TANK

[75] Inventors: Toru Kidokoro, Hadano; Takaaki Ito, Mishima; Yoshihiko Hyodo, Gotenba, all of Japan

[73] Assignee: Toyota Jidosha Kabushiki Kaisha, Aichi, Japan

[21] Appl. No.: 08/998,273

[22] Filed: Dec. 24, 1997

[30] Foreign Application Priority Data

Dec. 26, 1996 [JP] Japan ..................................... 8-347336
Feb. 20, 1997 [JP] Japan ..................................... 9-036589

[51] Int. Cl.$^6$ .................................................. G01M 3/04
[52] U.S. Cl. ................................................................ 73/40
[58] Field of Search ........................... 73/118.1, 40, 49.2, 73/49.3, 40.7; 701/31

[56] References Cited

U.S. PATENT DOCUMENTS 3,617,034 11/1971 Skinner .
3,701,540 10/1972 Pringle .

FOREIGN PATENT DOCUMENTS

| 56-128221 | 10/1981 | Japan . |
| 60-157427 | 10/1985 | Japan . |
| 60-158922 | 10/1985 | Japan . |
| 60-158923 | 10/1985 | Japan . |
| 64-16426 | 1/1989 | Japan . |
| 5-180099 | 7/1993 | Japan . |
| 7-132738 | 5/1995 | Japan . |

*Primary Examiner*—Robert Raevis
*Attorney, Agent, or Firm*—Kenyon & Kenyon

[57] ABSTRACT

According to the present invention, there is provided a device for diagnosing malfunction in a fuel tank. The fuel tank has a separator wall therein which separates an interior of the fuel tank into a fuel chamber and an air chamber. The separator wall is deformable according to an amount of fuel in the fuel chamber. The device comprises a device for detecting a change of at least one of a position of the separator wall, the pressure in the tank and the concentration of fuel vapor in the tank, and a device for diagnosing malfunction of the separator wall on the basis of the change to diagnose that the separator wall has malfunction when the change differs from a predetermined regular change.

9 Claims, 36 Drawing Sheets

— FILM HAS MALFUNCTION
---- FILM HAS NO MALFUNCTION

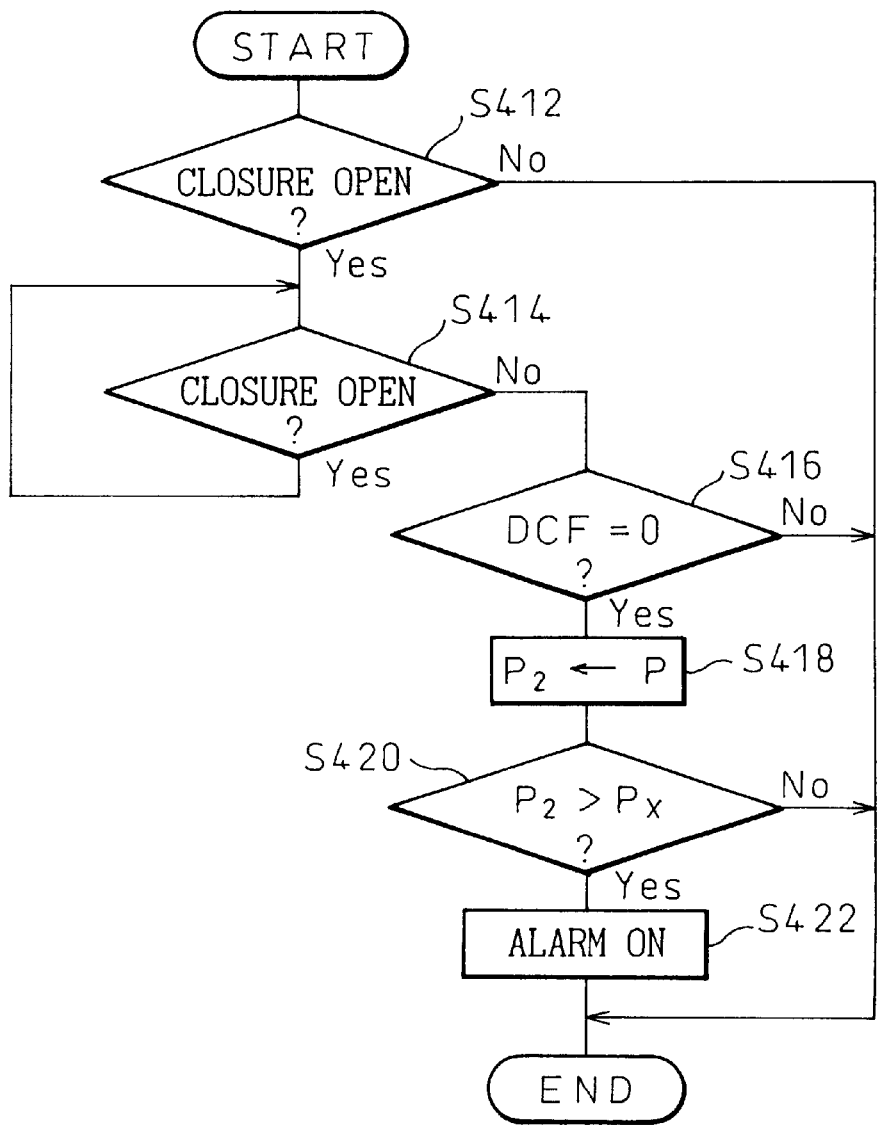

DEVICE FOR DIAGNOSING MALFUNCTION IN A FUEL TANK

BACKGROUND OF THE INVENTION

1. Field of the Invention

The invention relates to a device for diagnosing malfunction in a fuel tank.

2. Description of the Related Art

In order to prevent fuel vapor produced in a fuel tank from being discharged to the atmosphere, in a known engine, a charcoal canister containing activated carbon is provided. The vapor in a space above the surface of the fuel stored in the tank is introduced into the canister and is adsorbed on the activated carbon thereof. A large amount of the vapor, introduced into the canister, needs a large canister. Therefore, it is preferable to minimize the amount of the vapor produced in the tank in order to reduce the size of the canister.

In order to minimize the amount of vapor produced in the tank, a fuel tank which comprises a fuel-impermeable separator film in an interior of the tank, as disclosed in Japanese Unexamined Utility Model Publication No. 60-158923, has been developed. The film is in contact with the surface of the fuel in the tank to reduce the space above the fuel surface and moves up and down with the movement of the fuel surface. The small space above the fuel surface leads to a smaller amount of vapor being produced in the tank.

In the tank described above, the amount of vapor may increase if the film has problems, such as holes formed in the film, or if the film cannot move up and down as the fuel surface moves up and down. Therefore, it is necessary to diagnose the malfunction in the tank and to warn the driver of the vehicle.

Therefore, the object of the invention is to provide a device for diagnosing malfunction in the fuel tank of a vehicle.

SUMMARY OF THE INVENTION

According to the invention, there is provided, a device for diagnosing malfunction in a fuel tank, the fuel tank having a separator wall therein which separates an interior of the tank into a fuel chamber and an air chamber, the wall being deformable according to an amount of fuel in the fuel chamber, the device comprising: a device for detecting a change of at least one of a position of the separator wall, a pressure in the fuel tank and a concentration of fuel vapor in the fuel, and a device for diagnosing malfunction of the separator wall on the basis of the change to diagnose that the separator wall has malfunction when the change differs from a predetermined regular change.

Further, according to the invention, the malfunction diagnosing device diagnoses that the separator wall has malfunction on the basis of a change in the pressure in the fuel tank and time elapsed since a reference time.

Further, according to the invention, the air chamber is in communication with the atmosphere, and the malfunction diagnosing device diagnoses that the separator wall has malfunction on the basis of a change of a pressure in the fuel tank and time elapsed since a time when the air chamber is closed to the atmosphere.

Further, according to the invention, the malfunction diagnosing device diagnoses that the separator wall has malfunction on the basis of a change of a pressure in the fuel tank and time elapsed since a time when the air chamber and the fuel chamber are sealed.

Further, according to the invention, the fuel tank in communication with an engine, and the malfunction diagnosing device diagnoses that the separator wall has malfunction on the basis of a difference between pressures in the fuel tank before and after a purging operation is started to purge fuel vapor to the engine.

Further, according to the invention, the malfunction diagnosing device diagnoses that the separator wall has malfunction on the basis of a difference in the pressure in the fuel tank before and after a refueling operation is started to supply the fuel chamber with fuel.

Further, according to the invention, the malfunction diagnosing device diagnoses that the separator wall has malfunction on the basis of a difference in the concentration of fuel vapor before and after a refueling operation to supply the fuel chamber with fuel.

Further, according to the invention, the fuel tank in communication with an engine, and the malfunction diagnosing device diagnoses that the separator wall has malfunction on the basis of a difference in the concentration of fuel vapor before and after a purge operation to purge fuel vapor to the engine.

Further, according to the invention, the malfunction diagnosing device diagnoses that the separator wall has malfunction when a concentration of fuel vapor is higher than a predetermined concentration.

Further, according to the invention, the fuel tank is in communication with an engine, and the malfunction diagnosing device diagnoses that the separator wall has malfunction when the concentration of fuel vapor is higher than the predetermined concentration during a purge operation to purge fuel vapor to the engine.

Further, according to the invention, the malfunction diagnosing device diagnoses that the separator wall has malfunction when the concentration of fuel vapor is higher than the predetermined concentration during a refueling operation to supply the fuel chamber with fuel.

Further, according to the invention, the fuel tank is in communication with an engine, and the malfunction diagnosing device diagnoses that the separator wall has malfunction on the basis of the change of the position of the separator wall in the fuel tank and the amount of the driving of the engine.

Further, according to the invention, the malfunction diagnosing device diagnoses that the separator wall has malfunction on the basis of a difference in the position of the separator wall before and after a refueling operation is started to supply the fuel tank with fuel.

Further, according to the invention, the fuel tank is in communication with an engine, and the malfunction diagnosing device diagnoses that the separator wall has malfunction on the basis of a difference in the position of the separator wall before and after a purge operation is started to purge fuel vapor to the engine.

Further, according to the invention, the malfunction diagnosing device diagnoses that the separator wall has malfunction on the basis of the amount of fuel in the air chamber.

Further, according to the invention, a prohibiting device is provided for prohibiting the diagnosis of the malfunction diagnosing device on the basis of at least one of an engine driving time, a temperature surrounding the fuel tank, an atmosphere pressure, and a fuel temperature in the fuel tank.

Further, according to the invention, an indicator is provided for indicating malfunction in the separator wall to indicate malfunction in the separator wall when the malfunction diagnosing device diagnoses that the separator wall has malfunction.

The present invention may be more fully understood from the description of the preferred embodiments of the invention set forth below, together with the accompanying drawings.

BRIEF DESCRIPTION OF THE DRAWINGS

In the drawings:

FIG. 32 is a flowchart illustrating an initializing routine according to the eighth embodiment of the invention;

FIG. 33 is a flowchart illustrating a routine of malfunction diagnosis according to the eighth embodiment of the invention;

DESCRIPTION OF THE PREFERRED EMBODIMENTS

Figure 1:
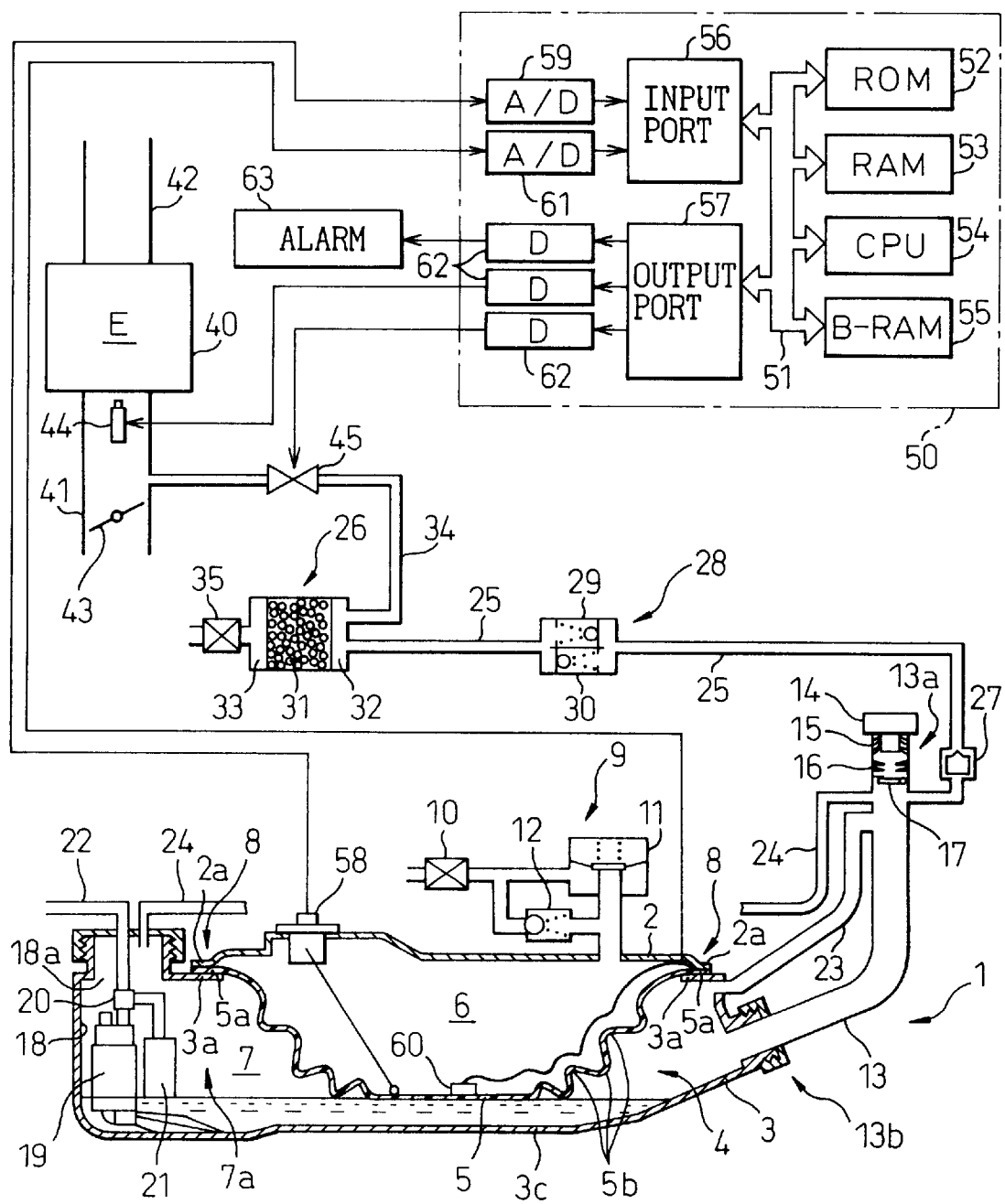
FIG. 1 is a general view of a fuel tank according to the first embodiment of the invention.

A fuel tank according to the first embodiment will be explained, referring to FIG. 1.

A fuel tank 1 of a vehicle comprises an upper portion 2 and a lower portion 3 which are made of material such as metal or synthetic resin. These portions 2 and 3 are sealingly connected to each other at their flange portion 2a, 3a. A separator wall or film 5, which is made of material such as polyethylene or nylon having flexibility and fuel-impermeability, is positioned in an interior 4 defined by the upper and lower portions 2 and 3. The film 5 separates the interior 4 into an upper air chamber 6 and a lower fuel chamber 7.

A peripheral portion 5a of the film 5 is sealingly connected to an inner wall face of the tank 1 at a mounting portion 8. Therefore, the peripheral portion 5a of the film 5 is entirely held between the upper and lower portions 2 and 3. The film 5 comprises a plurality of annular corrugated portions 5b which are generally concentric with each other. The corrugated portions 5b are regularly spaced apart from each other. Thus, the longitudinal cross section of the film 5 is in the form of wave. The film 5 is deformable or can be folded along the corrugated portions 5b. The central portion of the film 5 can move up and down with the movement of the surface of the fuel (hereinafter referred to as the "fuel surface") in the fuel chamber 7 with the central portion of the film 5 sealingly contacting with the fuel surface.

The air chamber 6 is in communication with the atmosphere via an air chamber pressure control valve (hereinafter referred to as the "ACP control valve") 9 for controlling the pressure in the air chamber 6 (hereinafter referred to as the "air chamber pressure") and an air cleaner 10. The ACP control valve 9 comprises a pair of a positive pressure relief valve (hereinafter referred to as the "PP relief valve") 11 and a negative pressure relief valve (hereinafter referred to as the "NP relief valve") 12. The PP relief valve 11 opens when the air chamber pressure exceeds a predetermined positive pressure. The NP relief valve 12 opens when the air chamber pressure becomes lower than a predetermined pressure.

A refuel pipe 13 is sealingly connected to the fuel chamber 7. A refuel pipe cap 14 is removably attached to an upper opening 13a of the pipe 13. Seal members 15 and 16, and a vapor shut-off valve 17 are positioned in the pipe 13 adjacent the opening 13a thereof. The seal member 15 is in contact with an outer periphery of the cap 14 when the cap 14 is attached to the opening 13a of the pipe 13. The seal member 16 is in contact with an outer periphery of a fuel nozzle (not shown) inserted into the pipe 13 during the refueling operation. The vapor shut-off valve 17 is biased by a spring (not shown) to normally close the pipe 13 and to prevent fuel vapor from being discharged from the pipe 13 to the atmosphere.

The fuel chamber 7 comprises a fuel pump chamber 18 defined by the lower portion 3 protruding outwardly from the flange portion 2a of the upper portion 2. A fuel pump 19, a fuel pressure regulator 20, and a fuel filter 21 are positioned in the pump chamber 18. The regulator 20 regulates pressure of fuel pumped by the pump 19. The regulated fuel is fed to fuel injectors 44 via a fuel feeding pipe 22. In the first embodiment, the regulator 20 is positioned in the pump chamber 18 which is in communication with the fuel chamber 7 so that a fuel return passage, which extends to the tank 1 from a fuel dispensing pipe (not shown) for dispensing fuel from the fuel feeding pipe 22 to each fuel injector 44, can be eliminated. Therefore, there is no possibility that fuel which includes fuel vapor, generated by heat around a cylinder head (not shown), returns to the tank 1. Thus, an amount of the vapor in the tank 1 is kept low. Further, in the first embodiment, the pump 19 is positioned in the tank 1 so that noise discharged from the pump 19 to the outside of the tank 1 is kept low.

A circulation pipe 23 opens to an upper portion of the refuel pipe 13 above a lower opening 13b of the refuel pipe 13. The circulation pipe 23 opens to the fuel chamber 7 under the mounting portion 8. An upper space of the pump chamber 18 is connected to the refuel pipe 13 above the opening of the circulation pipe 23 via a fuel vapor pipe 24. The refuel pipe 13 around the opening of the vapor pipe 24 is connected to the charcoal canister 26 via a fuel vapor discharge pipe 25. A fuel leakage restrict valve 27 and a fuel chamber pressure control valve (hereinafter referred to as the "FCP control valve") 28 are positioned in the vapor discharge pipe 25. The fuel leakage restrict valve 27 restricts the fuel in the fuel chamber 7 from flowing to the outside of the fuel chamber 7 via the vapor discharge pipe 25. The FCP control valve 28 controls the pressure in the fuel chamber (hereinafter referred to as the "fuel chamber pressure") 7. The FCP control valve 28 comprises a pair of check valves 29 and 30. The vapor can flow through the check valves 29 and 30 in different directions.

The canister 26 comprises an activated carbon layer 31 which can adsorb the vapor. A vapor chamber 32 is formed in one side of the layer 31. An air chamber 33 is formed in other side of the layer 31. The vapor discharge pipe 25 and a purge pipe 34 are connected to the vapor chamber 32. The air chamber 33 is in communication with the atmosphere via the air cleaner 35. Therefore, the vapor produced in the fuel chamber 7, the refuel pipe 13 and the fuel pump chamber 18 is introduced into the canister 26 via the fuel vapor pipe 24 and the vapor discharge pipe 25 and is adsorbed on the activated carbon layer 31. Thus, the vapor is prevented from being discharged to the atmosphere.

In FIG. 1, reference number 40 is an engine of a vehicle, 41 is an intake pipe of the engine 40, 42 is an exhaust pipe of the engine 40, 43 is a throttle valve 43 positioned in the intake pipe 41, and 44 is one of an injector positioned in the intake pipe 41. The purge pipe 34 is connected to the intake pipe 41 downstream of the throttle valve 43 via a purge control valve 45. The injectors 44 and the purge control valve 45 are controlled on the basis of the output signals from an electronic control unit (ECU) 50.

During driving, the vapor adsorbed on the activated carbon layer 31 is purged into the intake pipe 41 depending the engine driving conditions such as an engine load. The purge control valve 45 is closed when the purge operation should be stopped. On the other hand, the purge control valve 45 is opened when the purge operation should be carried out. When the purge control valve 45 is opened, the negative pressure in the intake pipe 41 downstream of the throttle valve 43 acts on the pressure in the canister 26. The negative pressure acted introduces air into the air chamber 33 via an air cleaner 35 and draws the air through the activated carbon layer 31. The air removes the vapor adsorbed on the layer 31. Therefore, the air including the vapor, i.e., the purge gas is drawn into the intake pipe 41 via the purge pipe 34. On the other hand, when the engine is stopped, such as during refueling operation, the purge control valve 45 is kept closed and the purge operation is stopped.

An electronic control unit (ECU) 50 is a digital computer and comprises a read only memory 52 (ROM), a random access memory (RAM) 53, a central processing unit (CPU) 54, a back-up RAM 55, an input port 56 and an output port 47. These components are interconnected by a bidirectional bus 51. A fuel level sensor 58 is positioned in the air chamber 6 of the tank 1. The fuel level sensor 58 can move up and down with the movement of the central portion of the film 5 and generates an output voltage in proportion to the level of the film 5. The output signal of the fuel level sensor 58 is input into the input port 56 via an A-D converter 47. The CPU 54 calculates a fuel amount FA in the fuel chamber 7 on the basis of the output voltage of the fuel level sensor 58. A fuel sensor 60 is positioned on the central portion of the film 5 in the air chamber 6. The fuel sensor 60 detects vapor or fuel in the air chamber 6. An output voltage of the fuel sensor 60 is input into the input port 56 via an A-D converter 61. The output port 57 is connected to the injector 44, the purge control valve 45 and an alarm 63 via a corresponding drive 62. The alarm 63 may comprise a visible alarm such as a lamp or an audible alarm such as a buzzer.

When the refueling operation is carried out, the fuel cap 14 is removed from the upper opening 13a of the refuel pipe 13. When the cap 14 is removed, the vapor shut-off valve 17 is kept closed. Therefore, the vapor is prevented from being discharged from the opening 13a of the pipe 13 to the atmosphere. Then, a fuel nozzle (not shown) is inserted into the opening 13a of the pipe 13 to open the vapor shut-off valve 17 against the biasing force of the spring (not shown) of the valve 17. At this stage, the seal members 15 and 16 are in contact with the peripheral face of the fuel nozzle. Therefore, the vapor is further prevented from being discharged from the opening 13a of the pipe 13 to the atmosphere. Then, the refueling operation is started and the fuel nozzle supplies the fuel chamber 7 with the fuel via the refuel pipe 13.

As the fuel amount in the fuel chamber 7 increases, the fuel surface moves up. The movement of the fuel surface moves the film 5 up. While the film 5 moves up, the film 5 is kept in sealed contact with the fuel surface. Therefore, the volume above the fuel surface is kept almost zero. Thus, the vapor amount in the tank 1 during the refueling operation is kept small. The volume of the air chamber 6 becomes smaller as the film 5 moves up. As a result, the positive air chamber pressure gradually increases. The positive air chamber pressure forces the film 5 toward the fuel chamber 7. Therefore, the film 5 is further kept in sealed contact with the fuel surface. The PP relief valve 11 opens when the air chamber pressure exceeds the opening pressure of the PP relief valve 11. Therefore, the air chamber pressure is kept at the opening pressure of the PP relief valve 11 once the PP relief valve 11 opens. The check valve 29 opens when the fuel chamber pressure exceeds the opening pressure of the check valve 29. Therefore, the fuel chamber pressure is kept at the opening pressure of the check valve once the check valve 29 opens.

During a normal refueling operation, the check valve 29 is kept closed. On the other hand, for example, when the temperature of the fuel supplied from the fuel nozzle is higher than that of the fuel stored in the fuel chamber 7, a large amount of the vapor may be produced in the fuel chamber 7 during the refueling operation. The large amount of the vapor increases the fuel chamber pressure. When the fuel chamber pressure exceeds a predetermined positive pressure lower than the opening pressure of the PP relief valve 11, the check valve 29 opens and the purge control valve 45 is kept closed. Therefore, the vapor is discharged from the fuel chamber 7 and is adsorbed on the activated carbon layer 31 of the canister 26. Thus, during the refueling operation, the upper volume 7a in the fuel chamber 7 is kept small and the film 5 is kept in sealed contact with the fuel surface so that the amount of vapor produced in the fuel chamber 7 is kept small and the vapor is further prevented from being discharged to the atmosphere.

When the fuel surface moves up to the lower opening of the circulation pipe 23 to shut the pipe 23 off, the negative pressure generated around the fuel nozzle is rapidly increased. The fuel nozzle is designed to automatically stop by a large negative pressure in the refuel pipe 13 around the fuel nozzle. Therefore, when the fuel in the fuel chamber 7 shuts the circulation pipe 23, the refueling operation is stopped. Thus, the amount of fuel supplied to the fuel chamber 7 is determined by the level of the lower opening of the circulation pipe 23. In the first embodiment, the lower opening of the circulation pipe 23 is located adjacent the mount portion 8. Therefore, the refueling operation continues until the fuel surface moves up to the mounting portion 8.

Further, in the first embodiment, the refueling operation continues until the central face of the film 5 becomes horizontal. Therefore, almost all the interior 4 in the tank 1 becomes the fuel chamber 7. Thus, the tank 1 can store a large amount of the fuel therein.

When the fuel nozzle is removed from the refuel pipe 13 after the refueling operation is stopped, the vapor shut-off valve 17 is closed. Then, the fuel cap 14 is attached to the upper opening 13a of the refuel pipe 13.

As the amount of the fuel in the fuel chamber 7 decreases during driving, the fuel surface gradually moves down. As a result, the film 5 moves down with the movement of the fuel surface, and the central face of the film 5 projects toward the fuel chamber 7. The film 5 moves down with the central face thereof kept in sealed contact with the fuel surface. Therefore, the amount of vapor in the tank 1 is kept small during driving. The small vapor amount in the tank 1 may allow the size of the canister 26 to be reduced.

As the film 5 moves down, the volume of the air chamber 6 is gradually increased. As a result, the air chamber pressure is gradually decreased. However, as the air chamber pressure is further decreased, the NP relief valve 12 opens. Therefore, the air chamber pressure is kept higher than the negative pressure equal to the opening pressure of the NP relief valve 12.

When the purge operation is carried out during driving, and the difference between the negative pressure in the intake pipe 41 and the fuel chamber pressure exceeds the opening pressure of the check valve 29, the check valve 29 opens to introduce the negative pressure into the fuel chamber 7. However, if the negative fuel chamber pressure becomes extremely large when the amount of the fuel in the fuel chamber 7 is extremely small, the large negative fuel chamber pressure can deform the film 5. The deformation of the film 5 may decrease the durability thereof. In the first embodiment, the FCP control valve 28 comprises a check valve 30 to prevent the negative fuel chamber pressure from becoming very large. The check valve 30 opens when the negative fuel chamber pressure becomes lower than the opening pressure of the NP relief valve 12.

If a hole is formed in the film 5, or the film 5 is removed from the inner wall face of the tank 1, the fuel chamber 7 is in communication with the air chamber 6, i.e., the air chamber 6 acts as the upper space 7a belonging to the fuel chamber 7. Therefore, the production of vapor in the tank 1 cannot be restricted. Further, in the first embodiment, the air in the air chamber 6 is discharged from the air chamber 6 to the atmosphere via the PP relief valve 11 and the air cleaner 10 every refueling operation. As a result, the fuel or vapor leaked from the fuel chamber 7 to the air chamber 6 is discharged into the atmosphere during the refueling operation. Therefore, it is necessary to inform the driver of the communication between the air and fuel chambers 6 and 7.

In the first embodiment, the fuel sensor 60 is positioned in the air chamber 7 to detect the fuel in the air chamber 6. When the air chamber 6 is not in communication with the fuel chamber 7, there is no vapor or fuel in the air chamber 6. Therefore, when the fuel sensor 60 detects any vapor or fuel, it is judged that the air chamber 6 is in communication with the fuel chamber 7. The detection by means of the fuel sensor 60 is carried out every predetermined time interval or every predetermined timing such as a timing when the engine is started or a timing just before the engine is stopped. When the fuel sensor 60 detects fuel in the air chamber 6, the alarm 63 is switched on to inform the driver of the malfunction in the tank 1.

In the first embodiment, the fuel sensor 60 is positioned in the air chamber 6. Therefore, it is possible to accurately diagnose the communication between the air and fuel chambers 6 and 7. Further, the specific gravity of the vapor or fuel is larger than that of the air, and the fuel sensor 60 is positioned on the central portion of the film 5 located at the lowest point in the air chamber 6. Therefore, the accuracy of the detection is further increased. The fuel sensor 60 may be positioned on the inner wall face of the upper portion 2, or be integrally formed with the fuel sensor 58.

Figure 2:
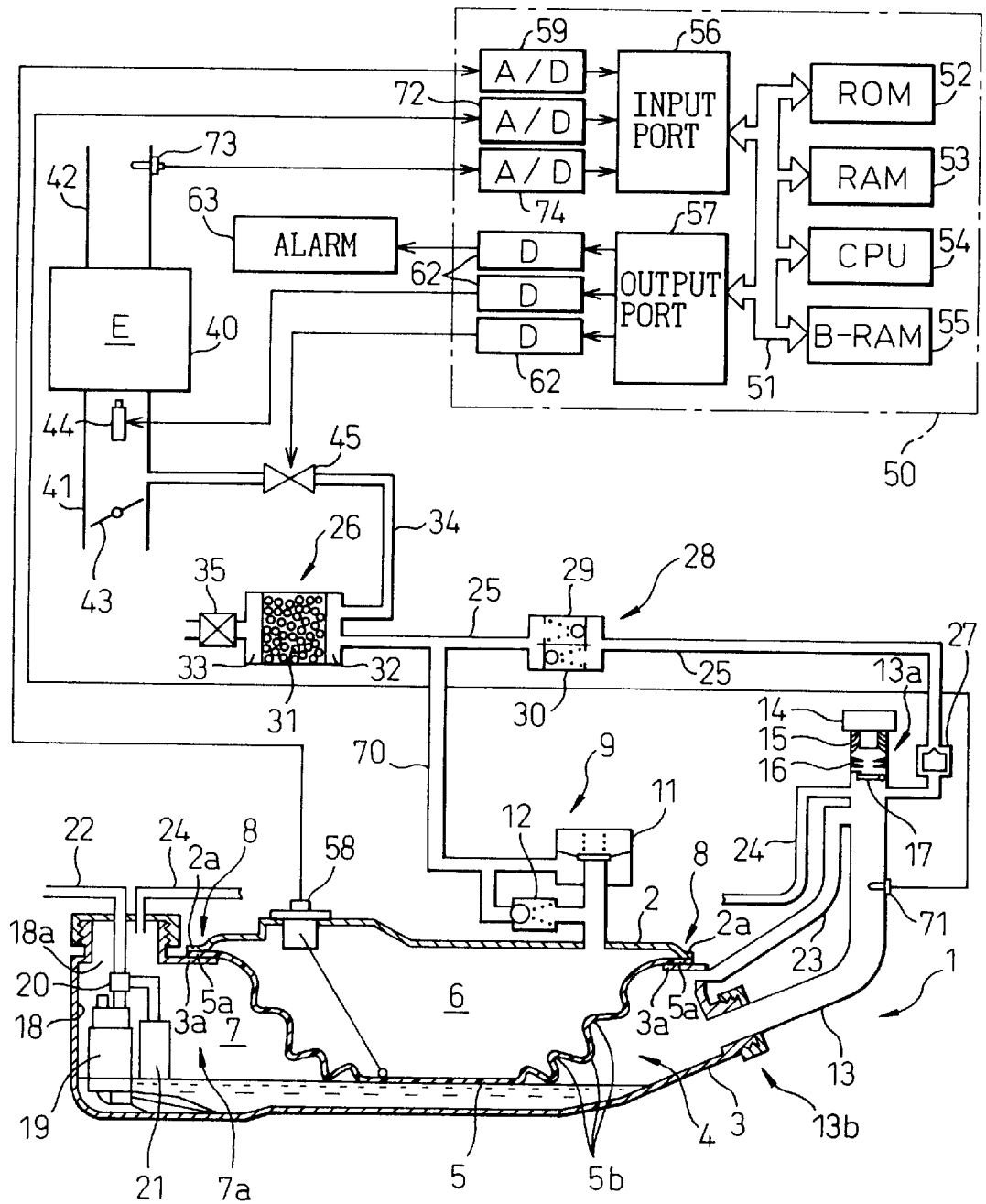
FIG. 2 is a general view of a fuel tank according to the second embodiment of the invention.

A tank according to the second embodiment will be explained, referring to FIG. 2. In FIG. 2, the air chamber 6 is connected to the vapor discharge pipe 25 between the FCP control valve 28 and the canister 26 via the ACP control valve 9 and an air discharge pipe 70. Therefore, the air discharged from the air chamber 6 to the outside of the tank 1 during the refueling operation is introduced into the canister 26 via the PP relief valve 11, air discharge pipe 70 and the vapor discharge pipe 25. The air introduced into the canister 26 is discharged through the activated carbon layer 31 to the atmosphere. A temperature sensor 71 is positioned in the refuel pipe 13 to generate an output voltage in proportion to the temperature of the fuel supplied with the fuel chamber 7 during the refueling operation. The output voltage of the temperature sensor 71 is input into the input port 56 via an A-D converter 72. An air-fuel ratio sensor 73 for detecting the air-fuel ratio is positioned in the exhaust pipe 42. The output voltage of the air-fuel ratio sensor 73 is input into the input port 56 via an A-D converter 74.

The air in the air chamber 6 is discharged to the outside of the tank 1 during the refueling operation. In the second embodiment, the fuel in the air discharged from the air chamber 6 during the refueling operation is detected at the outside of the tank 1 to diagnose the communication between the air and fuel chambers 6 and 7.

In order to detect the fuel in the air discharged from the air chamber 6 during the refueling operation, a fuel sensor may be positioned in the air discharge pipe 70. However, it is not preferable since the ECU 50 must be operated during the refueling operation. In the second embodiment, the fuel in the air chamber 6 is detected by comparing the concentration of the vapor (hereinafter referred to as the "vapor concentration") in the intake air during a purge operation before the refueling operation with that after the refueling operation.

In the second embodiment, the tank 1 comprises the film 5 so that the amount of vapor in the fuel chamber 7 during the refueling operation is kept small. Therefore, little vapor is introduced from the tank 1 to the canister 26 via the vapor discharge pipe 25 and the check valve 29 during the refueling operation. Thus, if the air in the air chamber 6 includes no vapor, the vapor concentration in the intake air during the purge operation before the refueling operation is almost the same as that after the refueling operation. On the other hand, if the air introduced from the air chamber 6 to the canister 26 includes the vapor, the vapor is adsorbed on the activated carbon layer 31. Then, the vapor adsorbed is purged into the intake pipe 41 during the purge operation. Therefore, the vapor concentration in the intake air during the purge operation after the refueling operation is larger than that before the refueling operation by the amount of the vapor stored in the canister 26 during the refueling operation. Thus, it can be diagnosed that the air chamber 6 includes the vapor when the vapor concentration in the intake air during the purge operation after the refueling operation is larger than that before the refueling operation. Therefore, in the second embodiment, it is diagnosed that the fuel chamber 7 is in communication with the air chamber 6 when the air chamber 6 includes the vapor. Then, the alarm 63 is activated.

A calculation of the vapor concentration in the intake air will be explained. In the engine shown in FIG. 2, the fuel injector operation time TAU is calculated on the basis of the following expression:

$$TAU=TB*(1+KG+FAF+FPRG)$$

In the above expression, TB is a basic fuel injector operation time to make the air-fuel ratio a target air-fuel ratio, e.g., the stoichiometric air-fuel ratio, and is stored in the ROM 52 as the function of the engine speed and the amount of the intake air in advance. KG is a correction factor including a correction factor renewed on the basis of the detected air-fuel ratio, a correction factor to increase the amount of the fuel injected from the injector during the acceleration, etc. FAF is a feedback correction factor to make the actual air-fuel ratio the stoichiometric air-fuel ratio on the basis of the output signal of the air-fuel ratio sensor 73. When the target air-fuel ratio is the stoichiometric air-fuel ratio, an oxygen sensor is used as the air-fuel ratio sensor. The oxygen sensor generates an output voltage of about 0.9 volt when the air-fuel ratio is rich and generates an output voltage of about 0.1 volt when the air-fuel ratio is lean. FAF is decreased by a constant value when the air-fuel ratio sensor 73 detects that the air-fuel ratio is rich. On the other hand, FAF is increased by a constant value when the air-fuel ratio sensor 73 detects that the air-fuel ratio is lean. Therefore, FAF changes around 1.0, and the actual air-fuel ratio is kept the stoichiometric air-fuel ratio.

FPRG is a negative product (−PRG*FPG) of a purge ratio PRG and a fuel vapor concentration factor FPG which indicates the vapor concentration in the intake air per unit purge ratio. PRG is a ratio of the amount of the purge gas relative to the intake air and can be calculated from the engine driving condition and the amount of the opening of the purge control valve 45.

FPG will be explained. As the actual air-fuel ratio becomes rich during the purge operation, FAF is gradually decreased to make the actual air-fuel ratio the stoichiometric air-fuel ratio. Therefore, the larger vapor concentration in the intake air leads to a smaller FAF. However, it is not preferable that FAF is largely different from 1.0. Therefore, FPG is gradually increased from zero when FAF becomes smaller than a predetermined threshold during the purge operation to decrease FAF by means of the air-fuel ratio feedback control system.

When FAF becomes 1.0 during the purge operation, FPG accurately indicates the vapor concentration in the intake air per unit purge ratio. Therefore, FPRG (=−PRG*FPG) indicates the vapor concentration in the intake air. Japanese Unexamined Patent Publication No. 5-52139 discloses a method of calculating the fuel vapor concentration in the intake air in detail.

In the second embodiment, the malfunction in the tank is diagnosed on the basis of the air-fuel sensor 73 which is normally used in the engine 40. Therefore, an additional sensor is not necessary.

A routine of a refuel diagnosis according to the second embodiment will be explained, referring to FIG. 3. The routine is carried out every time the engine is started. In FIG.

3, at step 80, BFA, which is memorized in B-RAM 55, is memorized as FABS. BFA indicates the fuel amount in the fuel chamber 7 just before the engine is stopped. Next, at step 81, the fuel amount FA in the fuel chamber 7 just after the engine is started is memorized as FAAS. Next, at step 82, it is judged if the fuel amount FAAS after the engine is started is larger than the fuel amount FABS before the engine is stopped and the difference in these fuel amounts FAAS and FABS is larger than a predetermined value FA1. That is, it is judged if FAAS−FABS is larger than FA1 (FAAS−FABS>FA1). When FAAS−FABS>FA1, it is judged that the refueling operation has been carried out while the engine was stopped and the routine proceeds to step 83 where the refuel flag is set. On the other hand, when FAAS−FABS≦FA1, it is judged that a refueling operation has not been carried out and the routine proceeds to step 84 where the refuel flag is reset.

Figure 4:
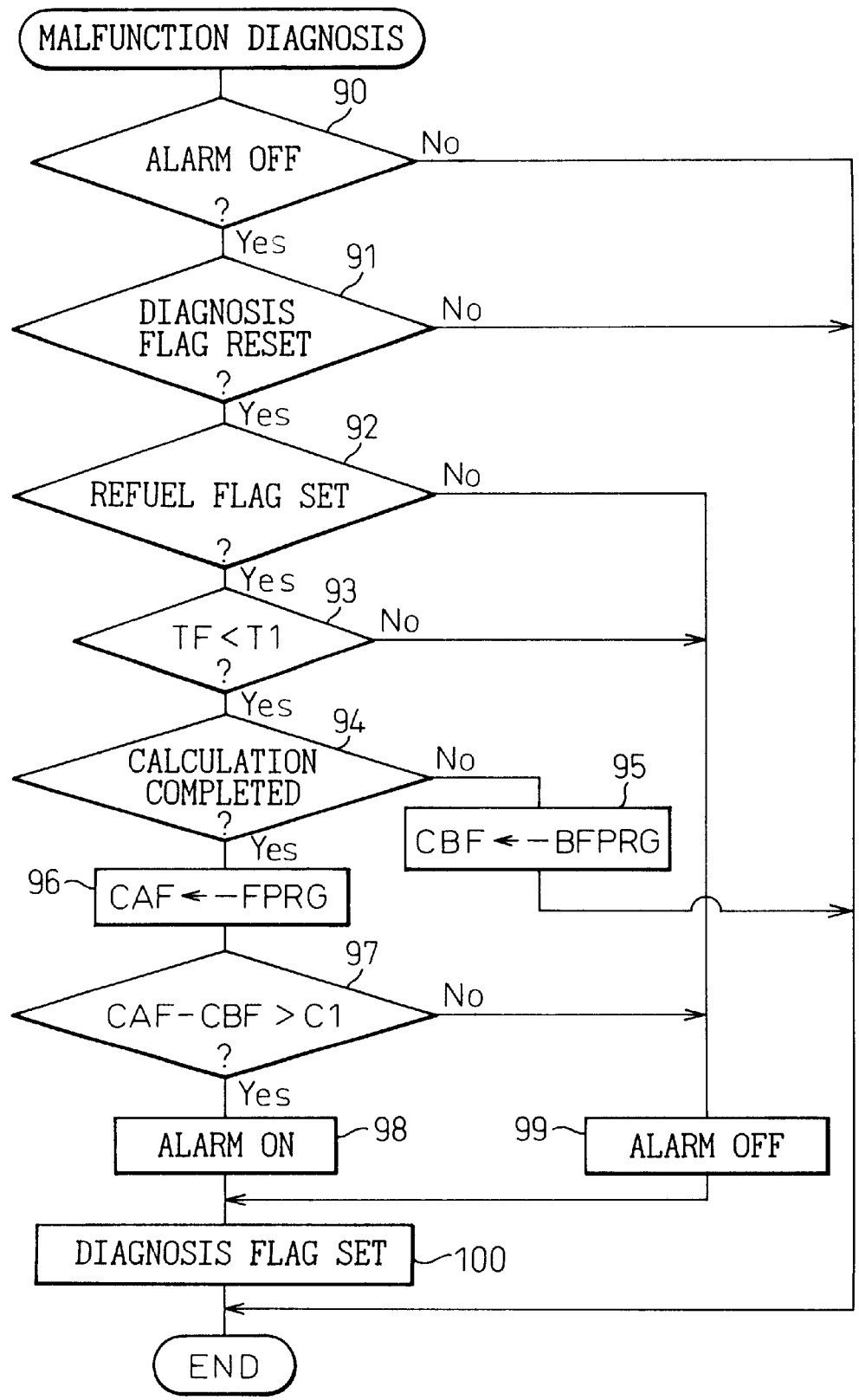
FIG. 4 is a flowchart illustrating a routine of a malfunction diagnosis according to the second embodiment of the invention.

A malfunction diagnosis in the tank according to the second embodiment will be explained, referring to FIG. 4. The routine is carried out at predetermined time intervals. In FIG. 4, at step 90, it is judged if the alarm 63 is switched off. The data for switching the alarm 63 on is memorized in the B-RAM 55. Therefore, once the alarm 63 is switched on, the alarm 63 is kept switched on until the malfunction in the tank is repaired. When the alarm 63 is switched on, the routine is ended. On the other hand, when the alarm 63 is switched off, the routine proceeds to step 91.

At step 91, it is judged if a diagnosis flag is reset. The diagnosis flag is set when the malfunction diagnosis is completed or cannot be carried out, and is reset every time the engine is started. Therefore, the routine proceeds to step 92 just after the engine is started. When the diagnosis flag is set, the routine is ended.

Figure 3:
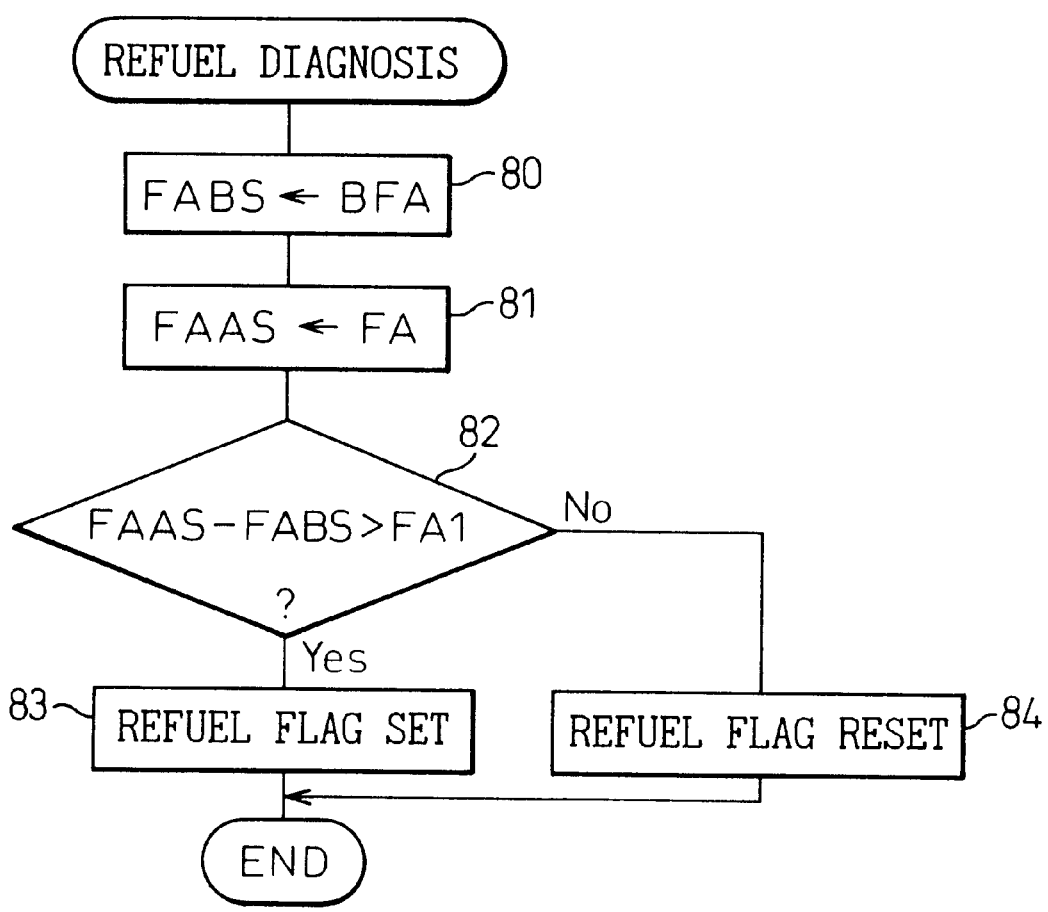
FIG. 3 is a flowchart illustrating a routine of a refuel diagnosis according to the second embodiment of the invention.

At step 92, it is judged if the refuel flag which is set or reset in the routine shown in FIG. 3 is set. When the refuel flag is set, it is judged that the refueling operation has been completed, and the routine proceeds to step 93. On the other hand, when the refuel flag is reset, it is judged that the refueling operation has not been carried out, and the routine proceeds to step 99.

At step 93, it is judged if the temperature TF of the fuel supplied to the fuel chamber 7 during the refueling operation is lower than a predetermined temperature T1 (TF<T1). As discussed in the above, if the temperature of the fuel supplied to the fuel chamber 7 is high, a large amount of vapor is produced in the fuel chamber 7. The vapor produced is introduced into the canister 26 via the vapor discharge pipe 25 and is adsorbed on the activated carbon layer 31. Therefore, in this case, the vapor concentration in the intake air during the purge operation after the refueling operation is larger than that before the refueling operation. Thus, the malfunction cannot be accurately diagnosed. In the second embodiment, when the fuel temperature TF is equal to or higher than the predetermined temperature T1, the malfunction diagnosis is forbidden. Only when the fuel temperature TF is lower than the predetermined temperature T1, the malfunction diagnosis is carried out. Therefore, when TF<T1, the routine proceeds to step 94. On the other hand, when TF≧T1, the routine proceeds to step 99.

At step 94, it is judged if the calculation of the vapor concentration in the intake air has been completed. In the second embodiment when FAF becomes 1.0 during the purge operation after the refueling operation, it is judged that the calculation of the vapor concentration in the intake air has been completed. At step 94, when the calculation has not been completed, the routine proceeds to step 95 where the negative value of BFPRG memorized in the B-RAM 55 is memorized as CBF, and the routine is ended. BFPRG is the purge correction factor which is calculated during the purge operation just before the refueling operation. On the other hand, at step 94, when the calculation of the vapor concentration in the intake air has been completed, the routine proceeds to step 96 where the negative value of FPRG is memorized as CFA. CFA indicates the vapor concentration in the intake air after the refueling operation.

At step 97, it is judged if the difference CAF−CBF between CAF and CBF is larger than a predetermined concentration C1 (CAF−CBF>C1). When CAF−CBF>C1, it is judged that the vapor is included in the air introduced into the canister 26 from the air chamber 6 during the refueling operation, and the film 5 has malfunction, the routine proceeds to step 98 where the alarm 63 is switched on, and the routine proceeds to step 100.

When the refuel flag is reset at step 92 or TF≧T1 at step 93, i.e., when it is judged that the malfunction diagnosis cannot be carried out, or when CAF−CBF≦C1 at step 97, i.e., when it is judged that the film 5 has no malfunction, the routine proceeds to step 99 where the alarm 63 is switched off, the routine proceeds to step 100 where the diagnose flag is set, and the routine is ended.

In the second embodiment, the malfunction in the film may be diagnosed on the basis of a difference in the concentration of vapor in the fuel chamber before and after the purge operation is started. If the film has no malfunction, the concentration of vapor in the fuel chamber before the purge operation is started becomes smaller than that after the purge operation is started since the amount of vapor in the fuel chamber is kept small. Therefore, in this case, it is judged that the film has malfunction when the concentration of vapor in the fuel chamber before the purge operation is started does not become smaller than that after the purge operation is started.

Further, in the second embodiment, the malfunction in the film may be diagnosed by comparing the concentration of vapor in the fuel tank with a predetermined concentration during the purge operation. If the film has no malfunction, the concentration of vapor in the fuel tank is kept smaller than a predetermined concentration since the amount of vapor in the fuel chamber is kept small. Therefore, in this case, it is diagnosed that the film has malfunction when the concentration of vapor in the fuel tank is larger than the predetermined concentration.

Further, in the second embodiment, the air discharge pipe 70 is connected to the canister 26, and the vapor in the air chamber 7 is stored in the canister 26 during the refueling operation. However, the air discharge pipe 70 may be connected to the purge pipe 34 upstream of the purge control valve 45 and not through the canister 26, and the vapor in the air chamber 6 may be stored in the purge pipe 34 or the air discharge pipe 70. Further, a large volume may be provided in the air discharge pipe 70 to store the fuel vapor therein, In this case, the canister is not necessary. The structures and functions other than those described regarding the second embodiment are the same as those of the first embodiment, and an explanation thereof will be eliminated.

Figure 5:
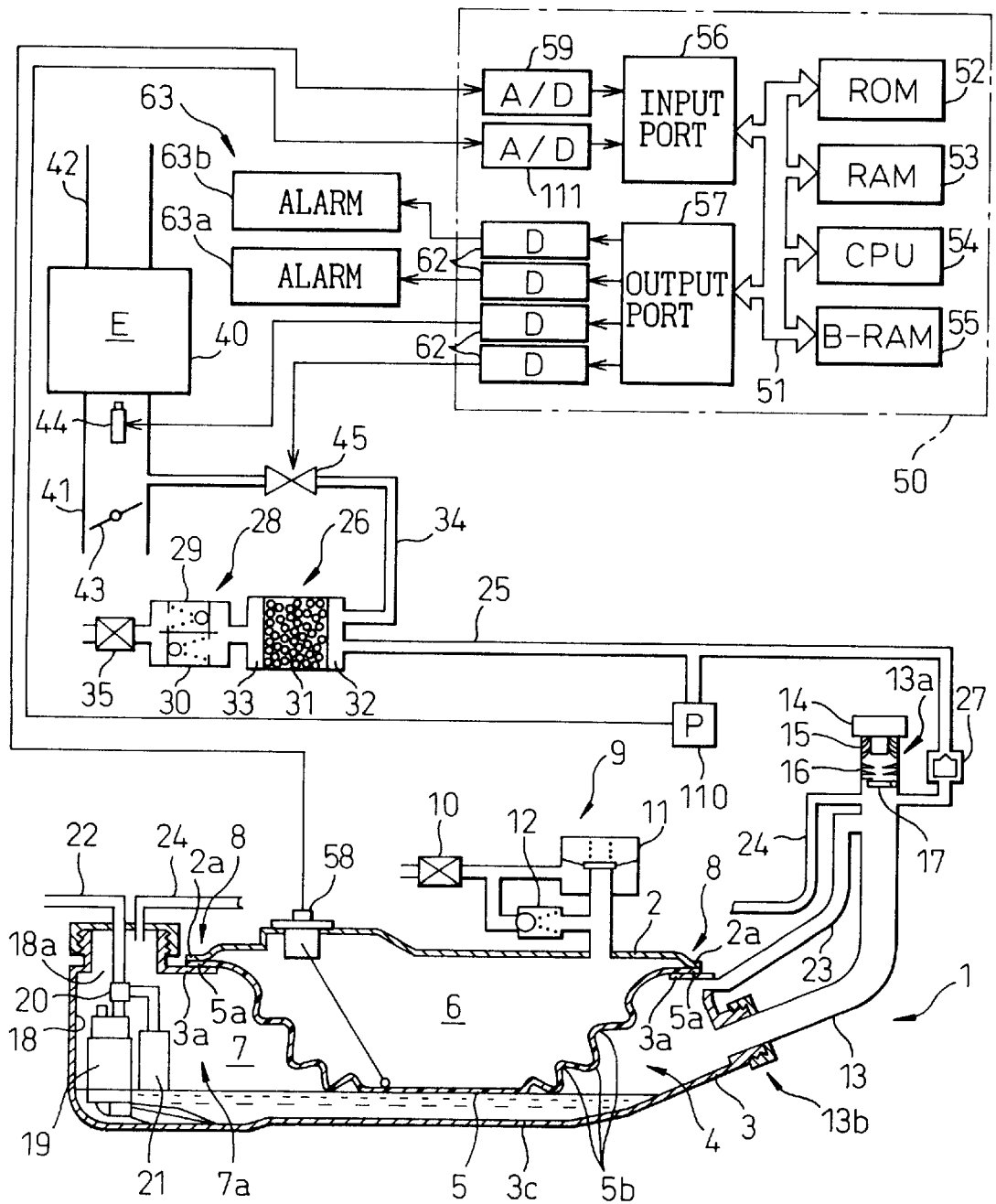
FIG. 5 is a general view of a fuel tank according to the third embodiment of the invention.

A tank according to the third embodiment will be explained, referring to FIG. 5. In FIG. 5, the FCP control valve 28 is positioned between the air chamber 33 and the air cleaner 35 of the canister 26. A pressure sensor 110 is positioned in the vapor discharge pipe 25. The pressure sensor 110 generates an output voltage in proportion to the fuel chamber pressure. The output voltage of the pressure sensor 110 is input into the input port 56 via an A-D converter 111. Further, the alarm 63 comprises an alarm 63*a* which is switched on when the malfunction of the tank 1, such as the communication between the air and fuel chambers 6 and 7, is detected, and an alarm 63b which is switched on when the malfunction of the tank 1, such as the communication between the fuel chamber 7 and the atmosphere, is detected. These alarms 63a and 63b are connected to the output port 62 via corresponding drive 62.

In the third embodiment, the negative pressure in the intake pipe 41 downstream of the throttle valve 43 is introduced into the canister 26 and the fuel chamber 7 during the purge operation. As the negative fuel chamber pressure becomes larger than the opening pressure of the check valve 30, the check valve 30 opens. As a result, during the purge operation, the fuel chamber pressure is kept at the negative pressure P30 determined by the opening pressure of the check valve 30. The air chamber pressure is kept at the negative pressure P12 determined by the opening pressure of the NP relief valve 12 except for just after the refueling operation. In the third embodiment, the negative pressure P12 is higher than the negative pressure P30. According to this relationship between the negative pressures, the difference in the negative pressures biases the film 5 toward the fuel surface to keep the film in sealed contact with the fuel surface.

In the third embodiment, the purge valve 45 is temporally kept closed during the purge operation to diagnose the communication between the air and fuel chambers 6 and 7, or between the fuel chamber 7 and the atmosphere. When the purge valve 45 is closed, the check valves 29 and 30 are kept closed so that the fuel chamber 7 is kept sealed. Further, the PP and NP relief valves 11 and 12 are kept closed so that the air chamber 6 is kept sealed. In this condition, the fuel chamber pressure PF is slowly increased toward the air chamber pressure P12 if the fuel chamber 7 is not in communication with the air chamber 6 or the atmosphere. However, the fuel chamber pressure PF is rapidly increased to the air chamber pressure P12 if the fuel chamber 7 is in communication with the air chamber 6 via a hole formed in the film 5. Moreover, the fuel chamber pressure PF is rapidly increased to the atmosphere pressure ATM if the fuel chamber 7 is in communication with the atmosphere via a hole formed in the lower portion 3. Therefore, it is possible to diagnose the communication between the air and fuel chambers 6 and 7, or between the fuel chamber 7 and the atmosphere by detecting the pressure increase in the fuel chamber 7 when the air and fuel chambers 6 and 7 are sealed. Further, the fuel chamber pressure change instead of the air chamber pressure change may be used to diagnose malfunction in the film.

The fuel chamber pressure increase when the air and fuel chambers are sealed will be explained, referring to FIG. 6. As the purge operation is started, the fuel chamber pressure PF is rapidly decreased, and is kept at the pressure P30 during the purge operation. Then, the purge operation is stopped and the purge valve 45 is closed to seal the fuel chamber 7 at time 0, as a reference time, in FIG. 6. If the fuel chamber 7 is not in communication with the air chamber 6 or the atmosphere, the pressure PF is slowly increased or is generally unchanged as shown by the curve NF in FIG. 6, and is lower than a threshold PX at time a. The threshold PX is between the pressures P30 and P12. On the other hand, if the fuel chamber 7 is in communication with the air chamber 7 or the atmosphere, the fuel chamber pressure PF is rapidly increased as shown by the curve OA or AC in FIG. 6, and exceeds the threshold PX at time a. Therefore, it is judged that the fuel chamber 7 is in communication with the air chamber 6 or the atmosphere when PF>PX at time a. On the other hand, it is judged that the fuel chamber 7 is not in communication with the air chamber 6 and the atmosphere when PF≧PX at time a.

Figure 6:
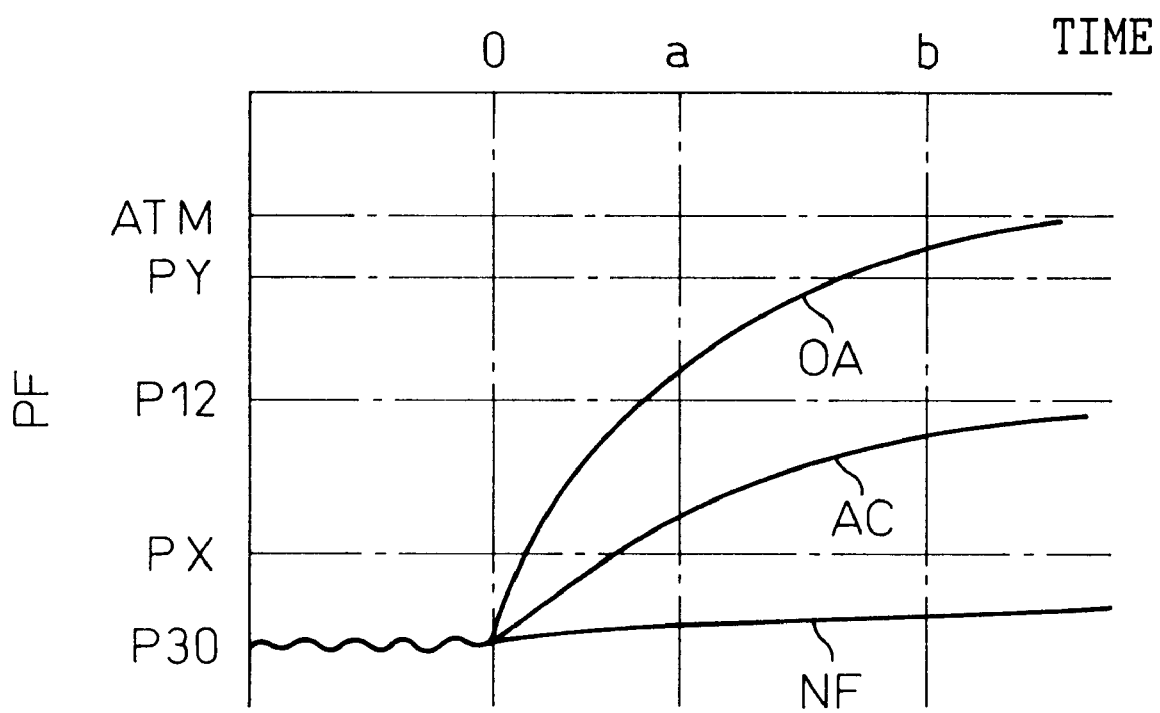
FIG. 6 is a time chart of pressure changes in the fuel chamber.

If the fuel chamber 7 is in communication with the atmosphere, the fuel chamber pressure PF is increased toward the atmosphere pressure ATM, and exceeds a threshold PY at time b as shown by the curve OA in FIG. 6. The threshold PY is between the pressure P12 and the atmosphere pressure ATM. On the other hand, if the fuel chamber 7 is in communication with the air chamber 6, the fuel chamber pressure PF is increased toward the pressure P12, and is lower than the threshold PY at time b as shown by the curve AC in FIG. 6. Therefore, it is judged that the fuel chamber 7 is in communication with the atmosphere when PF>PY at time b. On the other hand, it is judged that the fuel chamber 7 is in communication with the air chamber 6 when PF≦PY at time b. The alarm 63b is switched on when PF>PY at time b, and the alarm 63a is switched on when PF≦PY at time b. When the malfunction diagnosis is completed, the purge operation is started.

Figure 7:
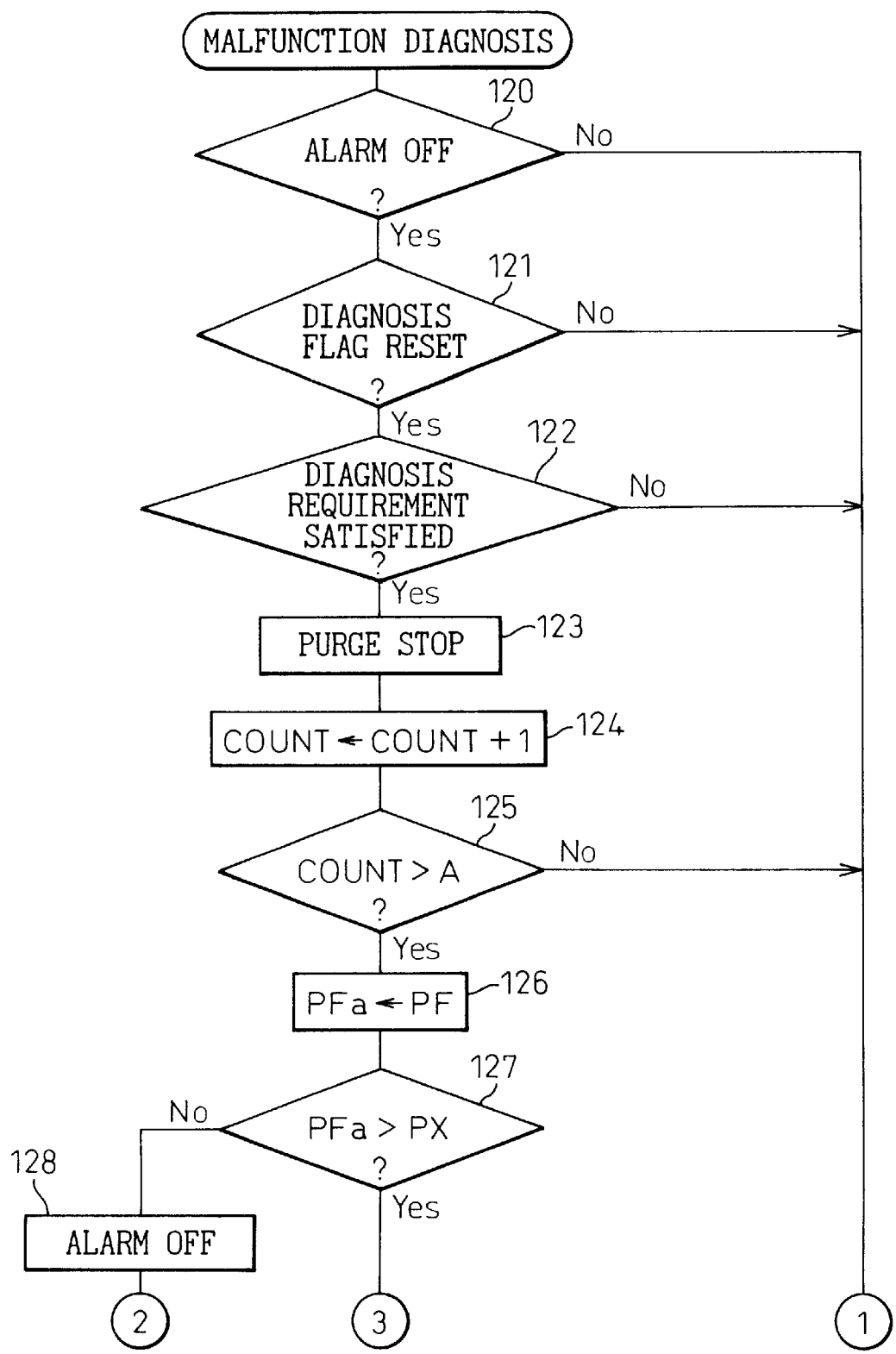
FIG. 7 is a part of a flowchart illustrating a routine of a malfunction diagnosis according to the third embodiment of the invention.

A malfunction diagnosis according to the third embodiment will be explained, referring to FIG. 7. The routine is carried out every predetermined interval. In FIG. 7, at step 120, it is judged if the alarm 63a or 63b is switched off. When the alarm 63a or 63b is switched on, the routine is ended. On the other hand, when the alarm 63a or 64b is switched off, the routine proceeds to step 121.

At step 121, it is judged if a diagnosis flag is reset. The diagnosis flag is set when the malfunction diagnosis is completed or cannot be carried out and is reset every time the engine is started. Therefore, the routine proceeds to step 92 just after the engine is started. When the diagnosis flag is set, the routine is ended.

At step 122, it is judged if diagnosis requirements, in which the malfunction diagnosis can be carried out, are satisfied. The amount of vapor in the fuel chamber 7 is large if the atmosphere pressure is low or the atmosphere temperature is high. In this case, the fuel chamber pressure is increased although the tank 1 has no malfunction. Further, as the fuel chamber pressure rapidly changes up and down when the purge operation should be stopped to diagnose the malfunction in the tank 1, the malfunction cannot be accurately diagnosed. Further, the air chamber pressure may be higher than the threshold PY just after the refueling operation, the malfunction cannot be accurately diagnosed. In the third embodiment, it is judged that the diagnosis requirements are satisfied when the purge operation is carried out, and when the amount of vapor in the fuel chamber 7 is small, and when the air and fuel chamber pressures are generally constant after the purge operation is started. When the diagnosis requirements are satisfied, the routine proceeds to step 123. On the other hand, when the diagnosis requirements are not satisfied, the routine is ended.

At step 123, the purge valve is closed to stop the purge operation and seal the fuel chamber 7. Next, at step 124, the count value COUNT is increased by 1. COUNT indicates the time elapsed since the stop of the purge operation. At step 125, it is judged if COUNT is larger than a predetermined value A (COUNT>A), i.e., if the time a in FIG. 6 has elapsed since the stop of the purge operation. When COUNT≦A, the routine is ended. On the other hand, when COUNT>A, the routine proceeds to step 126 where the present fuel chamber pressure PF is memorized as PFa. Next, at step 127, it is judged if the PFa is larger than the predetermined threshold PX (PFa>PX). When PFa≦PX, it is judged that the fuel chamber 7 is not in communication with the air chamber 6 or the atmosphere, i.e., the tank 1 has no malfunction, the routine proceeds to step 128 where the alarm 63*a*, 63*b* is switched off, and the routine proceeds to step 134. On the other hand, when PFa>PX, it is judged that the fuel chamber 7 is not in communication with the air chamber 6 or the atmosphere, and the routine proceeds to step 129 in FIG. 8.

Figure 8:
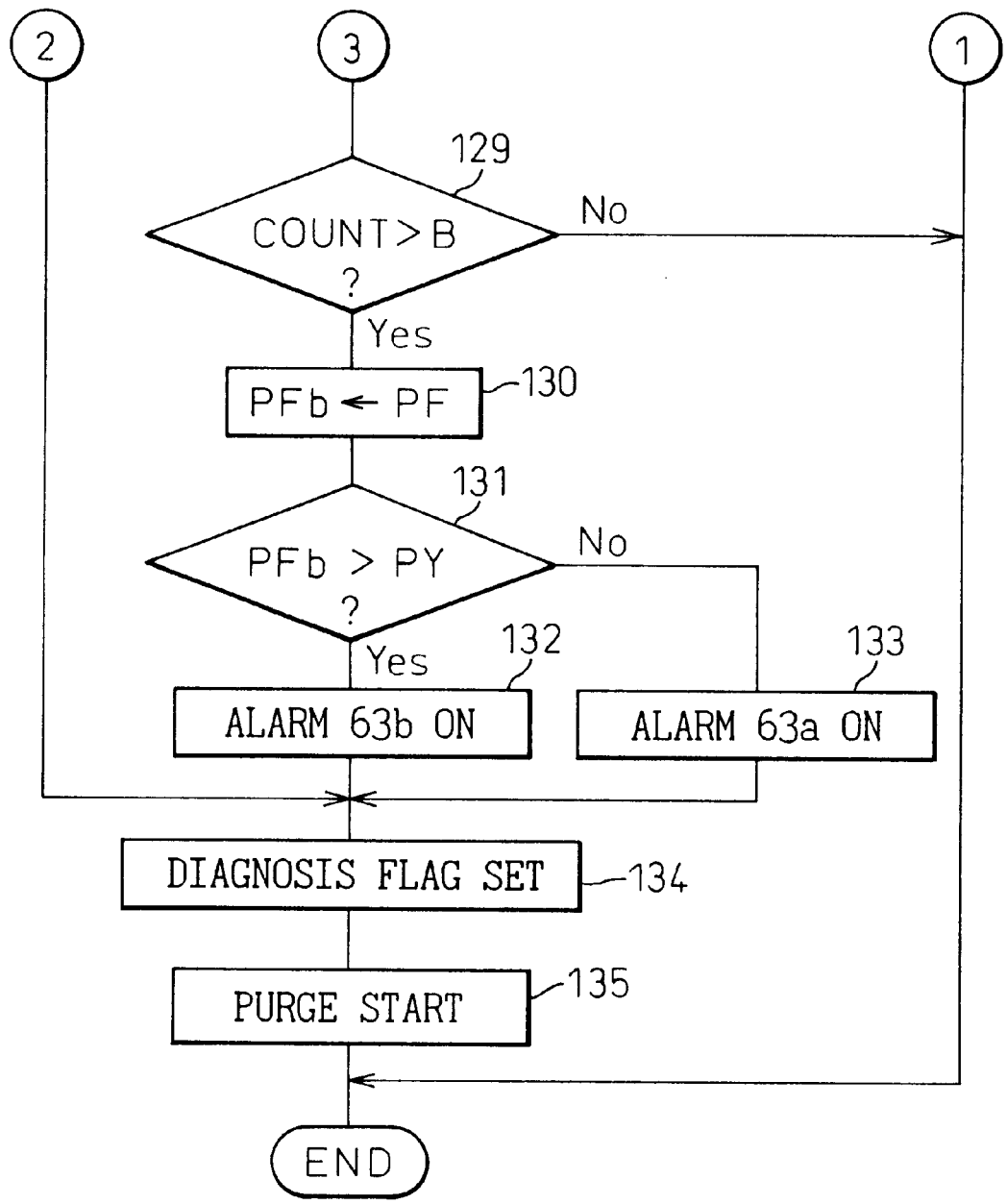
FIG. 8 is a part of a flowchart illustrating a routine of a malfunction diagnosis according to the third embodiment of the invention.

In FIG. 8, at step 129, it is judged if COUNT is larger than a predetermined value B (COUNT>B) which is larger than the predetermined value A, i.e., if the time b in FIG. 6 has elapsed since the stop of the purge operation. When COUNT≦B, the routine is ended. On the other hand, when COUNT>B, the routine proceeds to step 130 where the present fuel chamber pressure PF is memorized as PFb. Next, at step 131, it is judged if PFb is larger than the predetermined threshold PY (PFb>PY). When PFB>PY, it is judged that the fuel chamber 7 is in communication with the atmosphere, and the routine proceeds to step 132 where the alarm 63*b* is switched on, and the routine proceeds to step 134. On the other hand, when PFb≦PY, it is judged that the fuel chamber 7 is in communication with the air chamber 6, the routine proceeds to step 133 where the alarm 63*a* is switched on, and the routine proceeds to step 134.

At step 134, the diagnosis flag is set, the routine proceeds to step 135 where the purge operation is started, and the routine is ended. The structures and functions other than those described regarding the third embodiment are generally the same as those of the first embodiment, and an explanation thereof will be eliminated.

Figure 9:
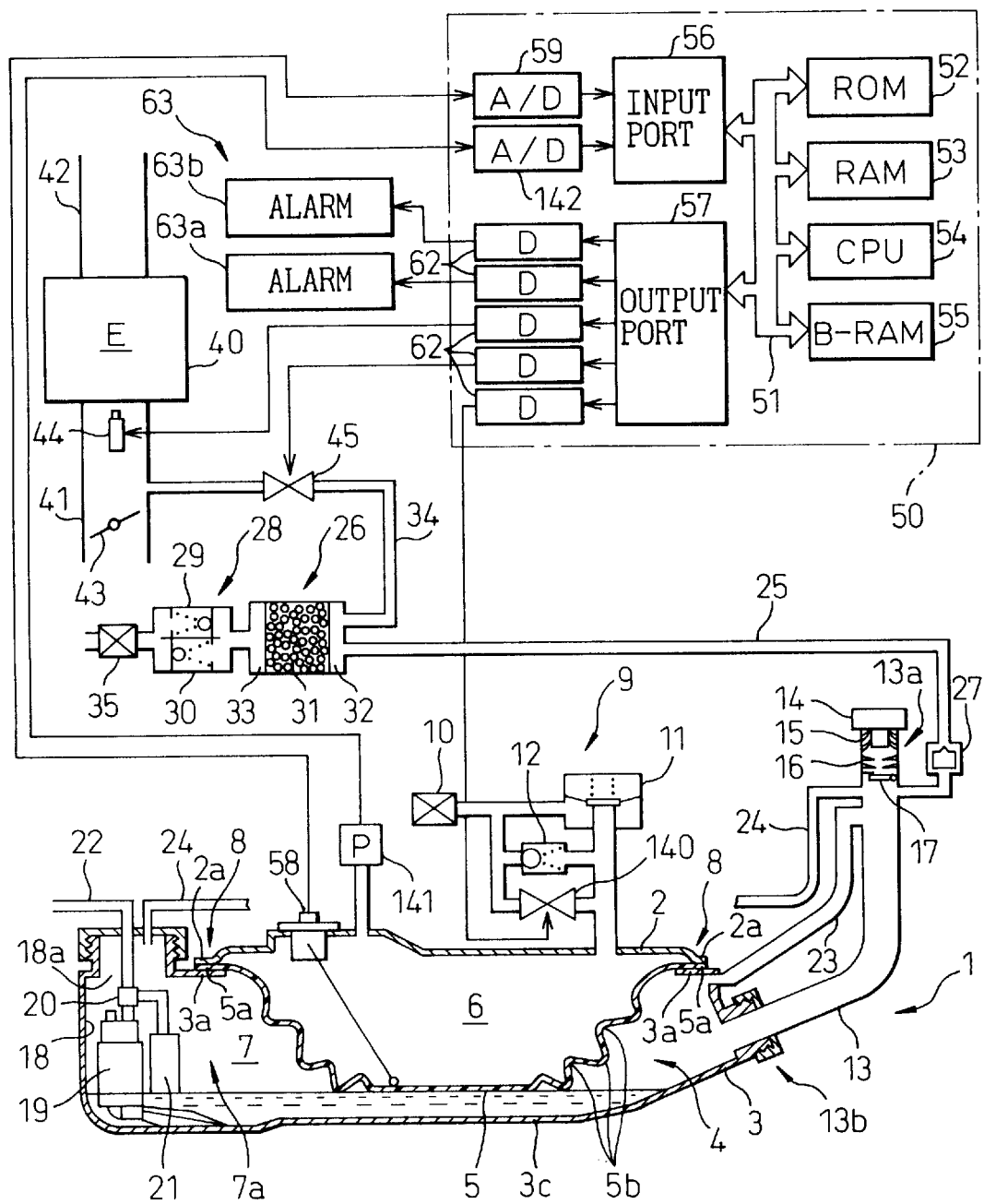
FIG. 9 is a general view of a fuel tank according to the fourth embodiment of the invention.

A tank according to the fourth embodiment will be explained, referring to FIG. 9. In FIG. 9, the air chamber 6 is connected to the atmosphere via an atmosphere pressure introduction valve (hereinafter referred to as the "AP introduction valve"). A pressure sensor 141 is positioned at a position of the upper portion 2 which will not contact with the fuel in the fuel chamber 7. The AP introduction valve 140 is normally kept closed and connected to the output port 57 via a drive 62. The AP 140 is controlled by the output signals of the ECU 50. The pressure sensor 141 generates an output voltage in proportion to the air chamber pressure. The output voltage of the pressure sensor 141 is input into the input port 56 via an A-D converter 142.

Figure 11:
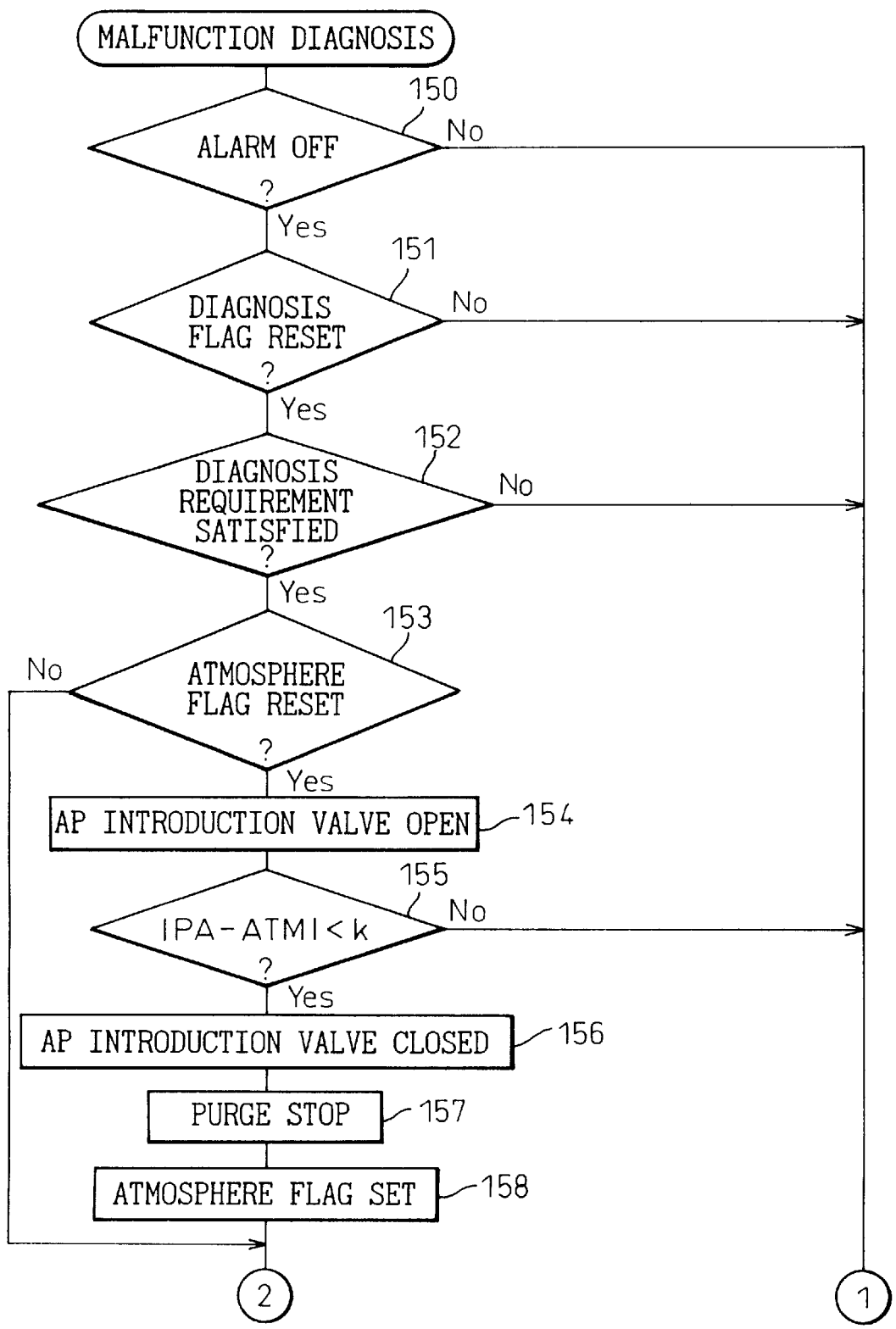
FIG. 11 is a part of a flowchart illustrating a routine of a malfunction diagnosis according to the fourth embodiment of the invention.
Figure 12:
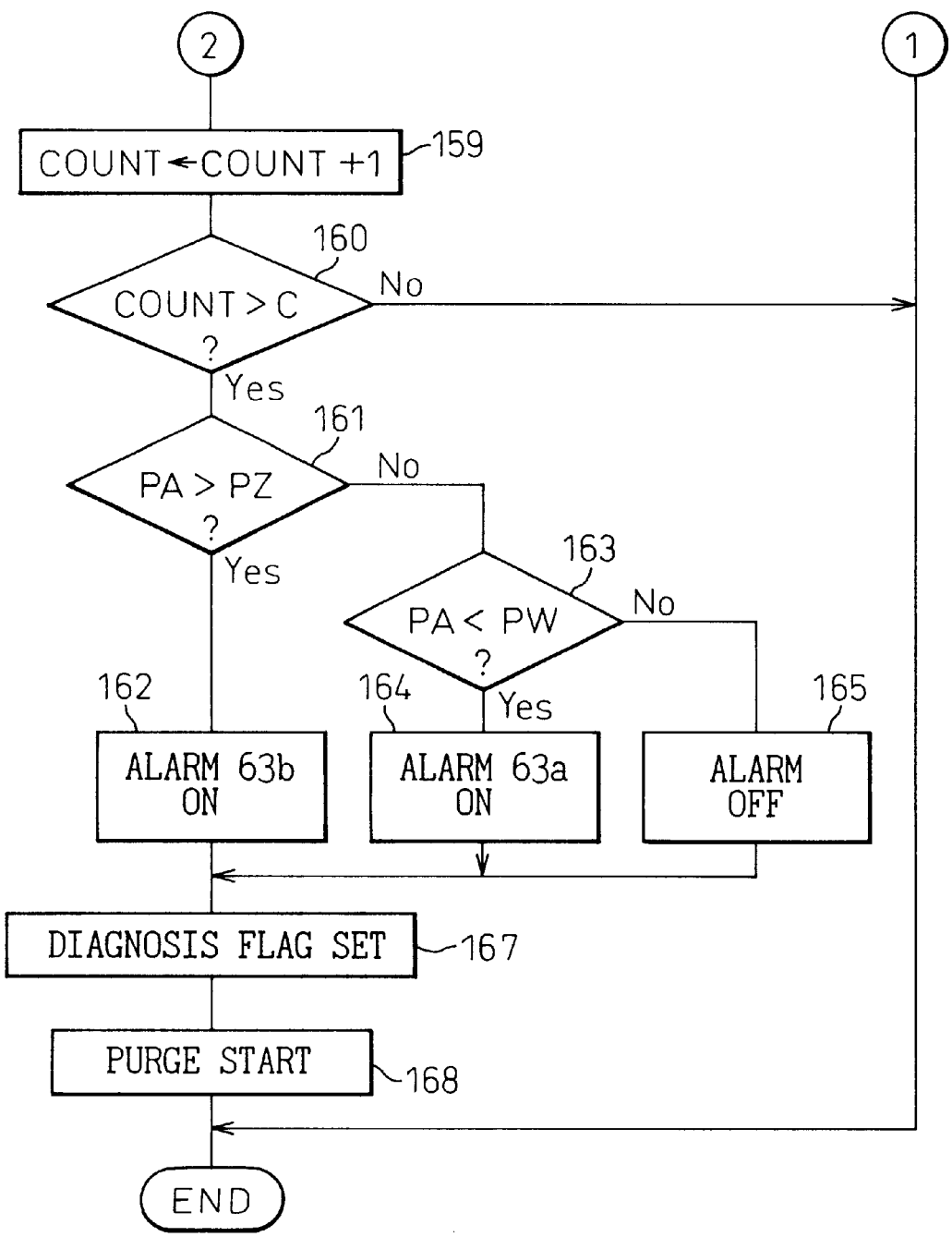
FIG. 12 is a part of a flowchart illustrating a routine of a malfunction diagnosis according to the fourth embodiment of the invention.

A malfunction diagnosis of the tank according to the fourth embodiment will be explained, referring to FIGS. 10, 11 and 12. Steps 150, 151, 152 in FIG. 11 corresponds to steps 120, 121, 122 in FIG. 7, and an explanation thereof will be eliminated. In the fourth embodiment, when the alarm 63*a*, 63*b* is off, when the diagnosis flag is reset, and when the diagnosis requirements are satisfied, the routine proceeds to step 153. At that time, i.e. before time d in FIG. 10, the AP introduction valve 140 is closed, and the air chamber pressure PA is generally kept at the pressure P12.

At step 153, it is judged if an atmosphere pressure flag is reset. As described below, in the fourth embodiment, the atmosphere pressure is temporally introduced into the air chamber 6 to diagnose the malfunction in the tank 1. The atmosphere pressure flag is set when the atmosphere pressure is introduced into the air chamber 6, and is reset when the engine 40 is started. Therefore, just after the engine 40 is started, the routine proceeds to step 154.

Figure 10:
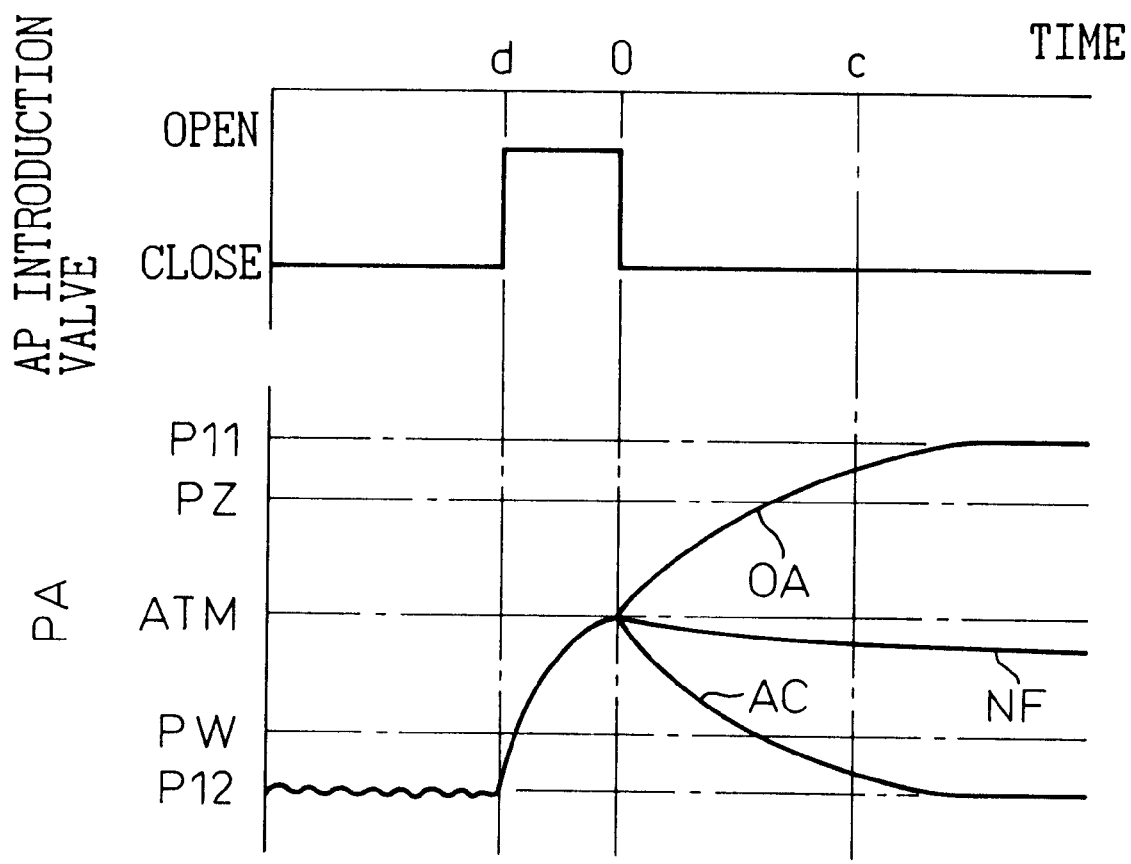
FIG. 10 is a time chart of pressure changes in the fuel chamber.

At step 154, the AP introduction valve 140 is opened to introduce the atmosphere pressure into the air chamber 6 at time d in FIG. 10. As a result, the air chamber pressure PA is rapidly increased toward the atmosphere pressure ATM. Next, at step 155, it is judged if an absolute value of the difference |PA−ATM| between the air chamber pressure PA and the atmosphere pressure ATM is smaller than a constant k which is very small (|PA−ATM|<k), i.e., if the air chamber pressure PA is generally equal to the atmosphere pressure ATM. When |PA−ATM|≧k, the AP introduction valve 140 is opened, and the routine is ended. On the other hand, when |PA−ATM|<k, the routine proceeds to step 156 where the AP introduction valve 140 is closed.

Next, at step 157, the purge operation is stopped at time 0, as a reference time in FIG. 10, to seal the air and fuel chambers 6 and 7. Next, at step 158, the atmosphere pressure flag is set. Therefore, once |PA−ATM|<k, the routine is jumped from step 153 to step 159.

At step 159, the air chamber pressure PA is generally equal to the atmosphere pressure ATM, and the fuel chamber pressure is generally equal to the pressure P30. In this condition, if the fuel chamber 7 is not in communication with the air chamber 6 or the atmosphere, the air chamber pressure PA is slowly decreased toward the opening pressure P12 of the NP relief valve 12 or the fuel chamber pressure P30 as shown by the curve NF in FIG. 10. On the other hand, if the fuel chamber 7 is in communication with the air chamber 6, the air chamber pressure PA is rapidly decreased toward the fuel chamber pressure P12 as shown by the curve AC in FIG. 10, and becomes smaller than a predetermined value FW at time c in FIG. 10. Further, if the fuel chamber 7 is in communication with the atmosphere, the fuel chamber pressure is rapidly increased toward the atmosphere pressure to decrease the volume of the air chamber 6. As a result, the air chamber pressure PA is rapidly increased as shown by the curve OA in FIG. 10, and becomes larger than the threshold PZ at time c in FIG. 10. Therefore, when the time c from the sealing of the air and fuel chambers 6 and 7, i.e., from the stop of the purge operation has elapsed, the fuel chamber 7 is in communication with the atmosphere when PA>PZ, it is judged that the fuel chamber 7 is in communication with the air chamber 6 when PA<PW, and the fuel chamber 7 is not in communication with the air chamber 6 or the atmosphere when PW≦PA≦PZ. Further, the fuel chamber pressure change instead of the air chamber pressure change is used to diagnose malfunction in the film.

The, NP relief valve 12 is opened when the fuel chamber 7 is in communication with the air chamber 6 and the air chamber pressure PA is decreased to become the pressure P12 determined by the opening pressure of the NP relief valve. Therefore, the air chamber pressure PA is kept larger than the pressure P12. Further, the PP relief valve 11 is opened when the fuel chamber 7 is in communication with the atmosphere, and the air chamber pressure PA is increased to become the pressure P11 determined by the opening pressure of the PP relief valve 11. Therefore, the air chamber pressure PA is kept smaller than the pressure P11.

At step 159, the count value COUNT is increased by 1. COUNT indicates the time elapsed since the stop of the purge operation. Next, at step 160, it is judged if COUNT is larger than a predetermined value C (COUNT>C), i.e., if time c in FIG. 10 has elapsed since the stop of the purge operation. When COUNT>C, the routine proceeds to step 161. On the other hand, when COUNT≧C, the routine is ended.

At step 161, it is judged if the air chamber pressure PA is larger than the threshold PZ (PA>PZ). The threshold PZ is a positive pressure lower than the pressure P11. When PA>PZ, the routine proceeds to step 162 where the alarm 63*b* is switched on, and the routine proceeds to step 167. On the other hand, when PA≦PZ, the routine proceeds to step 163 where it is judged if the air chamber pressure PA is smaller than the threshold PW (PA<PW). The threshold PW is a negative pressure higher than the pressure P12. When PA<PW, the routine proceeds to step 164 where the alarm 63*a* is switched on, and the routine proceeds to step 167. On the other hand, when PA≧PW, the routine proceeds to step 165 where the alarm 63a, 63b is switched off, and the routine proceeds to step 167.

At step 167, the diagnosis flag is set, the routine proceeds to step 168 where the purge operation is started, and the routine is ended.

In the fourth embodiment, the direction of the pressure change when the fuel chamber 7 is in communication with the air chamber 6 is different from that when the fuel chamber 7 is in communication with the atmosphere. Therefore, the malfunction can be accurately diagnosed by the pressure sensor 141.

As shown in FIG. 10, the opening pressure P12 of the NP relief valve 12 is set in that the NP relief valve 12 opens when the fuel chamber 7 is in communication with the air chamber 6, and the opening pressure P11 of the PP relief valve 11 is set in that the PP relief valve 11 opens when the fuel chamber 7 is in communication with the atmosphere. Therefore, the malfunction may be diagnosed by judging if the PP or NP relief valve 11 or 12 opens when the air and fuel chambers 6 and 7 are sealed. Thus, switches to detect the opening of the PP or NP relief valves 11 or 12 are provided in the PP and NP relief valves 11 and 12, respectively, and the malfunction can be diagnosed on the basis of outputs of the switches. The structures and functions other than those described regarding the fourth embodiment are the same as the third embodiment, and an explanation thereof will be eliminated.

A tank according to the fifth embodiment will be explained, referring to FIGS. 13 and 14.

Figure 13:
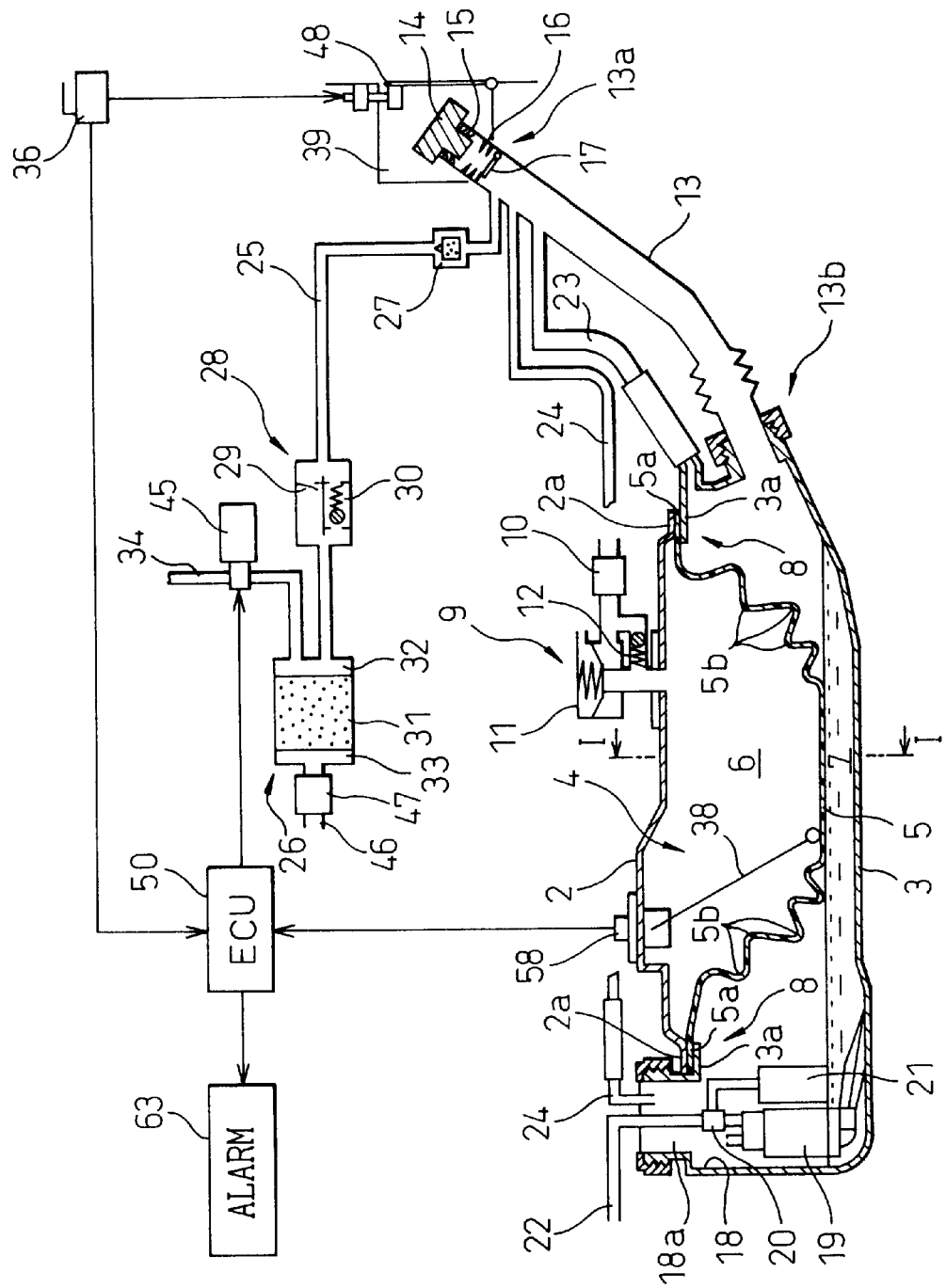
FIG. 13 is a general view of a fuel tank according to the fifth embodiment of the invention.

In FIG. 13, the upper opening 13a of the refuel pipe 13 is housed in a refuel chamber 39. The refuel chamber 39 is closed by a refuel chamber closure 48. The closure 48 is connected to a device 36 for opening the closure 48. The closure 48 is opened by activating the opening device 36. The opening device 36 is connected to the ECU 50 via an A-D converter 64.

The canister 26 is connected to the atmosphere via an atmosphere connection pipe 46. An opening valve 47 is positioned in the atmosphere connection pipe 46. When the opening valve 47 is opened, the canister 26 is in communication with the atmosphere. The opening valve 47 is closed during the purge operation and is opened during an engine stop.

Figure 14:
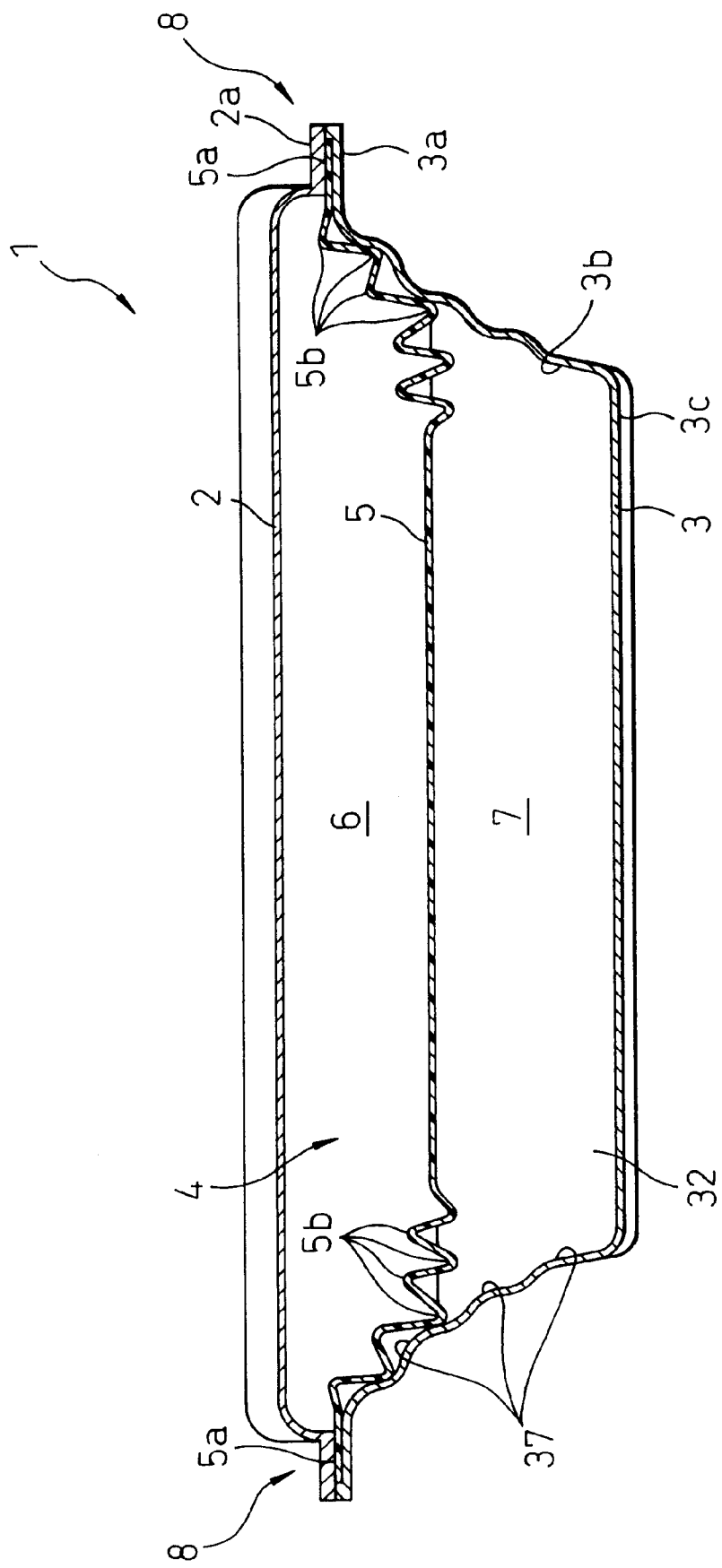
FIG. 14 is a cross sectional side view of the tank along the line I—I of FIG. 13.
Figure 15:
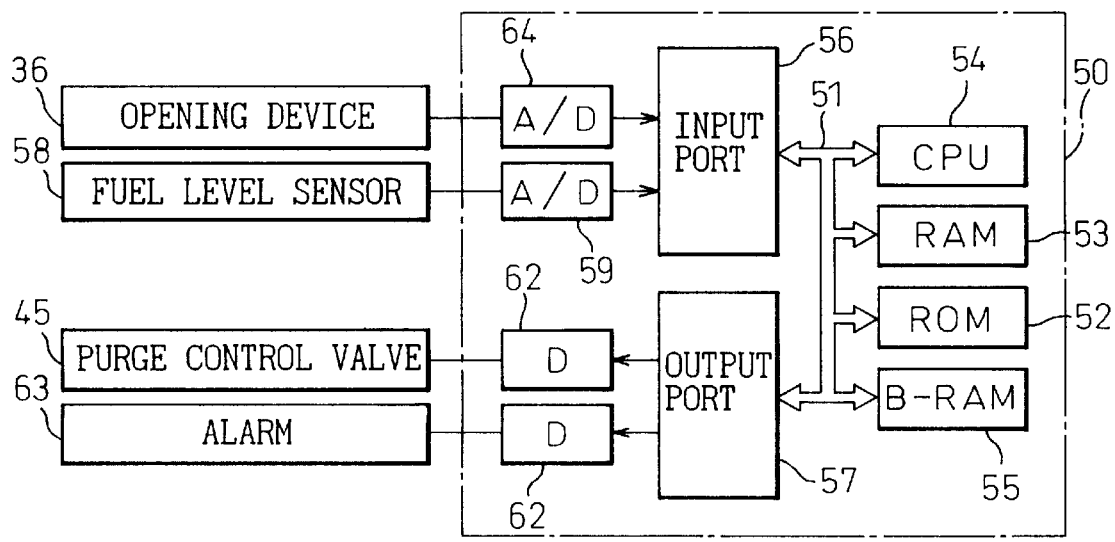
FIG. 15 is a detailed view of the ECU of FIG. 13.

In FIG. 14, the inner wall of the side wall 3b of the lower portion 3 is inclined inwardly from the mounting portion 8 toward the bottom wall 3c of the lower portion 3. Projections 37 projecting inwardly are formed on the inner wall of the side wall 3b around the inner wall. Therefore, the inner wall of the side wall has a stepped cross section to increase the strength of the lower portion 3 without providing any additional reinforcing member.

When the refueling operation should be carried out, at first, the closure 48 is opened by activating the opening device 36. The other procedures are the same as those described regarding the first embodiment, and an explanation thereof will be eliminated.

In FIG. 13, the fuel level sensor 58 comprises a sensing rod 38. The rod 38 moves up and down with the movement of the film 5. The fuel level sensor 58 detects the level of the film 5 by the rod 38 and calculates the amount of the fuel in the fuel chamber 7.

The film 5 waves to the large extent in the directions by the movement of the fuel in the fuel chamber 7 due to the acceleration or turning of the vehicle. The movement of the fuel in the fuel chamber 7 adds a large load and a large stress to the film 5. In the fifth embodiment, the side wall 3b of the bottom portion 3 is inclined corresponding to the shape of the film 5 projecting downwardly. Therefore, the movement of the film 5, to a large extent, is restricted independent of the fuel level in the tank 1. Further, the film 5 rapidly contacts with the projections 37 when the film 5 moves transversely. As a result, the transverse or vertical movement of the film 5 due to the movement of the fuel in the tank 1 is restricted.

Moreover, the projections 37 are formed from the mounting portion 8 to the bottom wall 3c adjacent each other. Therefore, recesses are formed between the projections 37. The recesses house the corrugated portions 5b of the film 5. Therefore, the movement of the film 5 due to the fuel movement is restricted. As a result, any large load or stress is prevented from being produced and acting on the film 5. Therefore, the film 5 is prevented from be broken. Further, the projection 37 decreases an air volume between the fuel surface and the film 5. Therefore, the amount of vapor in the fuel chamber 7 is less.

Figure 16:
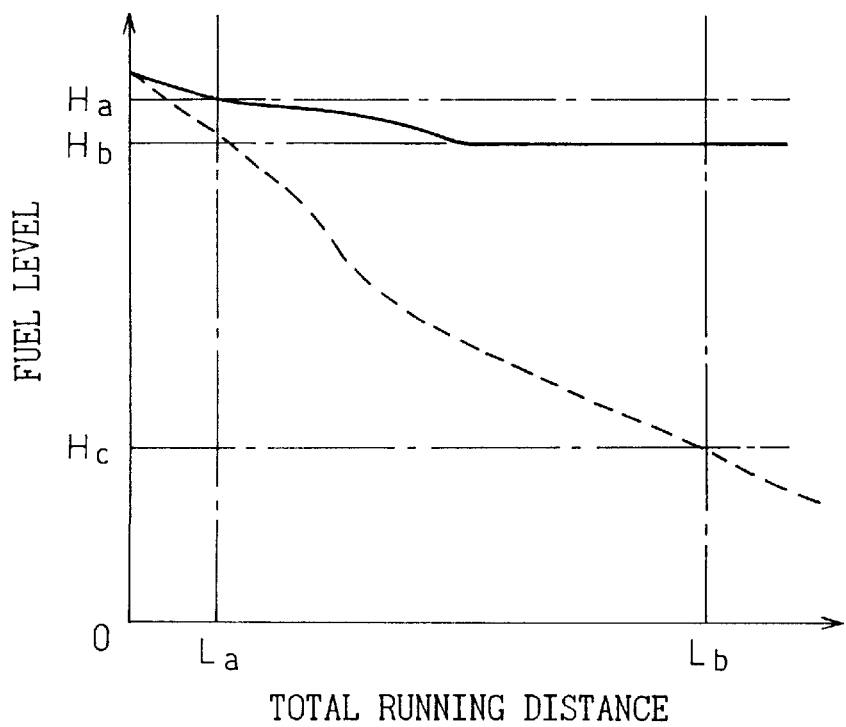
FIG. 16 is a view illustrating a relationship between total running distance and fuel amount in the fuel tank according to the fifth embodiment of the invention.

A malfunction diagnosis of the tank according to the fifth embodiment will be explained, referring to FIG. 16. The fuel amount is decreased as the total running distance of the vehicle is increased. In the tank 1 comprising the fuel level sensor 58 for detecting the change of the level of the film 5, if the tank 1 has no malfunction, the fuel amount is decreased, as shown by the dotted line in FIG. 16 as the total running distance is increased from the distance La to the distance Lb.

However, if the tank 1 has malfunction such as the attachment of the film 5 to the upper wall of the upper portion 2, or such as the unusual deformation of the film 5, the film 5 cannot move with the decrease of the fuel in the tank 1. Therefore, the level of the fuel detected by the fuel level sensor 58 changes as shown by the solid curve in FIG. 16 as the total running distance is increased from the distance La to Lb.

The malfunction diagnosis according to the fifth embodiment will be explained in detail. At first, a first fuel level H1 is detected by the fuel level sensor 58 when the total running distance L becomes a first distance L1. Next, a second fuel level H2 is detected by the fuel level sensor 58 when the total running distance L becomes a second distance L2. Next, a difference ΔH(=H2−H1) between the second and first fuel levels H2 and H1 is calculated. Next, the difference ΔH is compared with a predetermined difference ΔHx which is to be detected when the vehicle has run a distance ΔL(=L2−L1). When the difference ΔH is lower than the predetermined difference ΔHx, it is judged that the film 5 has malfunction such as the attachment of the film 5 to the upper wall of the tank 1, and cannot move.

Figure 17:
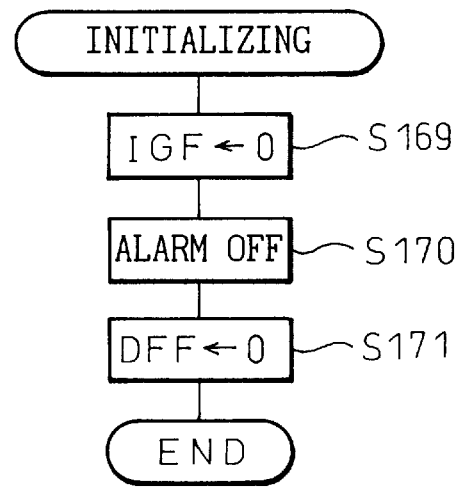
FIG. 17 is a flowchart illustrating an initializing routine according to the fifth embodiment of the invention.

An initializing routine according to the fifth embodiment will be explained, referring to FIG. 17. The initializing routine is carried out every time the engine is started. In FIG. 17, at step 169, an ignition switch flag IGF is set, the routine proceeds to step 170. IGF is set when an initial total running distance is set, and is reset when the engine is started.

At step 170, the alarm 63 is switched off, and the routine proceeds to step 171 where a diagnosis flag DFF is set, and the routine is ended. The diagnosis flag is set when the malfunction diagnosis is completed, and is reset when the malfunction diagnosis should be carried out.

Figure 18:
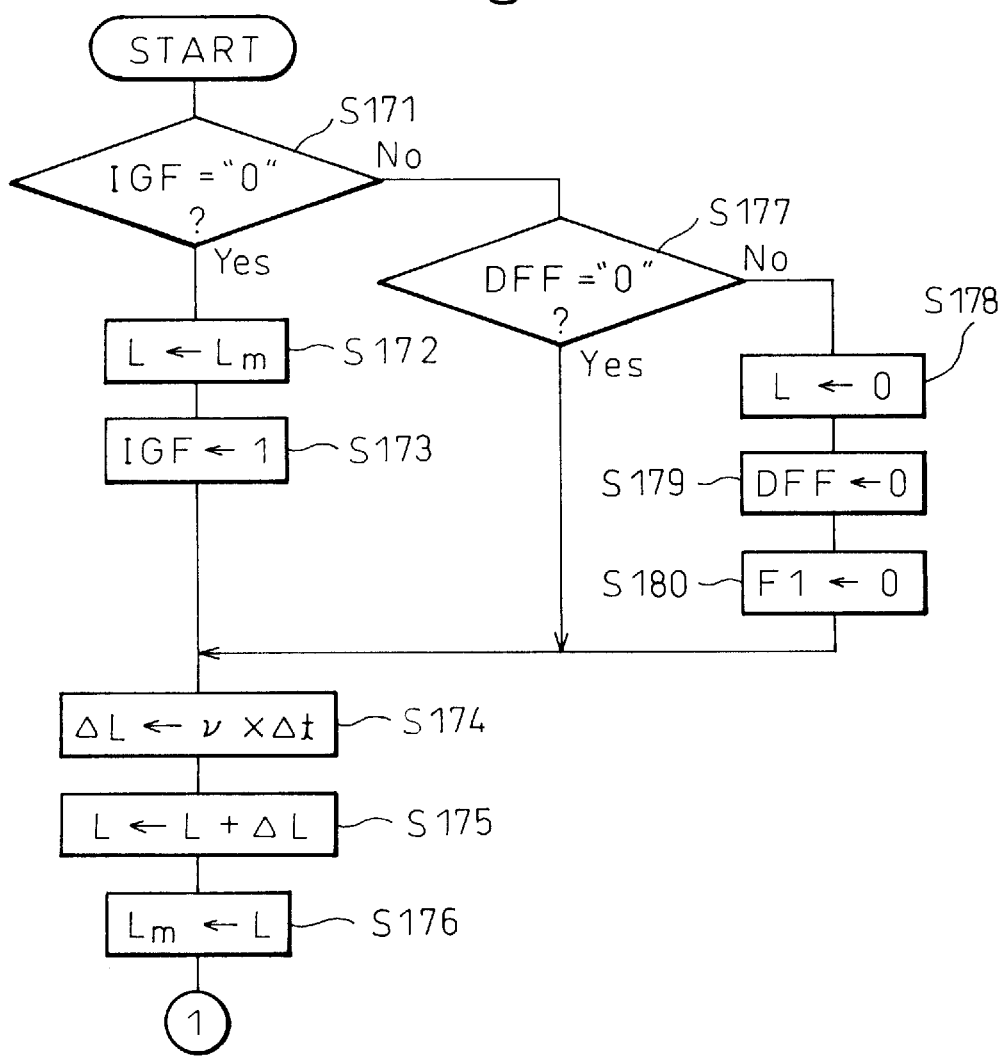
FIG. 18 is a part of a flowchart illustrating a routine of malfunction diagnosis according to the fifth embodiment of the invention.
Figure 19:
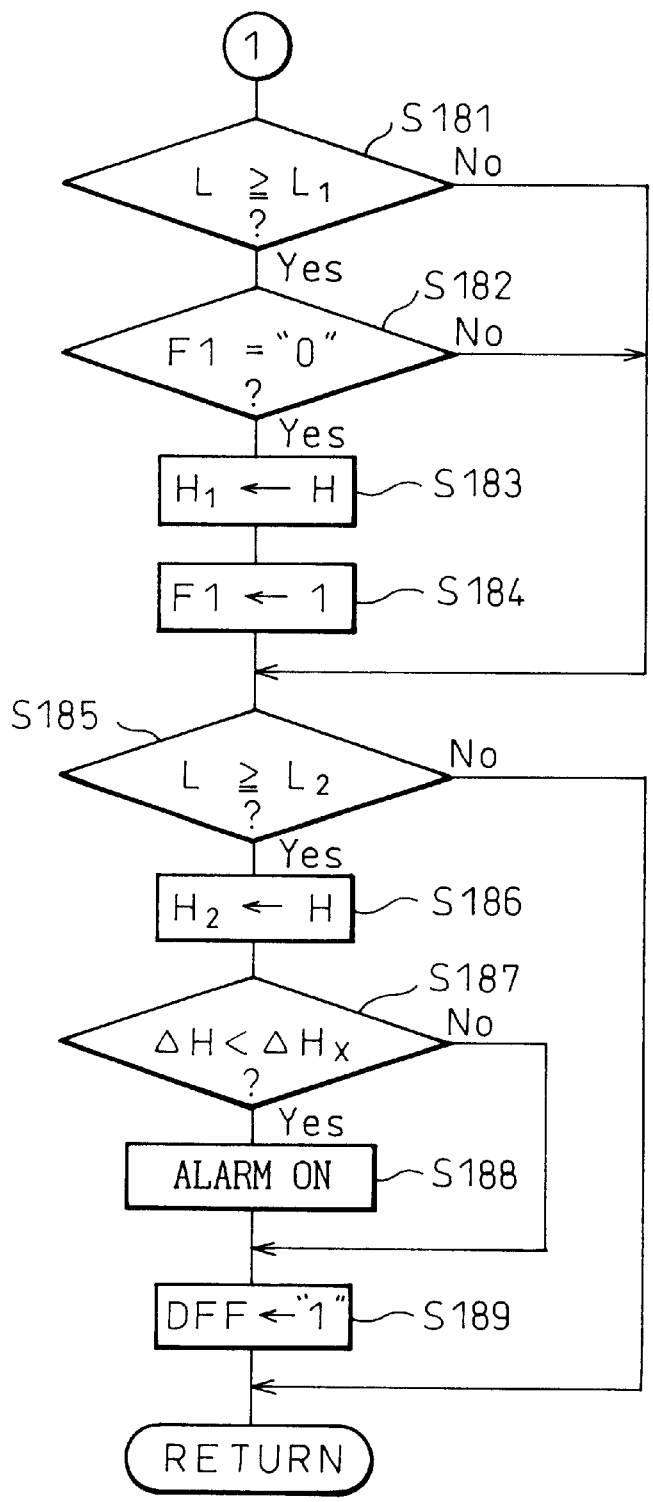
FIG. 19 is a part of a flowchart illustrating a routine of malfunction diagnosis according to the fifth embodiment of the invention.
Figure 20:
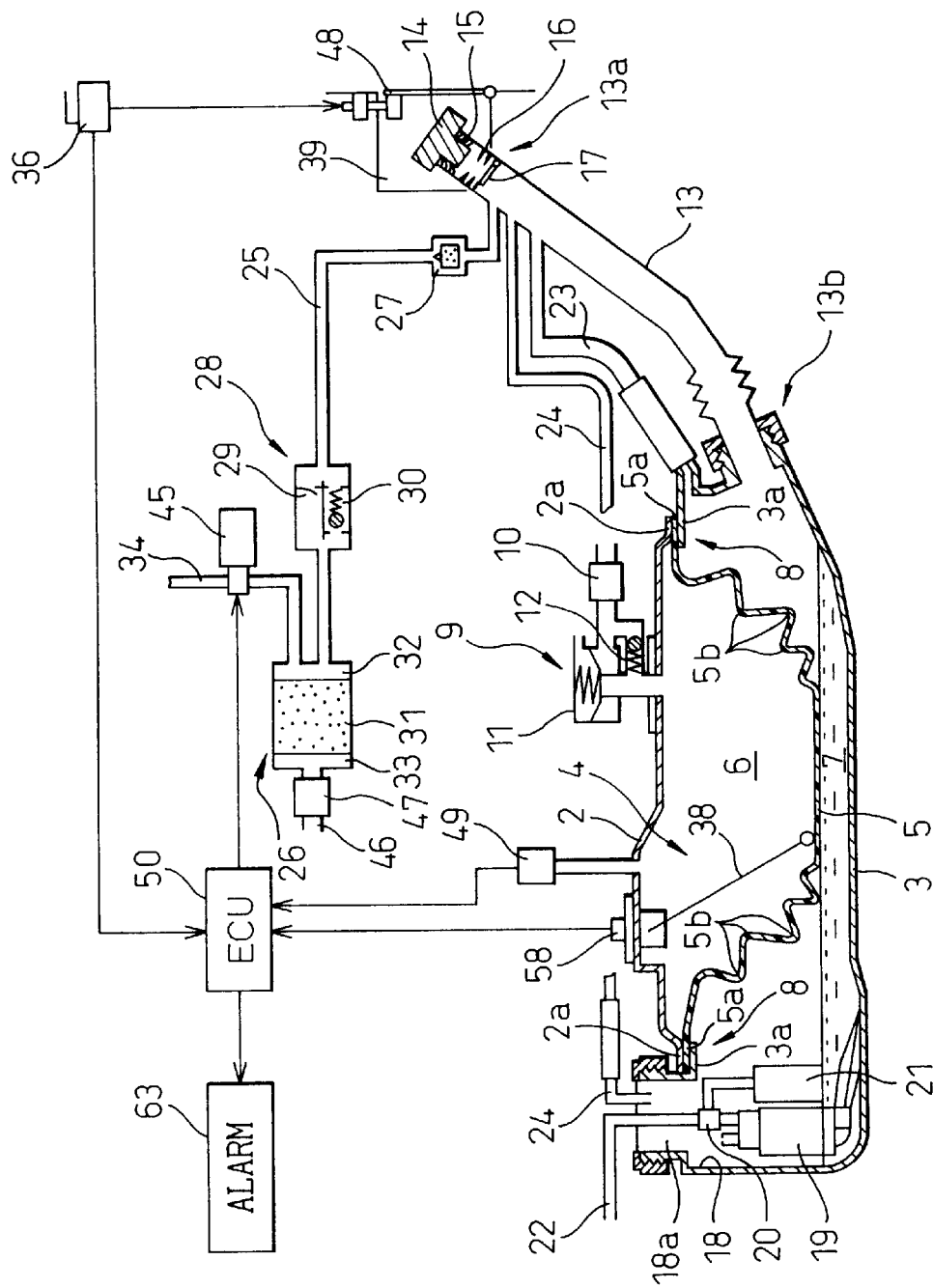
FIG. 20 is a general view of a fuel tank according to the sixth embodiment of the invention.
Figure 21:
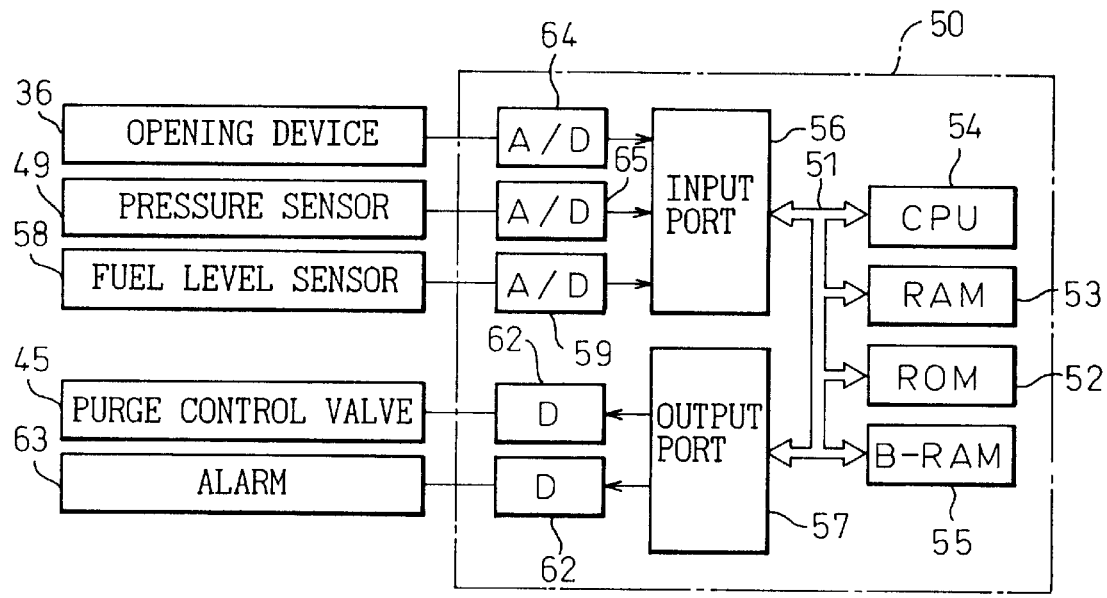
FIG. 21 is a detailed view of the ECU of FIG. 20.

A malfunction diagnosis of the tank according to the fifth embodiment will be explained, referring to FIGS. 18 and 19. In FIG. 18, at step 171, it is judged if the ignition switch flag IGF is set (IGF=1). When IGF=1, the routine proceeds to step 172 where a total running distance Lm is memorized as the distance L, the routine proceeds to step 173 where the IGF is set, and the routine proceeds to step 174. The distance Lm has been memorized in the last routine before the engine is started. On the other hand, when IGF=0, the routine proceeds to the step 177 where it is judged if the diagnosis flag DFF is reset (DFF=0).

When DFF=0, the routine proceeds to step 174. On the other hand, when DFF=1, the routine proceeds to step 178 where the distance L is reset, the routine proceeds to step 179 where DFF is reset, the routine proceeds to step 180 where the detection forbidden flag F1 is reset, and the routine proceeds to step 174. F1 is set when the fuel level H1 is detected by the fuel level sensor, and is reset when the malfunction diagnosis should be carried out.

At step 174, a distance $\Delta L$ is calculated by multiplying the present running speed of the vehicle by the routine interval $\Delta t$. The distance $\Delta L$ is that the vehicle has run between the last and present routines. Next, at step 175, the distance L added by the distance $\Delta L$ calculated at step 174 is memorized as the present distance L. Next, at step 176, the present distance L is memorized as the distance Lm in the B-RAM 55, and the routine proceeds to step 181.

At step 181, it is judged if the distance L is larger than a first predetermined distance L1 ($L \geq L1$). The output of the fuel level sensor 58 rapidly changes just after the refueling operation, or during the acceleration or deceleration just after the engine is started since the fuel surface waves. Therefore, the first predetermined distance L1 is set so that the fuel level sensor 58 detects the fuel level when the fuel surface does not move any more. When $L \geq L1$, the routine proceeds to step 182. On the other hand, when $L \geq L1$, the routine proceeds to step 185.

At step 182, it is judged if the F1 is reset (F1=0). When F1=0, the routine proceeds to step 183 where a present fuel level H detected by the fuel level sensor 58 is memorized as a first fuel level H1, the routine proceeds to step 184 where F1 is set, and the routine proceeds to step 185. On the other hand, when F1=1, the routine proceeds to step 185.

At step 185, it is judged if the distance L is larger than a second predetermined distance L2 ($L \geq L2$). The second predetermined distance L2 is set so that enough fuel is used to diagnose malfunction in the tank. The second predetermined distance L2 is larger than the first predetermined distance L1. When $L \geq L2$, the routine proceeds to step 186 where a present fuel level H detected by the fuel level sensor 58 is memorized as a second fuel level H2, and the routine proceeds to step 186. On the other hand, when L<L2, the routine is ended.

At step 186, a difference $\Delta H(=H2-H1)$ between the second and first predetermined levels H2 and H1 is smaller than a predetermined difference $\Delta Hx(\Delta H<\Delta Hx)$. The predetermined difference $\Delta Hx$ corresponds to that used over the distance $\Delta L(=L2-L1)$, if the tank has no malfunction. When $\Delta H<\Delta Hx$, the routine proceeds to step 188 where the alarm 63 is switched on, and the routine proceeds to step 189. On the other hand, when $\Delta H \geq \Delta Hx$, the routine proceeds to step 189.

At step 189, DFF is set, and the routine is ended.

In the fifth embodiment, the malfunction may be diagnosed on the basis of the amount of the driving of the engine. Further, the malfunction in the tank may be diagnosed by the comparison of the weight of the fuel in the tank at a time with that at later time. Further, the malfunction in the tank may be diagnosed by the comparison of the weight of the fuel in the tank with the fuel level detected by the fuel level sensor. A laser or a supersonic wave can be used to detect the fuel level.

A tank according to the sixth embodiment will be explained, referring to FIGS. 8 and 9. In FIG. 8, a pressure sensor 49 is positioned on the upper portion 2 of the tank 1 to detect an air chamber pressure. The pressure sensor 49 is connected to the input port 56 via an A-D converter 65 (see FIG. 9). The structures and the functions other than those described regarding the sixth embodiment are the same as those of the fifth embodiment, and an explanation thereof will be eliminated.

Figure 22:
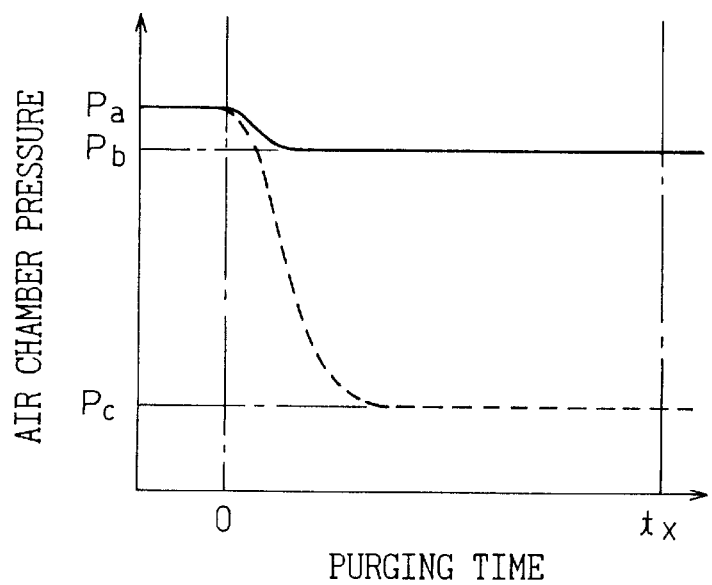
FIG. 22 is a view illustrating a relationship between a purging time and pressure in the air chamber according to the sixth embodiment of the invention.

A malfunction diagnosis of the tank according to the sixth embodiment will be explained, referring to FIG. 22. The fuel chamber pressure is decreased when the purge operation is started. If the film 5 has no malfunction and can move with the movement of the fuel surface, the air chamber pressure is rapidly decreased as shown by the dotted curve in FIG. 22 after the purge operation is started at time 0 in FIG. 22. The air chamber pressure is kept at the pressure P12 determined by the opening pressure of the NP relief valve 12 at time tx in FIG. 22. On the other hand, if the film 5 has malfunction and cannot move, the air chamber pressure is slowly decreased as shown by the solid curve in FIG. 22. The air chamber pressure is kept at the pressure Pb which is higher than the pressure P12.

The malfunction diagnosis of the tank according to the sixth embodiment will be explained in detail. At first, a first pressure P1 is detected by the pressure sensor 49 just after the purge operation is started. Next, a second pressure P2 is detected by the pressure sensor 49 when the predetermined time has elapsed. A difference $\Delta P(=P1-P2)$ between the first and second pressures P1 and P2 is compared with a predetermined difference $\Delta Py$. When the difference $\Delta P$ is smaller than the predetermined difference $\Delta Py$, it is judged that the film 5 has malfunction.

In the sixth embodiment, the malfunction in the film may be diagnosed on the basis of a difference in the fuel chamber pressure before and after the purge operation is started. Further, in the sixth embodiment, the malfunction in the film may be diagnosed by comparing the air chamber pressure after the purge operation is started with a predetermined pressure. Moreover, in the sixth embodiment, the malfunction in the film may be diagnosed on the basis of a difference in the position of the film before and after the purge operation is started.

Figure 23:
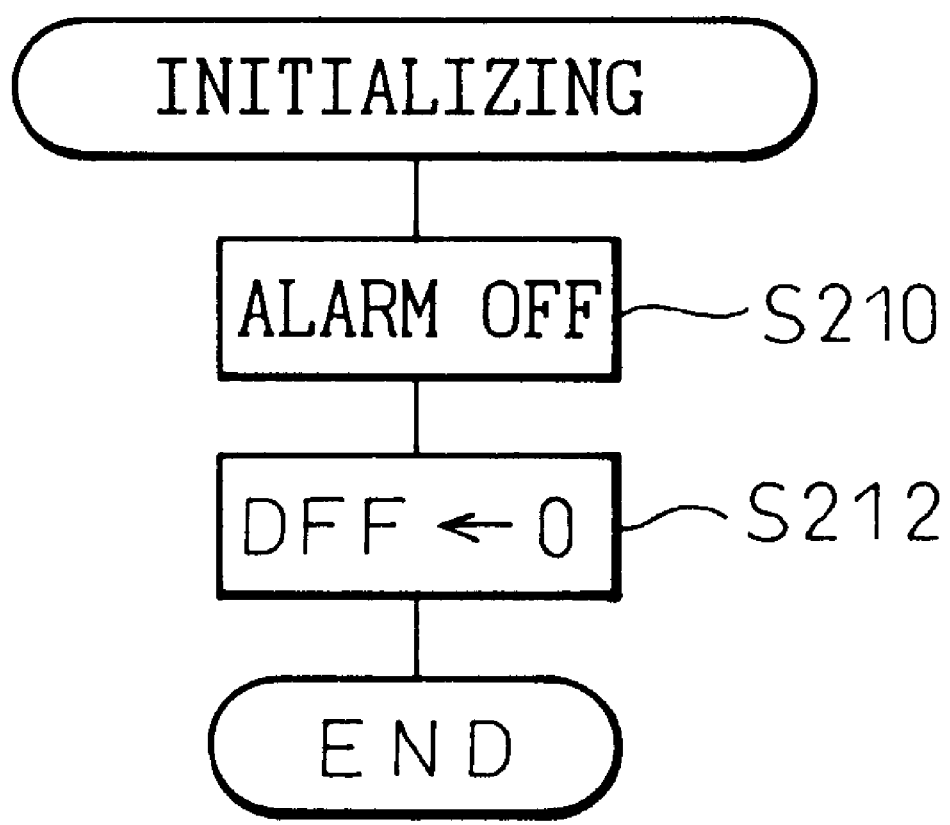
FIG. 23 is a flowchart illustrating an initializing routine according to the sixth embodiment of the invention.

An initializing routine according to the sixth embodiment will be explained, referring to FIG. 23. The routine is carried out every tine the engine is started. At step 210, the alarm 63 is switched off, the routine proceeds to step 212 where the diagnosis flag DFF is set, and the routine is ended.

Figure 24:
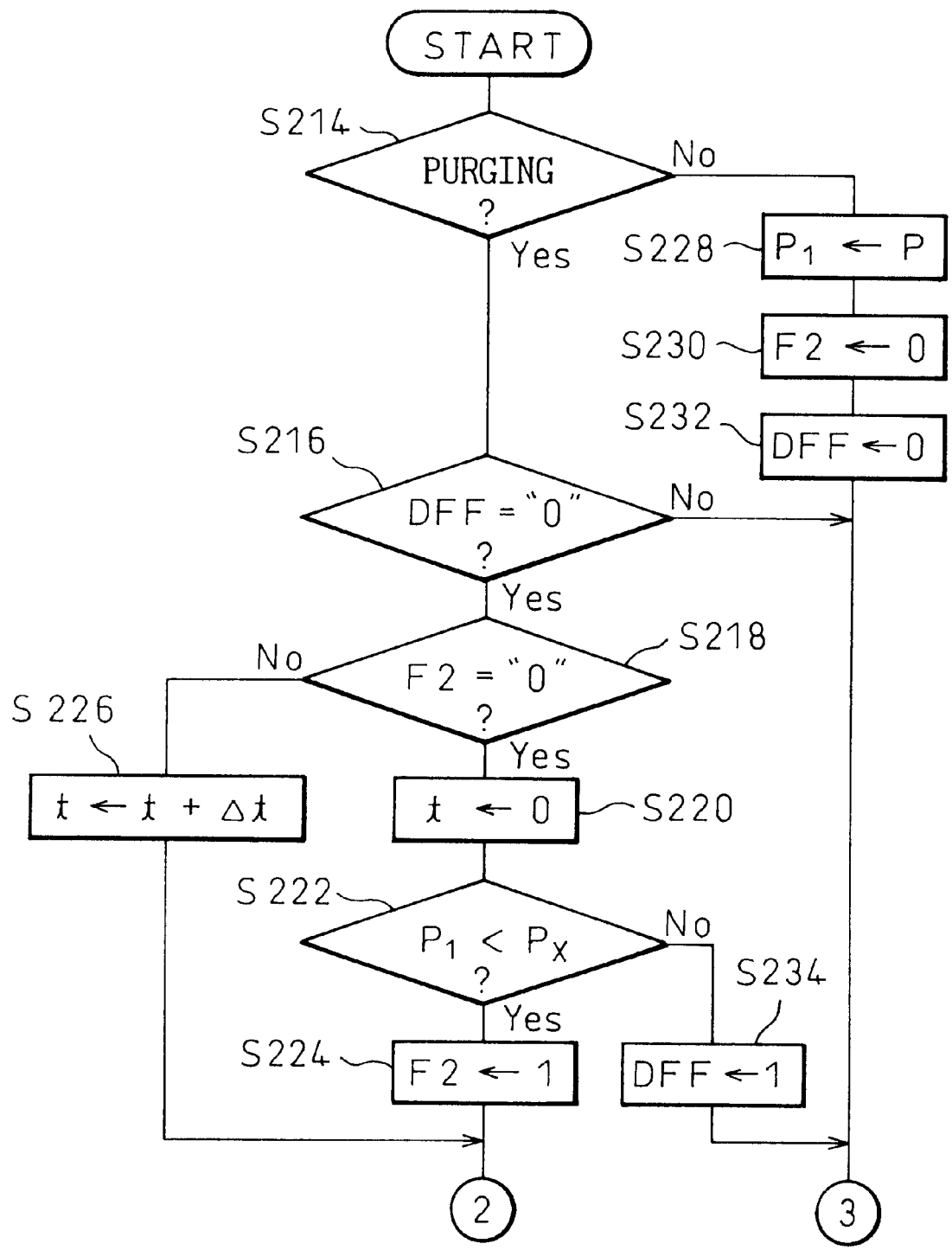
FIG. 24 is a part of a flowchart illustrating a routine of malfunction diagnosis according to the sixth embodiment of the invention.
Figure 25:
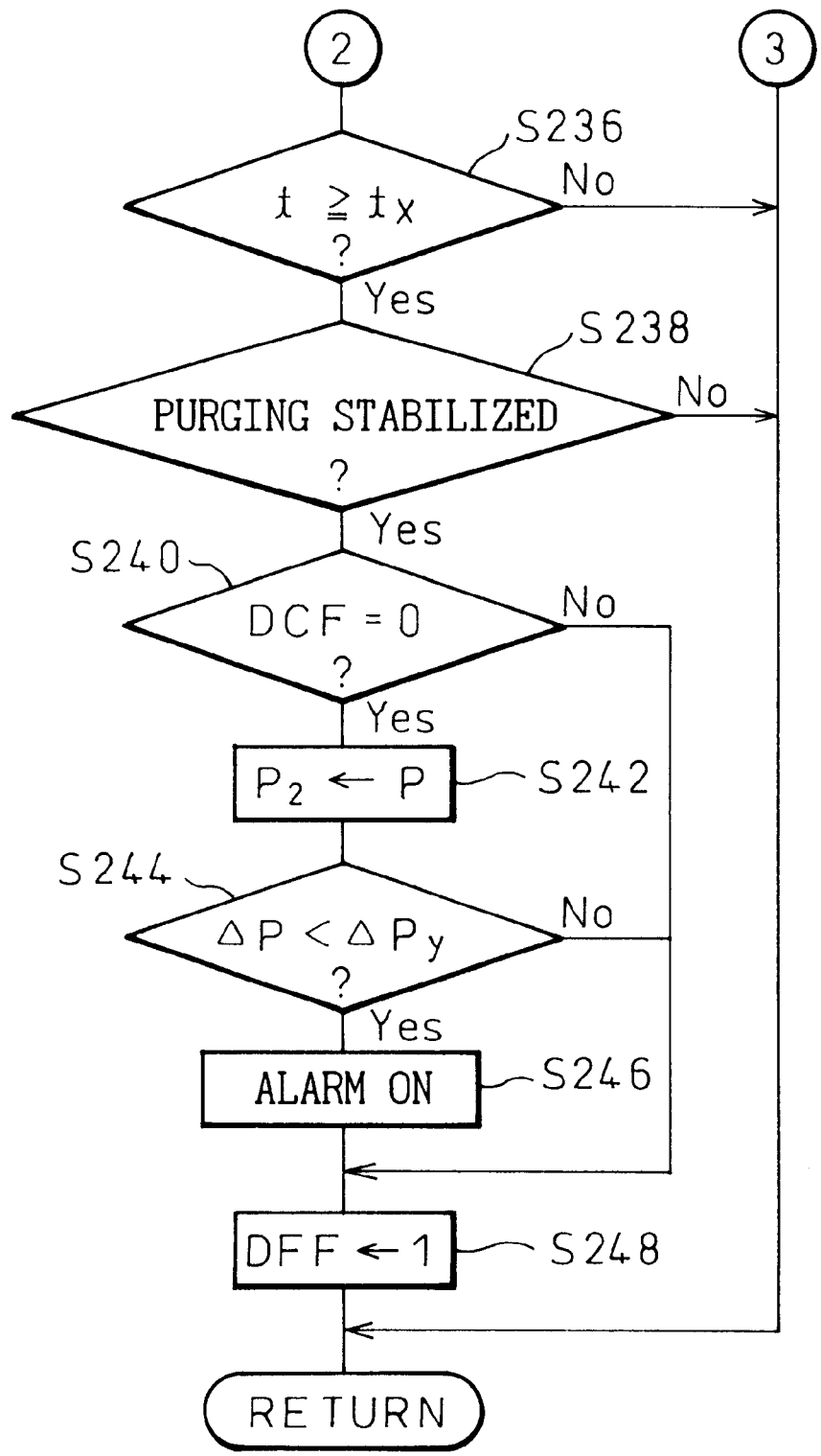
FIG. 25 is a part of a flowchart illustrating a routine of malfunction diagnosis according to the sixth embodiment of the invention.

A routine of a malfunction diagnosis of the tank according to the sixth embodiment will be explained, referring to the flowchart in FIGS. 24 and 25. In FIG. 24, at step 214, it is judged if the purge operation is carried out, for example, by the opening operation of the purge valve 50 or the concentration of the vapor passed through the vapor discharge pipe 25. At step 214, when the purge operation is carried out, the routine proceeds to step 216. On the other hand, when the purge operation is not carried out, the routine proceeds to step 228 where an air chamber pressure detected by the pressure sensor 49 is memorized as a first pressure P1, the routine proceeds to step 230 where a detection forbidden flag F2 is reset, the routine proceeds to step 232 where the diagnosis flag DFF is reset, and the routine is ended. F2 is set when the first pressure P1 satisfies the diagnosis requirements, and is reset when the purge operation is stopped.

At step 216, it is judged if DFF is reset (DFF=0). When DFF=0, the routine proceeds to step 218. On the other hand, when DFF=1, the routine is ended.

At step 218, it is judged if F2 is reset (F2=0). When F2=0, the routine proceeds to step 220 where the elapsed time t is reset, and the routine proceeds to step 222. On the other hand, when F2=1, the routine proceeds to step 226 where the elapsed time t added by the routine interval Δt is memorized as the elapsed time t, and the routine proceeds to step 236.

At step 222, it is judged if the first pressure P1 is larger than the predetermined pressure Px (P1>Px). If the air chamber pressure is lower than the minimum pressure during the purge operation, the air chamber pressure is not decreased although the purge operation is carried out. Therefore, the predetermined pressure Px is set as the minimum pressure during the purge operation. At step 222, when P1>Px, the routine proceeds to step 224 where the F2 is set, and the routine proceeds to step 236. On the other hand, when P1≦Px, the routine proceeds to step 234 where DFF is set, and the routine is ended.

At step 236, it is judged if the elapsed time t is larger than a predetermined time tx (t≧tx). The predetermined time tx is set so that the air chamber pressure is generally constant. Therefore, in the sixth embodiment, when the air chamber pressure is generally not constant, it is judged that the air chamber pressure is not decreased enough to diagnose the malfunction in the tank, and then the malfunction cannot be diagnosed. At step 236, when t≧tx, the routine proceeds to step 238. On the other hand, when t≧tx, the routine is ended.

At step 238, it is judged if the condition of the purge operation satisfies the requirements by, for example, the purge ratio or the purge concentration. When the condition of the purge operation satisfies the requirements, the routine proceeds to step 240. On the other hand, when the condition of the purge operation does not satisfy the requirements, the routine is ended.

Figure 40:
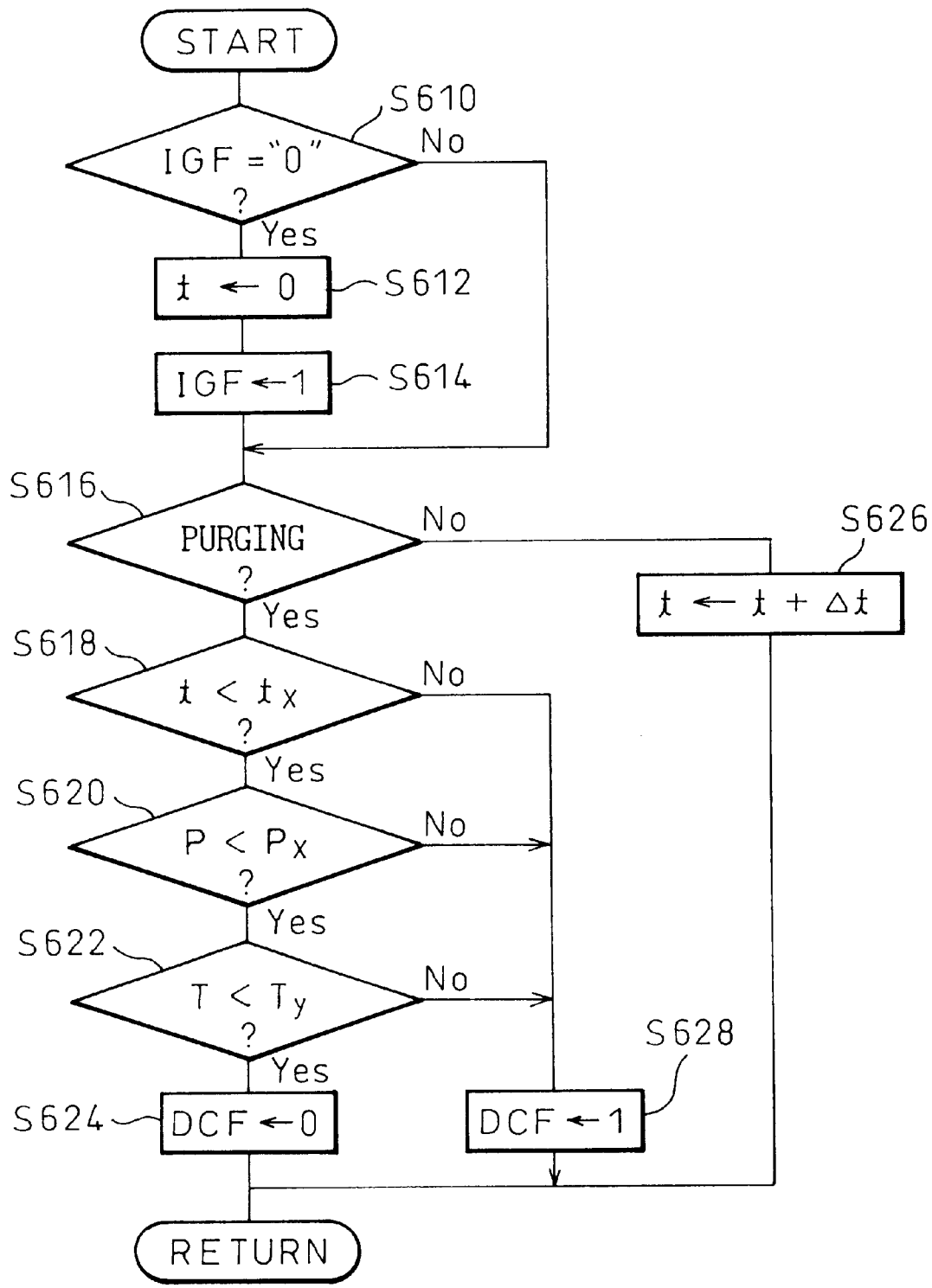
FIG. 40 is a flowchart illustrating a routine of diagnosis allowance according to the sixth embodiment.

At step 240, it is judged if a diagnosis allowance flag DCF is reset (DCF=0). As shown in FIG. 40, DCF is set when the diagnosis allowance requirements are satisfied, and is reset when the diagnosis requirements are not satisfied. When DCF=0, the routine proceeds to step 242 where the present air chamber pressure P, which is detected by the pressure sensor 49, is memorized as a second pressure P2, and the routine proceeds to step 244. On the other hand, when DCF=1, the routine proceeds to step 248.

At step 244, it is judged if a difference ΔP(=P1−P2) between the first and second pressures P1 and P2 is smaller than a predetermined pressure ΔPy (ΔP<ΔPy). The predetermined pressure ΔPy is generally equal to the minimum air chamber pressure during the purge operation. When ΔPy<P1−P2, it is judged that the film 5 has malfunction, the routine proceeds to step 246 where the alarm 63 is switched on, and the routine proceeds to step 248. On the other hand, when ΔPy≧P1−P2, the routine proceeds to step 248.

At step 248, DFF is set, and the routine is ended.

Figure 26:
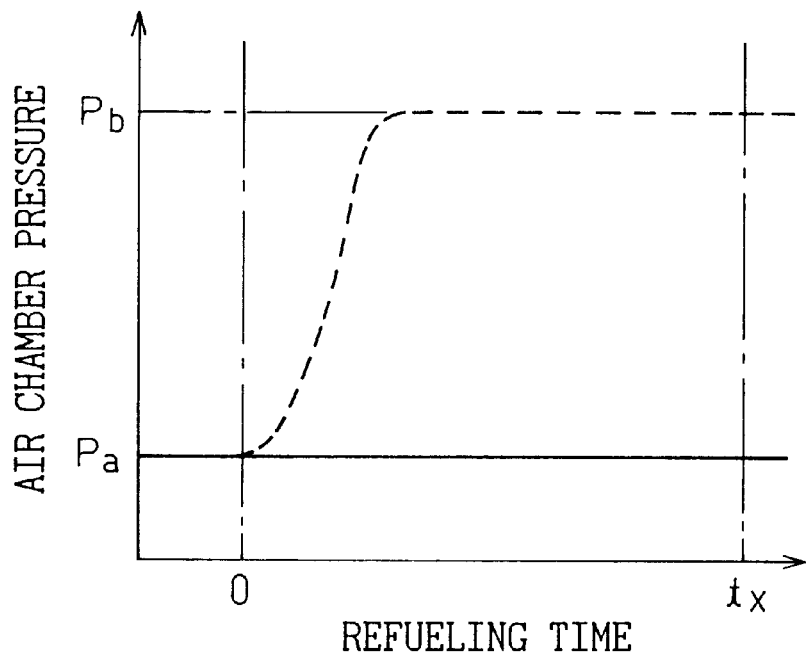
FIG. 26 is a view illustrating a relationship between a refuel time and pressure in the air chamber according to the seventh embodiment of the invention.

A malfunction diagnosis of the tank according to the seventh embodiment will be explained, referring to FIG. 26. The structures and the functions of the seventh embodiment are the same as those of the sixth embodiment, and an explanation thereof will be eliminated.

The fuel surface moves up during the refueling operation. Therefore, as the refueling operation is started at time 0 in FIG. 26, if the film 5 has no malfunction, the air chamber pressure Pa is increased to the pressure Pb as shown by the dotted curve in FIG. 26. The pressure Pb is equal to the opening pressure P11 of the PP relief valve 11. On the other hand, if the film 5 has malfunction, the pressure is slowly increased as shown by the solid curve in FIG. 26. In the seventh embodiment, the air chamber pressure change is used as the physical value in the tank.

The malfunction diagnosis of the tank according to the seventh embodiment will be explained in detail. At first, a first air chamber pressure P1 is detected by the pressure sensor 49 just after the refueling operation is started. When a predetermined time has elapsed since the detection of the first pressure P1, a second air chamber pressure P2 is detected by the pressure sensor 49. The difference ΔP(=P2−P1) between the second and first pressures P2 and P1 is compared with a predetermined pressure difference ΔPy. When the difference ΔP is smaller than the predetermined pressure difference ΔPy, it is judged that the film 5 has malfunction such as the attachment of the film 5 to the upper wall of the tank 1.

In the seventh embodiment, the malfunction in the film may be diagnosed on the basis of a difference in the air chamber pressure before and after the refueling operation is started. Further, in the seventh embodiment, the malfunction in the film may be diagnosed on the basis of a difference in the fuel chamber pressure before and after the refueling operation is started. Moreover, in the seventh embodiment, the malfunction in the film may be diagnosed on the basis of a difference in the position of the film before and after the refueling operation is started.

Figure 27:
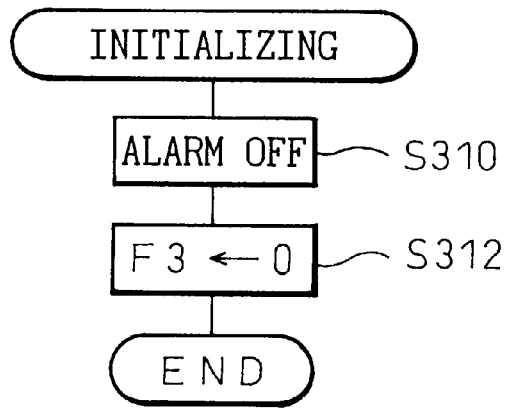
FIG. 27 is a flowchart illustrating an initializing routine according to the seventh embodiment of the invention.

An initializing routine according to the seventh embodiment will be explained, referring to FIG. 27. The routine is carried out every tine the engine is started. At step 310, the alarm 63 is switched off, the routine proceeds to step 312 where the closure opening flag F3 is reset, and the routine is ended. F3 is set when the closure 48 opens, and is reset when the closure 48 is closed.

Figure 28:
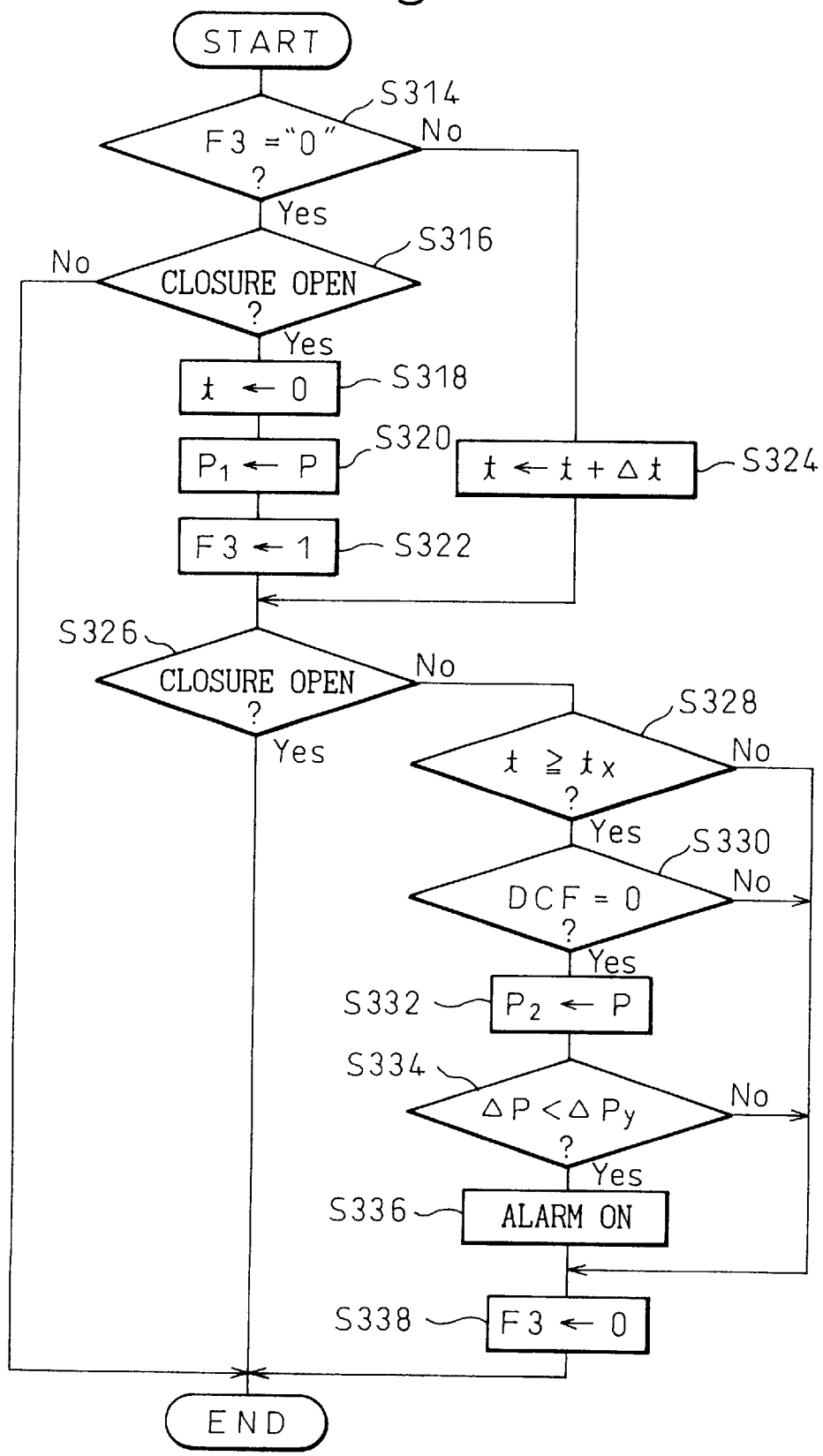
FIG. 28 is a flowchart illustrating a routine of malfunction diagnosis according to the seventh embodiment of the invention.

A routine of a malfunction diagnosis of the tank according to the seventh embodiment will be explained, referring to FIG. 28. In FIG. 28, at step 314, it is judged if F3 is reset (F3=0). When F3=0, the routine proceeds to step 316. On the other hand, when F3=1, routine proceeds to step 324 where the elapsed time t added by the routine interval Δt is memorized as a new elapsed time t, and the routine proceeds to step 326.

At step 316, it is judged if the closure 48 opens. When the closure 48 opens, the routine proceeds to step 318 where the elapsed time t is reset, the routine proceeds to step 320 where the present air chamber pressure P detected by the pressure sensor 49 is memorized as a first pressure P1, the routine proceeds to step 322 where F3 is set, and the routine proceeds to step 326. On the other hand, when the closure does not open, the routine is ended.

At step 326, it is again judged if the closure 48 opens. When the closure 48 opens, it is judged that the refueling operation is still carried out, and the routine is ended. On the other hand, when the closure 48 is closed, it is judged that the refueling operation has been completed, and the routine proceeds to step 328.

At step 328, it is judged if the elapsed time t is larger than a predetermined time tx (t≧tx). The predetermined time tx is set large enough to increase the air chamber pressure if the film has no malfunction. Therefore, when the elapsed time is very small, the malfunction diagnosis is forbidden since it is judged that the film 5 has no malfunction although the air chamber pressure is not increased to sufficient extent. When t≧tx, the routine proceeds to step 330. On the other hand, when t<tx, the routine proceeds to step 338.

At step 330, it is judged if the diagnosis allowance flag DCF is reset (DCF=0). As shown in FIG. 40, DCF is set when the diagnosis requirements are satisfied, and is reset when the diagnosis requirements are not satisfied. When DCF=0, the routine proceeds to step 332 where the present air chamber pressure P detected by the pressure sensor 49 is memorized as a second pressure P2, and the routine proceeds to the step 332. On the other hand, when DCF=1, the routine proceeds to step 338.

At step 334, it is judged if the difference ΔP(=P2−P1) between the second and first pressures P2 and P1 is smaller than a predetermined pressure ΔPy(ΔP<ΔPy). The predetermined pressure ΔPy is generally equal to the maximum air chamber pressure during the refueling operation. When ΔP<ΔPy, it is judged that the film 5 has malfunction, the routine proceeds to step 336 where the alarm 63 is switched on, and the routine proceeds to step 338. On the other hand, when ΔP≧ΔPy, the routine proceeds to step 338.

At step 338, the F3 is reset, and the routine is ended.

An embodiment modified from the sixth and seventh embodiments will be explained. In this embodiment, the malfunction in the tank 1 is diagnosed by the air chamber pressure. If the film 5 has no malfunction and can move, the volume of the air chamber is increased or decreased as the fuel surface moves down or up. In that time, the air chamber pressure is decreased and the air in the air chamber 6 flows through the ACP control valve 9. On the other hand, if the film 5 has malfunction and cannot move, the air in the air chamber 6 do not flow through the ACP control valve 9 although the fuel surface moves up. Therefore, the malfunction can be diagnosed by the amount of the air flowing through the ACP control valve 9.

An additional embodiment will be explained. In this embodiment, the volume of the air chamber is calculated on the basis of the air chamber pressure and the temperature in the air chamber by the characteristic equation (for example, Boyle-Charles' law). The malfunction is diagnosed by the change of the volume of the air chamber. In this embodiment, the volume of the air chamber is calculated on the basis of the temperature in the air chamber in addition of the air chamber pressure. Therefore, the malfunction can be accurately diagnosed.

The malfunction may be diagnosed by using the fuel chamber pressure change. Further, the malfunction may be diagnosed by the comparison of the air or fuel chamber pressure with a predetermined pressure.

Figure 29:
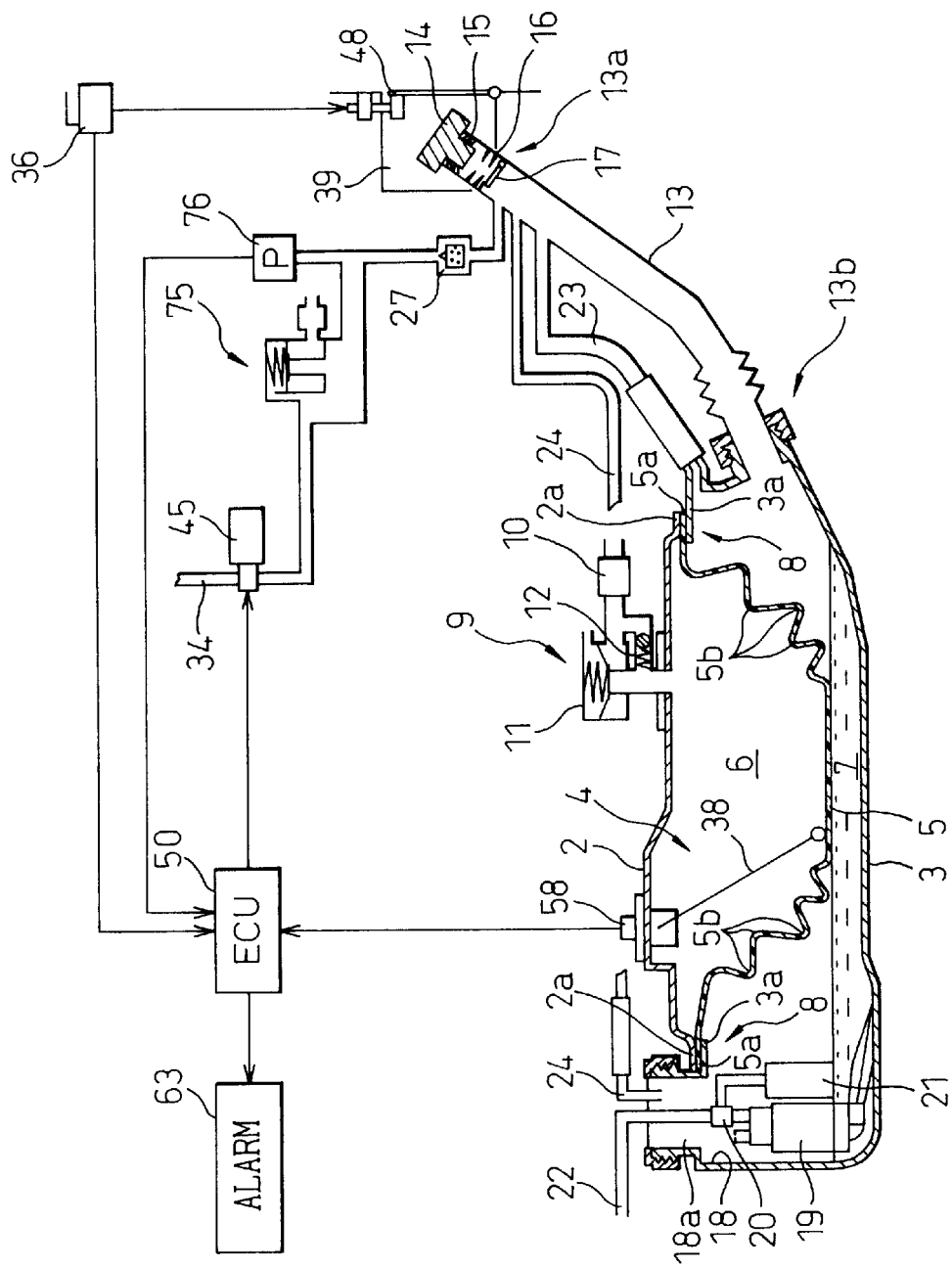
FIG. 29 is a general view of a fuel tank according to the eighth embodiment of the invention.
Figure 30:
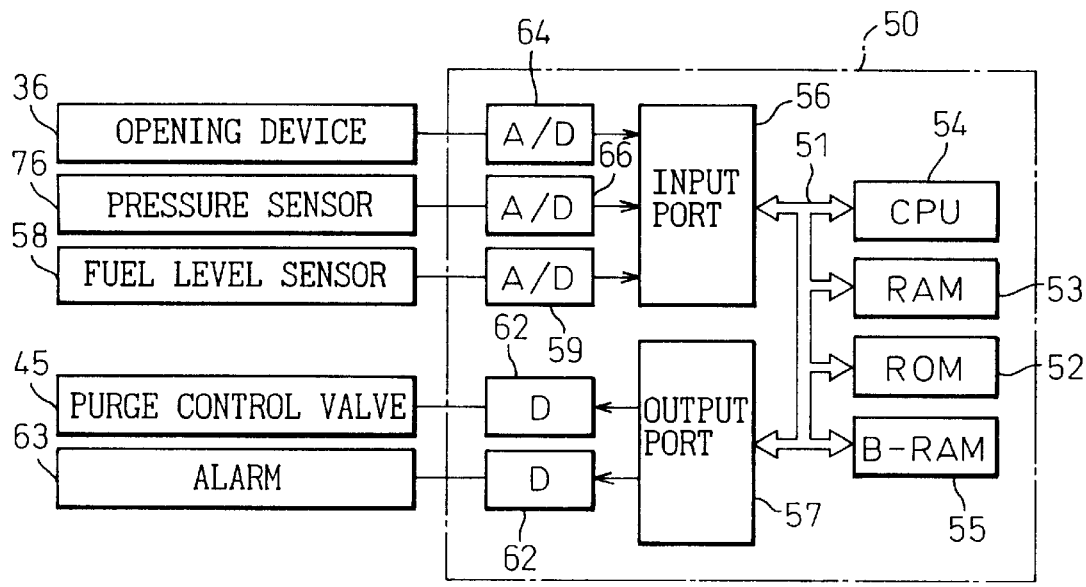
FIG. 30 is a detailed view of the ECU of FIG. 29.

A tank according to the eighth embodiment will be explained, referring to FIG. 29. In FIG. 29, a purge negative pressure regulate valve (hereinafter referred to as the "PNP regulate valve") 75 is positioned instead of the FCP control valve 28 of the fifth embodiment. A pressure sensor 76 is positioned in the fuel vapor discharge pipe 25 between the PNP regulate valve 75 and the fuel leakage restrict valve 27. The amount of vapor in the fuel chamber 7 becomes large as the pressure in the vapor discharge pipe 25 becomes small. Therefore, the PNP regulate valve 75 keeps the pressure in the vapor discharge pipe 25 larger than the predetermined pressure. The volume where the vapor is included becomes larger by the provision of the PNP regulate valve 75. Therefore, the canister may be eliminated. The pressure sensor 76 is connected to the input port 56 via an A-D converter 66 (see FIG. 30). The structures and the functions other than those described regarding the eighth embodiment are the same as those of the fifth embodiment, and an explanation thereof will be eliminated.

Figure 31:
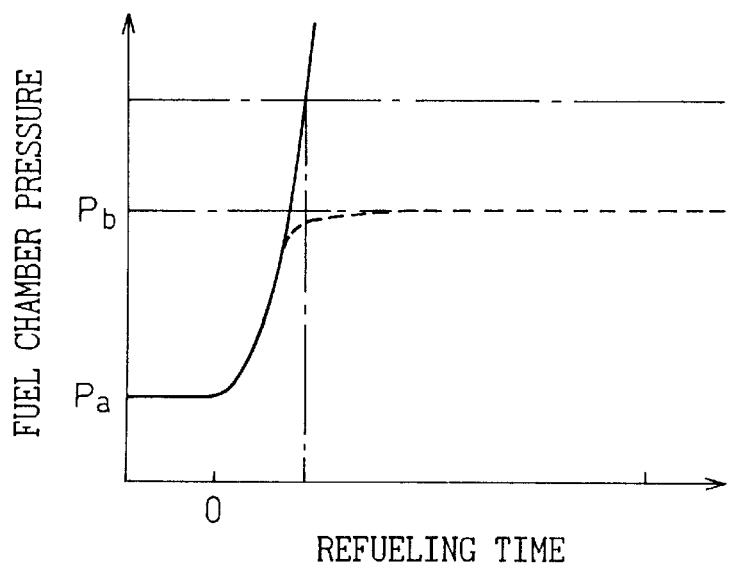
FIG. 31 is a view illustrating a relationship between a refuel time and pressure in the fuel chamber according to the eighth embodiment of the invention.

A malfunction diagnosis of the tank according to the eighth embodiment will be explained, referring to FIG. 31. The fuel surface moves up during the refueling operation. When the fuel operation is started at time 0 in FIG. 31, if the film 5 has no malfunction, the fuel chamber pressure is increased as shown by the dotted curve in FIG. 31. When a predetermined time has elapsed, the fuel chamber pressure has been increased to the pressure Pb which is equal to the opening pressure P11 of the PP relief valve 11. On the other hand, if the film 5 has malfunction and cannot move, the fuel chamber pressure has exceeded the pressure Pb when the predetermined time has elapsed.

A second pressure P2 is detected by the pressure sensor 76 when a predetermined tim has elapsed since the start or completion of the refueling operation. A second pressure P2 is compared with a predetermined value Px. When the second pressure P2 is larger than the predetermined value Px, it is judged that the film 5 has malfunction such as the attachment of the film 5 to the upper wall of the tank 1.

An initializing routine according to the eighth embodiment will be explained, referring to FIG. 32. In FIG. 32, at step 410, the alarm 63 is switched off, and the routine is ended.

A routine of the malfunction diagnosis of the tank according to the eighth embodiment will be explained, referring to FIG. 33. In FIG. 33, at step 412, it is judged if the closure 48 is opened. When the closure 48 is opened, the routine proceeds to step 414. On the other hand, when the closure 48 is closed, the routine is ended.

At step 414, it is again judged if the closure 48 is opened. When the closure 48 is opened, the routine returns to step 414. On the other hand, when the closure 48 is closed, the routine proceeds to step 416.

At step 414, it is again judged if the diagnosis allowance flag DCF is reset (DCF=0). As shown in FIG. 40, DCF is set when the diagnosis requirements are satisfied, and is reset when the diagnosis requirements are not satisfied. When DCF=0, the routine proceeds to step 418 where the present air chamber pressure P detected by the pressure sensor 76 is memorized as a second pressure P2, and the routine proceeds to step 420. On the other hand, when DCF=1, the routine is ended.

At step 420, it is judged if the second pressure P2 is larger than a predetermined pressure Px (P2>Px). The predetermined pressure Px is generally equal to the maximum fuel chamber pressure which is expected to be increased during the refueling operation. When P2>px, it is judged that the film 5 has malfunction, the routine proceeds to step 422 where the alarm 63 is switched on, and the routine is ended. On the other hand, when P2≦Px, the routine is ended.

The eighth embodiment may include the diagnosis that the time elapsed since the start of the refueling operation is enough to increase the fuel chamber pressure to the sufficient extent such as step 428 in FIG. 28 according to the seventh embodiment.

The malfunction may be diagnosed by comparing the difference in the fuel chamber pressure before and after the refueling operation with a predetermined value. Further, the malfunction may be diagnosed on the basis of the air chamber pressure change.

Figure 34:
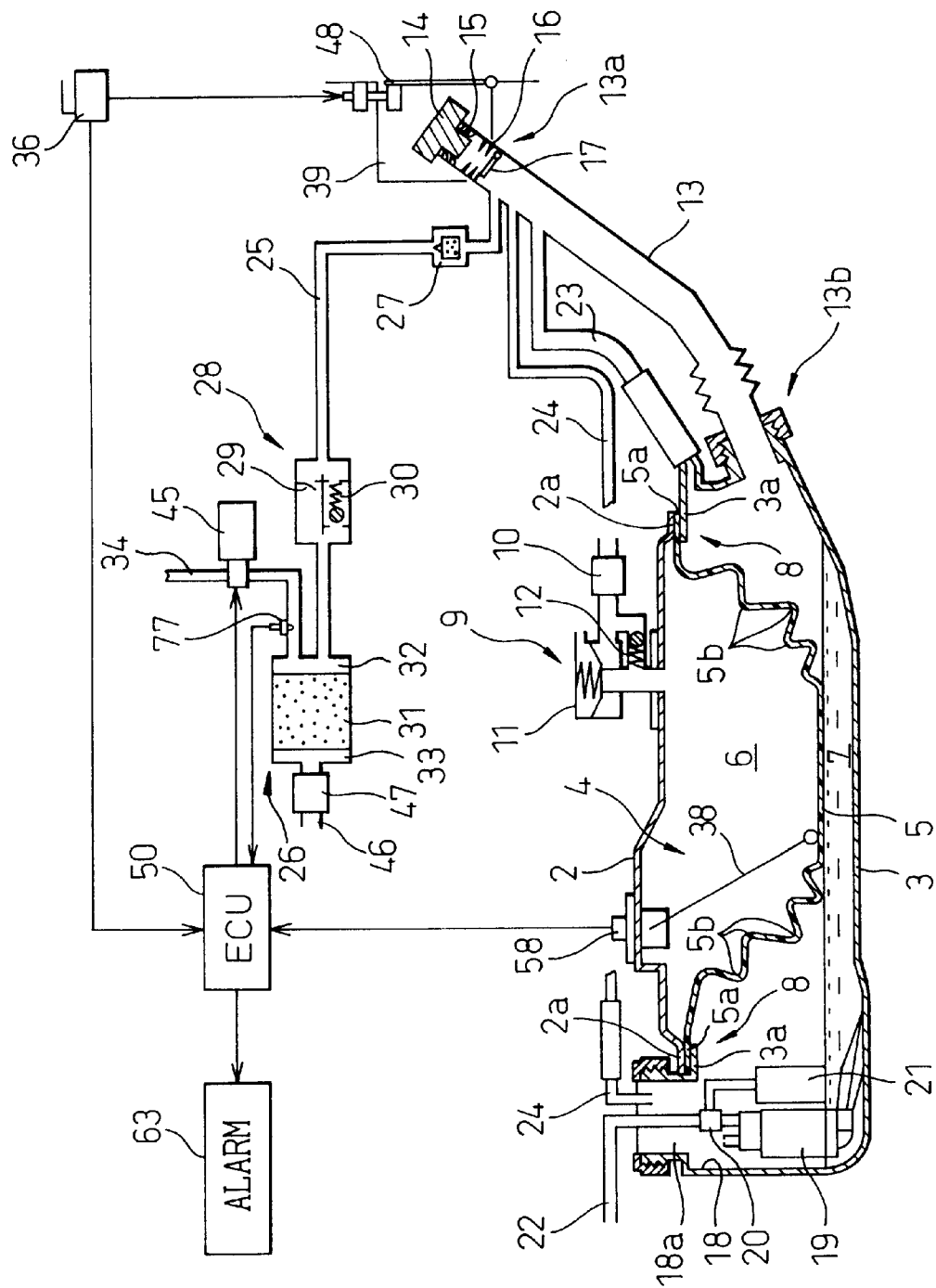
FIG. 34 is a general view of a fuel tank according to the ninth embodiment of the invention.
Figure 35:
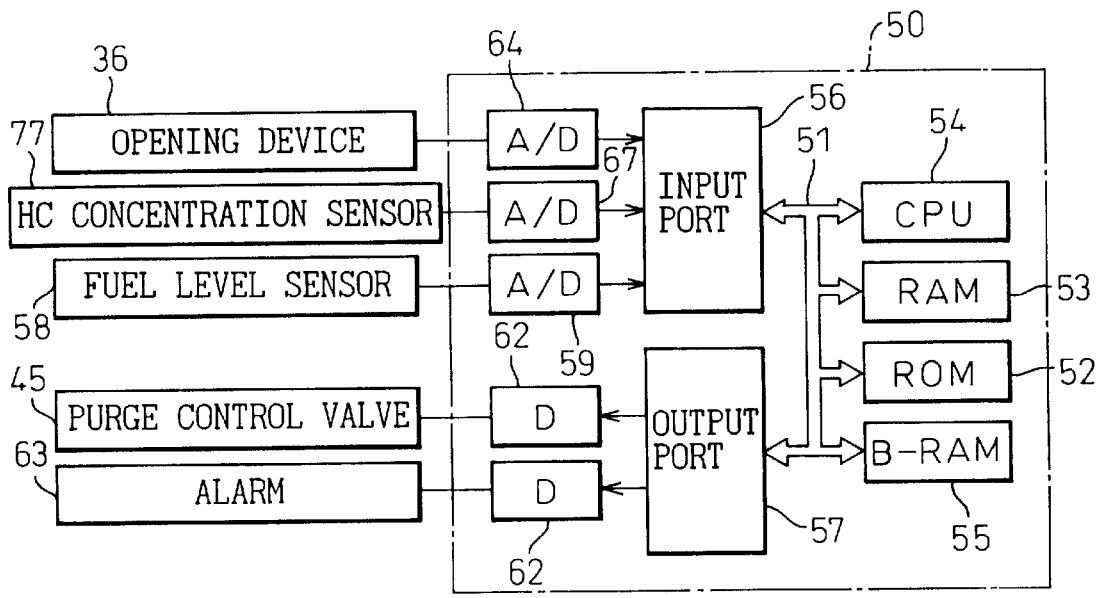
FIG. 35 is a detailed view of the ECU of FIG. 34.

A tank according to the ninth embodiment will be explained, referring to FIGS. 34 and 35. In FIG. 34, a hydrocarbon sensor (hereinafter referred to as the "HC sensor") 77 is positioned in the purge pipe 34 between the canister 26 and the purge control valve 45. The HC sensor 77 is connected to the input port 56 via an A-C converter 67 (see FIG. 35). The structures and the functions thereof other than those described regarding the ninth embodiment are the same as those of the fifth embodiment, and an explanation thereof will be eliminated.

Figure 36:
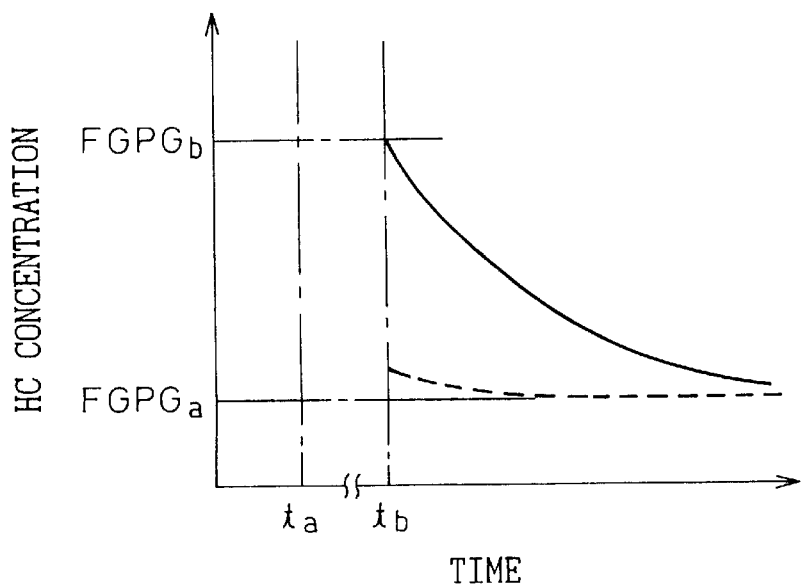
FIG. 36 is a view illustrating a relationship between a time and concentration of hydrocarbon according to the ninth embodiment of the invention.

A malfunction diagnosis of the tank according to the ninth embodiment will be explained, referring to FIG. 36. The volume in the fuel chamber 7 between the film 5 and the fuel surface includes the vapor. The vapor is introduced into the canister 26 via the vapor discharge pipe 25. However, the amount of the vapor introduced into the canister 26 is kept small since the above volume is kept small under the condition in that the film has no malfunction. Therefore, the hydrocarbon concentration (hereinafter referred to as the "HC concentration") purged is kept at a small value FGPGa. On the other hand, the amount of vapor in the above volume is large under the condition in that the film 5 has malfunction such as the attachment of the film 5 to the upper wall of the tank 1 since the above volume is large. In this case, a large amount of the vapor is introduced into the canister 26 from the fuel chamber 7 during the refueling operation from time ta to tb in FIG. 36. Therefore, the HC concentration purged after the refueling operation becomes a large value FGPGb which is larger than the small value FGPGa.

The malfunction diagnosis of the tank according to the ninth embodiment will be explained in detail. At first, a first HC concentration FGPGm of the air discharged from the canister 26 is detected by the HC sensor 77 during the purge operation before the refueling operation. Next, a second HC concentration FGPG2 of the air discharged from the canister 26 is detected by the HC sensor 77 during the purge operation after the refueling operation. The second HC concentration FGPG2 is compared with the first HC concentration FGPGm. When the second HC concentration FGPG2 is larger than the first HC concentration FGPGm, it is judged that the film 5 has malfunction such as the attachment of the film 5 to the upper wall of the tank 1.

In the ninth embodiment, the malfunction in the film may be diagnosed on the basis of a difference in the concentration of vapor in the fuel chamber before and after the purge operation is started. If the film has no malfunction, the concentration of vapor in the fuel chamber before the purge operation is started becomes smaller than that after the purge operation is started since the amount of vapor in the fuel chamber is kept small. Therefore, in this case, it is judged that the film has malfunction when the concentration of vapor in the fuel chamber before the purge operation is started does not become smaller than that after the purge operation is started.

Further, in the ninth embodiment, the malfunction in the film may be diagnosed by comparing the concentration of vapor in the fuel tank with a predetermined concentration during the purge operation or the refueling operation. If the film has no malfunction, the concentration of vapor in the fuel tank is kept smaller than a predetermined concentration since the amount of vapor in the fuel chamber is kept small. Therefore, in this case, it is judged that the film has malfunction when the concentration of vapor in the fuel tank is larger than the predetermined concentration.

Further, in the ninth embodiment, the malfunction in the film may be diagnosed by comparing the vapor amount per unit time introduced into the canister 6 during the refueling operation with that before the refueling operation. If the film has no malfunction, the vapor amount per unit time introduced into the canister 6 is constant since the amount of vapor in the fuel chamber is kept small and constant. Therefore, in this case, it is judged that the film has malfunction when the vapor amount per unit time introduced into the canister 6 during the refueling operation is larger than that before the refueling operation.

Further, in the ninth embodiment, the malfunction in the film may be diagnosed on the basis of the amount of the fuel vapor flowing through the vapor discharge pipe 25 by a flow amount sensor.

Figure 37:
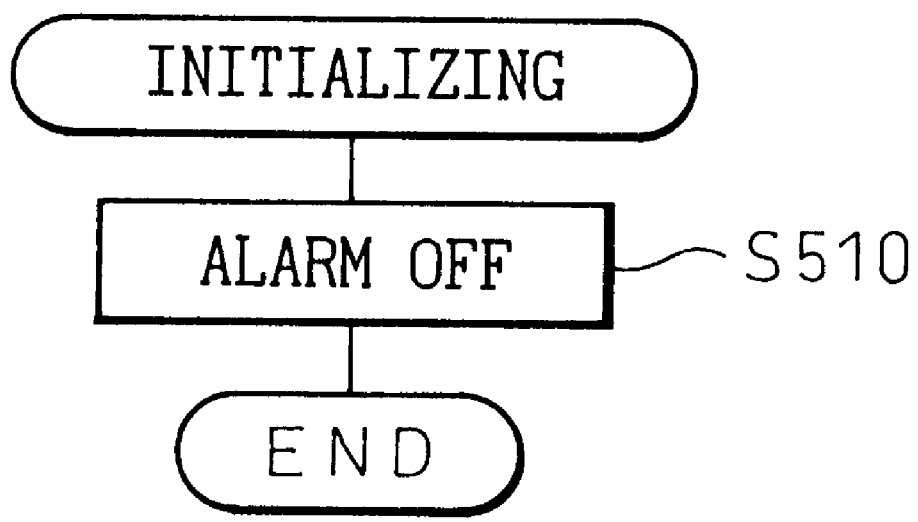
FIG. 37 is a flowchart illustrating an initializing routine according to the ninth embodiment of the invention.

An initializing routine according to the ninth embodiment will be explained, referring to FIG. 37. In FIG. 37, at step 510, the alarm 63 is switched off, and the routine is ended.

Figure 38:
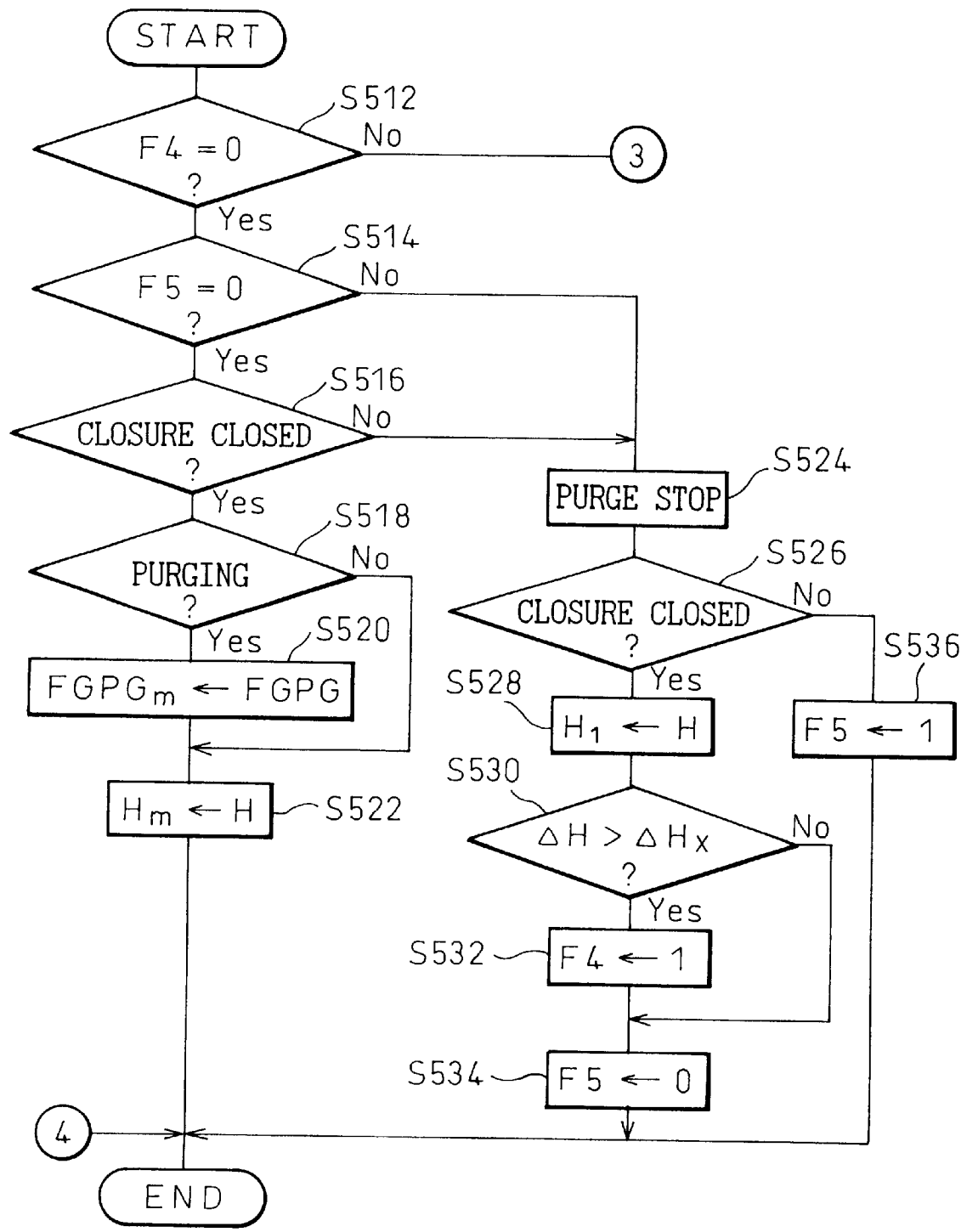
FIG. 38 is a part of a flowchart illustrating a routine of malfunction diagnosis according to the ninth embodiment of the invention.
Figure 39:
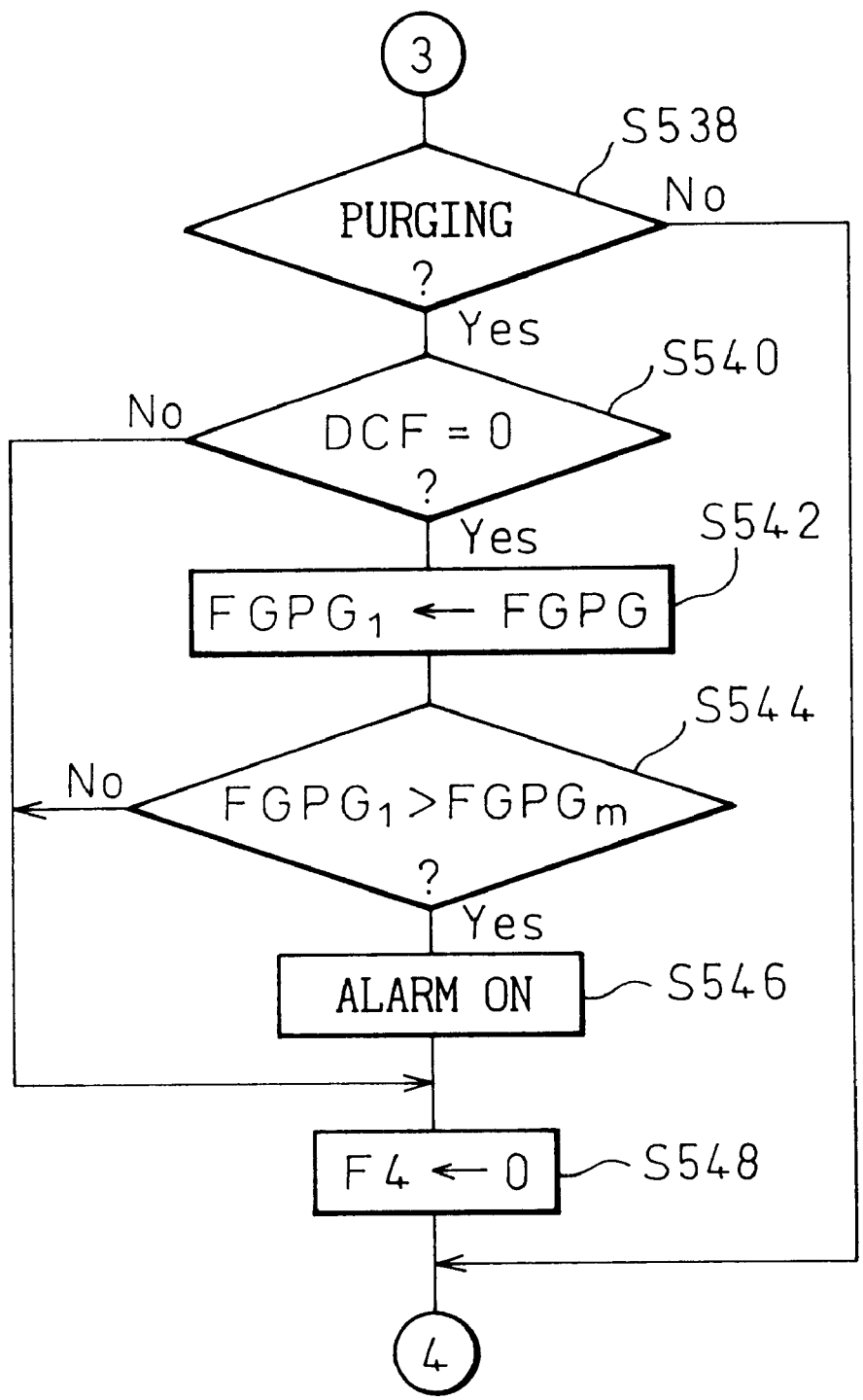
FIG. 39 is a part of a flowchart illustrating a routine of malfunction diagnosis according to the ninth embodiment of the invention.

A routine of the malfunction diagnosis of the tank according to the ninth embodiment will be explained, referring to FIGS. 38 and 39. In FIG. 38, at step 512, it is judged if the refueling operation completion flag F4 is reset (F4=0). F4 is set when the fuel amount enough to diagnose the malfunction has been supplied, and is reset when the malfunction diagnosis has been completed. When F4=0, the routine proceeds to step 514. On the other hand, when F4=1, the routine proceeds to step 538.

At step 514, it is judged if the closure opening flag F5 is reset (F5=0). F5 is set when the closure 48 is opened, and is reset when the closure 48 is closed. When F5=0, the routine proceeds to step 516. On the other hand, when F5=1, the routine proceeds to step 524 where the purge operation is stopped, and the routine proceeds to step 526.

At step 516, it is judged if the closure 48 is closed. When the closure 48 is closed, the routine proceeds to step 518. On the other hand, when the closure 48 is opened, the routine proceeds to step 524 where the purge operation is stopped, and the routine proceeds to step 526.

At step 518, it is judged if the purge operation is carried out. When the purge operation is carried out, the routine proceeds to step 520 where the HC concentration FGPG detected by the HC sensor 77 is memorized as an initial HC concentration FGPGm, the routine proceeds to step 522. On the other hand, when the purge operation is stopped, the routine proceeds to step 522.

At step 522, the present fuel level H detected by the fuel level sensor 58 is memorized as an initial fuel level Hm, and the routine is ended.

At step 526, it is judged if the closure 48 is closed. When the closure 48 is closed, the routine proceeds to step 528 where the present fuel level H detected by the fuel level sensor 58 is memorized as a first fuel level H1, and the routine proceeds to step 530. On the other hand, when the closure 48 is opened, the routine proceeds to step 536 where F5 is set, and the routine is ended.

At step 530, it is judged if a difference $\Delta H(=H1-Hm)$ between the first fuel level H1 and the initial fuel level Hm is larger than a predetermined value $\Delta Hx$ ($\Delta H > \Delta Hx$). The predetermined value $\Delta Hx$ is generally equal to the fuel level sufficient to discharge the vapor from the fuel chamber 7 to increase the HC concentration. When $\Delta H > \Delta Hx$, the routine proceeds to step 532 where F4 is set, the routine proceeds to step 534 where F5 is reset, and the routine is ended. On the other hand, when $\Delta H \leq \Delta Hx$, it is judged that the vapor amount sufficient to increase the HC concentration is not discharged from the fuel chamber 7 during the refueling operation, the routine proceeds to step 534, F4 is kept reset to forbid the malfunction diagnosis. At step 534, F5 is reset, and the routine is ended.

At step 538, it is judged if the purge operation is carried out. When the purge operation is carried out, the routine proceeds to step 540. On the other hand, when the purge operation is stopped, the routine is ended.

At step 540, it is judged if the diagnosis allowance flag DCF is reset (DCF=0). As shown in FIG. 40, DCF is set when the diagnosis requirements are satisfied, and is reset when the diagnosis requirements are not satisfied. When DCF=0, the routine proceeds to step 542 where the present HC concentration FGPG detected by the HC sensor 77 is memorized as a first HC concentration FGPG1, and the routine proceeds to step 544. On the other hand, when DCF=1, the routine proceeds to step 548 where F4 is reset, and the routine is ended.

At step 544, it is judged if the first HC concentration FGPG1 is larger than the initial HC concentration FGPGm (FGPG1>FGPGm). When FGPG1>FGPGm, it is judged that the film 5 has malfunction, the routine proceeds to step 546 where the alarm 63 is switched on, the routine proceeds to step 548 where F4 is reset, and the routine is ended. On the other hand, when FGPG1≦FGPGm, the routine proceeds to step 548 where F4 is reset, and the routine is ended.

The vapor amount in the fuel chamber is large as the atmosphere temperature is high or as the atmosphere pressure is low. Further, the amount of vapor in the fuel tank becomes large as a time has elapsed after the engine is started since the temperature in the tank is increased. Moreover, when the fuel having a lower temperature is refueled into the tank having a higher temperature, the large amount of the fuel is produced in the fuel chamber. Therefore, the vapor amount depends on the temperature of the tank and atmosphere and the atmosphere pressure. On the other hand, the air or fuel chamber pressure or the HC concentration is changed, depending on the vapor amount. Therefore, the diagnosis value of the malfunction diagnosis should be changed or the malfunction diagnosis should be prohibited or forbidden, depending on the tank and atmosphere temperatures and the atmosphere pressure.

A routine of the change of the diagnosis value will be explained, referring to FIG. 40. In FIG. 40, at step 610, it is judged if an ignition switch flag IGF is reset (IGF=0). IGF is set when the engine is started, and is reset when an elapsed time is reset. When IGF=0, the routine proceeds to step 612 where the elapsed time t is reset, the routine proceeds to step 614 where IGF is set, and the routine proceeds to step 616. On the other hand, when IGF=1, the routine proceeds to step 616.

At step 616, it is judged if the purge operation is carried out. When the purge operation is carried out, the routine proceeds to step 618. On the other hand, when the purge operation is stopped, the routine proceeds to step 626 where the elapsed time t added by the routine interval Δt is memorized as a new elapsed time t, and the routine is ended.

At step 618, it is judged if the elapsed time t is smaller than a predetermined time tx (t<tx). tx is generally equal to the time sufficient to increase the fuel temperature in the fuel chamber 7 to increase the vapor amount. When t<tx, the routine proceeds to step 620. On the other hand, when t≧tx, it is judged that the fuel chamber pressure increase is derived from the fuel temperature increase, the routine proceeds to step 628 where the diagnosis allowance flag DCF is set, and the routine is ended.

At step 620, it is judged if the atmosphere pressure P is smaller than a predetermined pressure Px (P<Px). Px is generally equal to the pressure sufficient to increase the vapor amount in the fuel chamber 7. When P<Px, the routine proceeds to step 622. On the other hand, when P≧Px, it is judged that the vapor amount increase is derived from the smaller atmosphere pressure, the routine proceeds to step 628 where DCF is set, and the routine is ended.

At step 622, it is judged if the atmosphere temperature T is smaller than a predetermined temperature Ty (T<Ty). Ty is generally equal to the temperature sufficient to increase the amount of vapor in the fuel chamber 7. When T<Ty, the routine proceeds to step 624 where DCF is reset, and the routine is ended. On the other hand, when T≧Ty, it is judged that the vapor amount increase is derived from the higher atmosphere temperature, the routine proceeds to step 628 where DCF is set, and the routine is ended.

Figure 41:
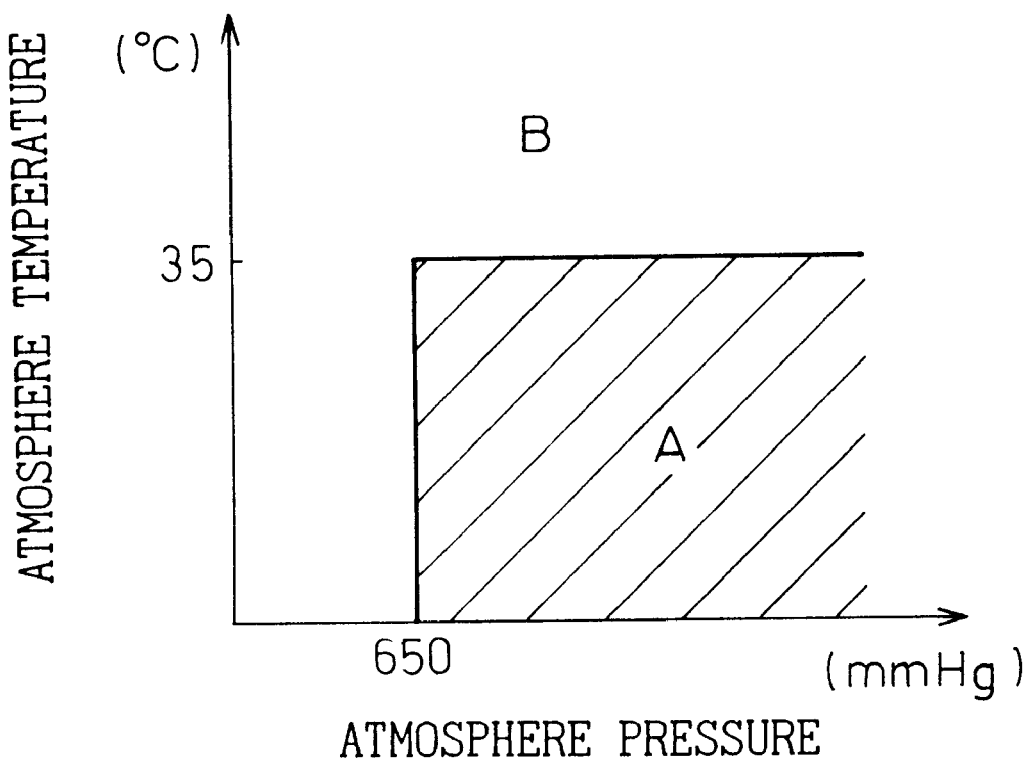
FIG. 41 is an example of a map applied to the routine of FIG. 40.

In FIG. 41, an example of a relationship between the atmosphere pressure and temperature is shown. In FIG. 41, the predetermined pressure Px is 650 mmHg, and the predetermined temperature Ty is 35°. Therefore, the area A is where the malfunction diagnosis is carried out, and the area B is where the malfunction diagnosis is forbidden.

Figure 42:
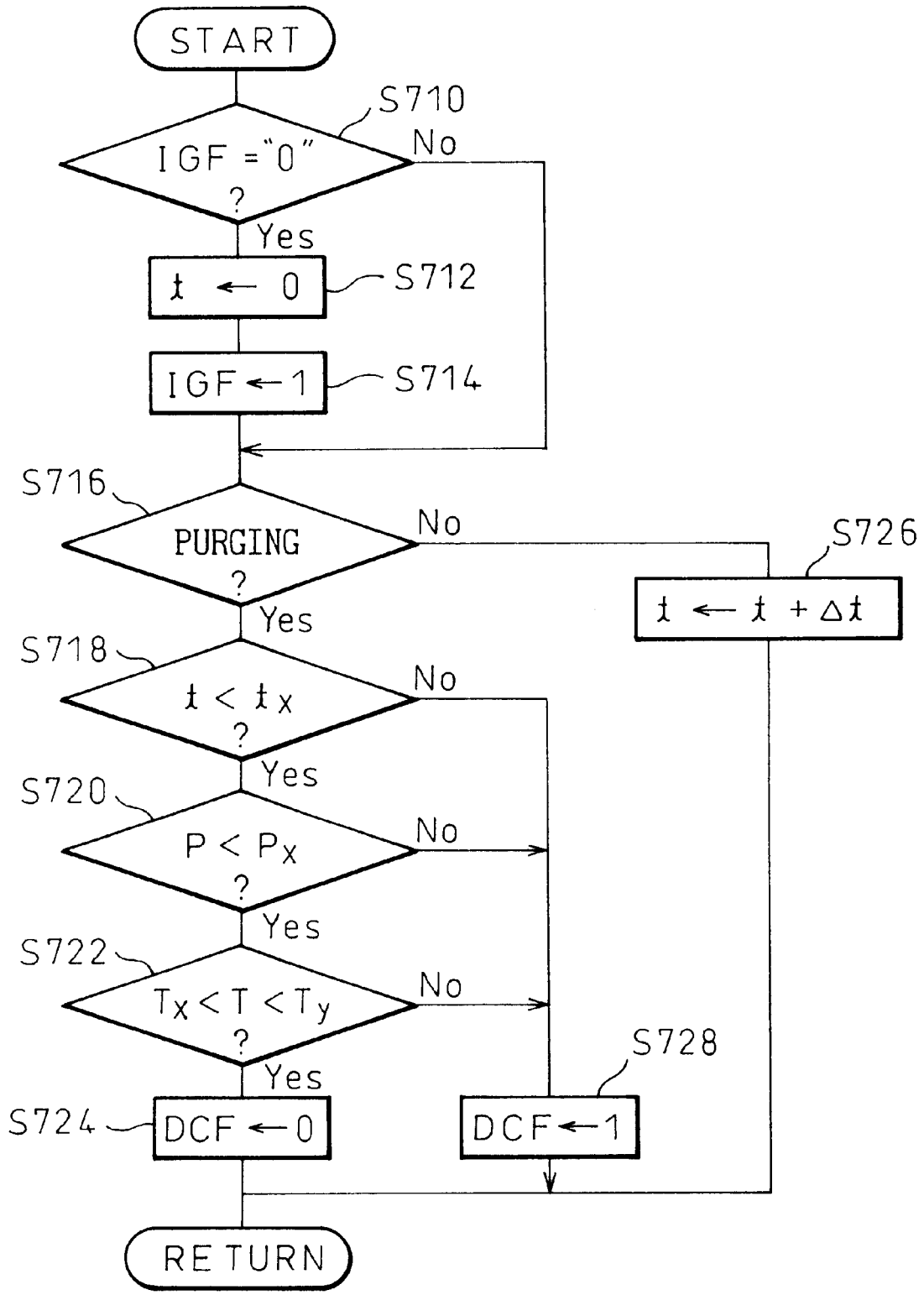
FIG. 42 is a flowchart illustrating a routine of diagnosis allowance according to the seventh, eighth and ninth embodiments.

A routine of setting or resetting the diagnosis allowance flag will be explained, referring to FIG. 42. The diagnosis allowance flag DCF applies to step 330 in FIG. 28, step 416 in FIG. 33, and step 540 in FIG. 39. Step 710, 712, 714, 716, 716, 720, 726 correspond to step 610, 612, 614, 616, 618, 620, 626 in FIG. 40, respectively and an explanation thereof will be eliminated.

At step 722, it is judged if the atmosphere temperature T is larger than a first predetermined temperature Tx and is smaller than a second predetermined temperature Ty (Tx<T<Ty). Tx is generally equal to the temperature sufficient to increase the amount of vapor in the fuel chamber due to the refuel of the fuel having a low temperature into the fuel chamber 7. Ty is generally equal to the temperature sufficient to increase the vapor amount in the fuel chamber 7 due to the high atmosphere temperature. When Tx<T<Ty, the routine proceeds to step 724 where DCF is reset, and the routine is ended. On the other hand, when T≦Tx or T≧Ty, it is judged that the vapor amount increase is derived from the lower or higher atmosphere temperature, the routine proceeds to step 728 where DCF is set, and the routine is ended.

Figure 43:
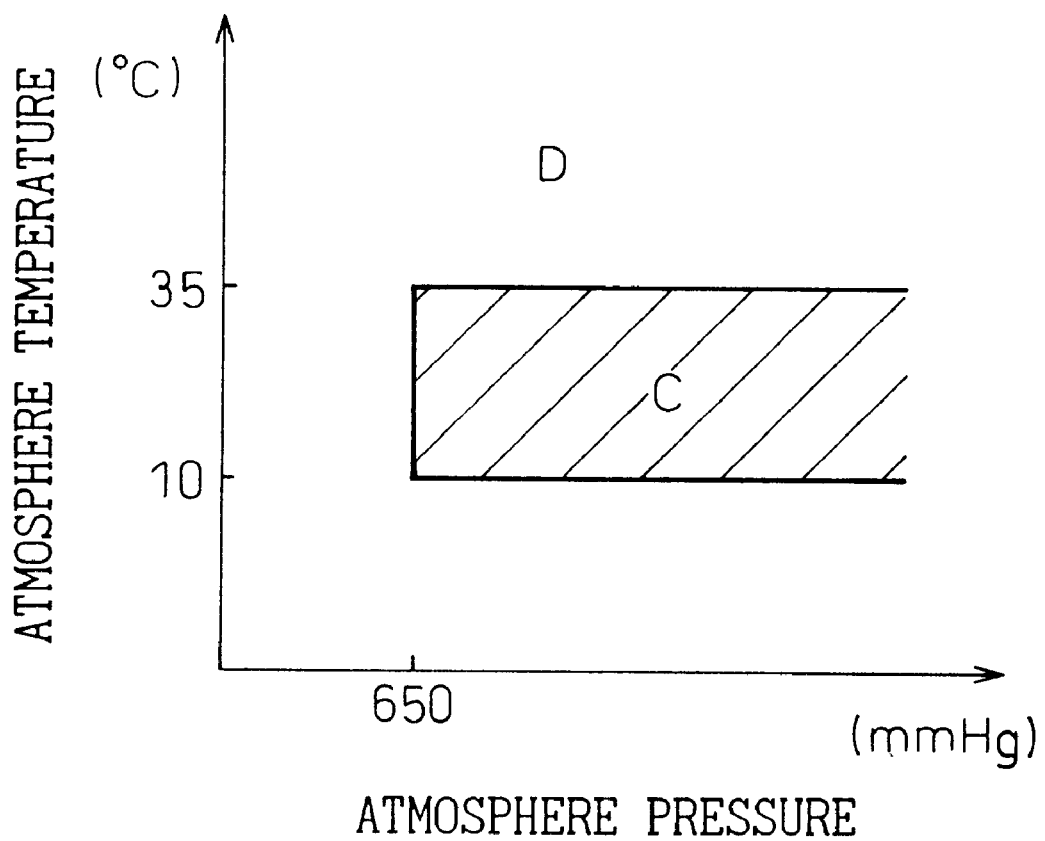
FIG. 43 is an example of a map applied to the routine of FIG. 42.

In FIG. 43, an example of a relationship between the atmosphere pressure and temperature is shown. In FIG. 43, the predetermined pressure Px is 650 mmHg, the first predetermined temperature Tx is 10° C. and the second predetermined temperature Ty is 35° C. Therefore, the area C is where the malfunction diagnosis is carried out, and the area D is where the malfunction diagnosis is forbidden.

According to the invention, a distance between the film 5 and the inner wall of tank 1, e.g., the upper wall of the upper portion 2 in a predetermined direction may be used as the physical value.

The film 5 applied to the above embodiments is mounted at the upper position in the tank 1 and projects its central face downwardly toward the fuel chamber 7 with the amount of the fuel in the fuel chamber 7 being decreased. However, the film 5 may be mounted at the lower position in the tank 1 and project its central face upwardly toward the air chamber 6 with the amount of the fuel in the fuel chamber 7 being increased. In this case, the entire face of the film 5 can contact with the fuel in the fuel chamber 7. Therefore, an air volume formed in the fuel chamber 7 is kept very small. Thus, the vapor amount in the fuel chamber 7 is kept very small.

Further, the film may be formed as a bag which is made of inflatable material. In this case, an air chamber is formed in the bag, and the fuel chamber is formed by the inner wall of the tank and the outer face of the bag.

Further, the invention may be applied to the engine of a ship or an airplane. Also, the invention may be applied to a tank in a gas station.

While the invention has been described by reference to specific embodiments chosen for purposes of illustration, it should be apparent that numerous modifications can be made thereto by those skilled in the art without departing from the basic concept and scope of the invention.

We claim:

1. A device for diagnosing malfunction in a fuel tank, said fuel tank having a separator wall therein which separates an interior of said tank into a fuel chamber and an air chamber said wall being deformable according to an amount of fuel in said fuel chamber, said device comprising:

means for detecting a change of a concentration of fuel vapor in said fuel tank, and means for diagnosing malfunction of said separator wall on the basis of said change to diagnose that said separator wall has malfunction when said change differs from a predetermined regular change.

2. A device for diagnosing malfunction in a fuel tank according to claim 1, wherein said malfunction diagnosing means diagnoses that said separator wall has malfunction on the basis of difference in the concentration of fuel vapor before and after a refueling operation to supply said fuel chamber with fuel.

3. A device for diagnosing malfunction in a fuel tank according to claim 1, wherein said fuel tank is in communication with an engine, and said malfunction diagnosing means diagnoses that said separator wall has malfunction on the basis of difference in the concentration of fuel vapor before and after a purge operation to purge fuel vapor to said engine.

4. A device for diagnosing malfunction in a fuel tank according to claim 1, wherein said malfunction diagnosing means diagnoses that said separator wall has malfunction when a concentration of fuel vapor is higher than a predetermined concentration.

5. A device for diagnosing malfunction in a fuel tank according to claim 4, wherein said fuel tank is in communication with an engine, and said malfunction diagnosing means diagnoses that said separator wall has malfunction when a concentration of fuel vapor is higher than the predetermined concentration during a purging operation to purge fuel vapor to said engine.

6. A device for diagnosing malfunction in a fuel tank according to claim 4, wherein said malfunction diagnosing means diagnoses that said separator wall has malfunction when a concentration of fuel vapor is higher than the predetermined concentration during a refueling operation to supply said fuel chamber with fuel.

7. A device for diagnosing malfunction in a fuel tank according to claim 1, wherein said malfunction diagnosing means diagnoses that said separator wall has malfunction on the basis of amount of fuel in said air chamber.

8. A device for diagnosing malfunction in a fuel tank according to claim 1, wherein prohibiting means is provided for prohibiting the diagnosis of said malfunction diagnosis means on the basis of at least one of an engine driving time, a temperature surrounding said fuel tank, an atmosphere pressure, and a fuel temperature in said fuel tank.

9. A device for diagnosing malfunction in a fuel tank according to claim 1, wherein an indicator is provided for indicating malfunction of said separator wall to indicate malfunction of said separator wall when said malfunction diagnosis means diagnoses that the separator wall has malfunction.

* * * * *